(12) United States Patent
Stevens

(10) Patent No.: US 7,438,296 B2
(45) Date of Patent: Oct. 21, 2008

(54) APPARATUS AND METHOD FOR SHIFTING THE CENTER OF GRAVITY IN A VEHICLE

(76) Inventor: James C. Stevens, 11686 N. Gasburg Rd., Mooresville, IN (US) 48158

( * ) Notice: Subject to any disclaimer, the term of this patent is extended or adjusted under 35 U.S.C. 154(b) by 375 days.

(21) Appl. No.: 11/041,551

(22) Filed: Jan. 23, 2005

(65) Prior Publication Data

US 2006/0001315 A1 Jan. 5, 2006

(51) Int. Cl.
*B60G 17/015* (2006.01)
(52) U.S. Cl. ..................................................... 280/5.5
(58) Field of Classification Search ................. 280/5.5, 280/5.507, 5.508, 5.509, 5.512
See application file for complete search history.

(56) References Cited

U.S. PATENT DOCUMENTS 6,676,561 B2 * 1/2004 Fritzer et al. .................. 477/70

* cited by examiner

*Primary Examiner*—Faye M. Fleming
(74) *Attorney, Agent, or Firm*—R. Randall Frisk

(57) ABSTRACT

An apparatus for shifting the center of gravity of a vehicle includes a master cylinder assembly with motor, gearbox and position sensing encoder; a slave cylinder hydraulically connected with the master cylinder and connected with one or more of the vehicle's shock and spring assemblies to, upon actuation of the motor, vary the distance between the upper shock casing and the lower piston end: a driver control assembly including one or more actuator paddles connected behind the outer grip of the steering wheel: and, a control unit having computer programming to receive and issue data and instructions and being operationally connected between the driver control assembly and the master cylinder to actuate the motor upon movement of one or more of the paddles.

9 Claims, 104 Drawing Sheets

*Fig. 6*

| *Fig. 7* | *Fig. 8* | *Fig. 9* | *Fig. 10* |
| *Fig. 11* | *Fig. 12* | *Fig. 13* | *Fig. 14* |
| *Fig. 15* | *Fig. 16* | *Fig. 17* | *Fig. 18* |
| *Fig. 19* | *Fig. 20* | *Fig. 21* | *Fig. 22* |

*Fig. 33I*

APPARATUS AND METHOD FOR SHIFTING THE CENTER OF GRAVITY IN A VEHICLE

FIELD OF THE INVENTION

The present invention relates to the field of motor vehicles, and more particularly, to an apparatus and method for shifting the center of gravity in a vehicle.

BACKGROUND OF THE INVENTION

In racing, small changes in the position of the vehicle's center of gravity can significantly alter the vehicle's handling. One way in which this has been accomplished is by addition of a slave cylinder at the shock and spring assembly of at least one wheel or corner of the vehicle. A typical shock and spring assembly includes a shock absorber with an upper shock case and a lower piston end and includes a coil spring coaxial surrounding the shock absorber. The spring is preloaded in compression between elements connected with the upper shock case and the lower piston end. The slave cylinder is inserted serially between the upper shock casing and the upper end of the spring. The slave cylinder can be operated by the driver, while driving, by turning a knob inside the vehicle. The knob is mechanically connected with the slave cylinder to correspondingly extend or retract it, which raises or lowers that corner of the vehicle, and the vehicle's center of gravity is accordingly shifted.

What is needed is an improved apparatus for shifting the center of gravity of the vehicle.

SUMMARY OF THE INVENTION

Generally speaking, an apparatus is provided for shifting the center of gravity of a vehicle, the apparatus requiring little or no extra room between the vehicle and the vehicle's suspension spring shock absorber or other suspension element, and which provides a significant degree of variability and control by the driver while driving.

The system is used to actuate a slave cylinder, at least one of the coil spring/shock absorbers, via changing hydraulic pressure from a master cylinder, in order to apply more force to the coil spring. This coil spring is mounted coaxially with a shock absorber (damper) on one or more corners of a racecar. This force change acting on the spring causes an attitude change that essentially makes a change to the weight distribution of the vehicle (i.e. more or less weight to the front/rear/left/right, etc.). This is used as a driver aid to effect changes in the handling of the car.

An apparatus for shifting the center of gravity of a vehicle includes a master cylinder assembly with motor, gearbox and position sensing encoder; a slave cylinder hydraulically connected with the master cylinder and connected with one or more of the vehicle's shock and spring assemblies to, upon actuation of the motor, vary the distance between the upper shock casing and the lower piston end; a driver control assembly including one or more actuator paddles connected behind the outer grip of the steering wheel: and, a control unit having computer programming to receive and issue data and instructions and being operationally connected between the driver control assembly and the master cylinder to actuate the motor upon movement of one or more of the paddles.

It is an object of the present invention to provide an improved apparatus for shifting the center of gravity of a vehicle.

Further objects and advantages will become apparent from the following description of the preferred embodiment.

BRIEF DESCRIPTION OF THE DRAWINGS

FIG. 6 is a layout view showing the orientation of the partial views shown in FIGS. 7-22.

FIGS. 25A-25I are partial views which show, in combination, the first page of the diagram (code) of a computer program, in developer view, suitable for running on a PC to enable a user to engage with and vary the settings of control unit 13 to control operation of the apparatus 10 of FIG. 1.

DESCRIPTION OF THE PREFERRED EMBODIMENT

Figure 1:
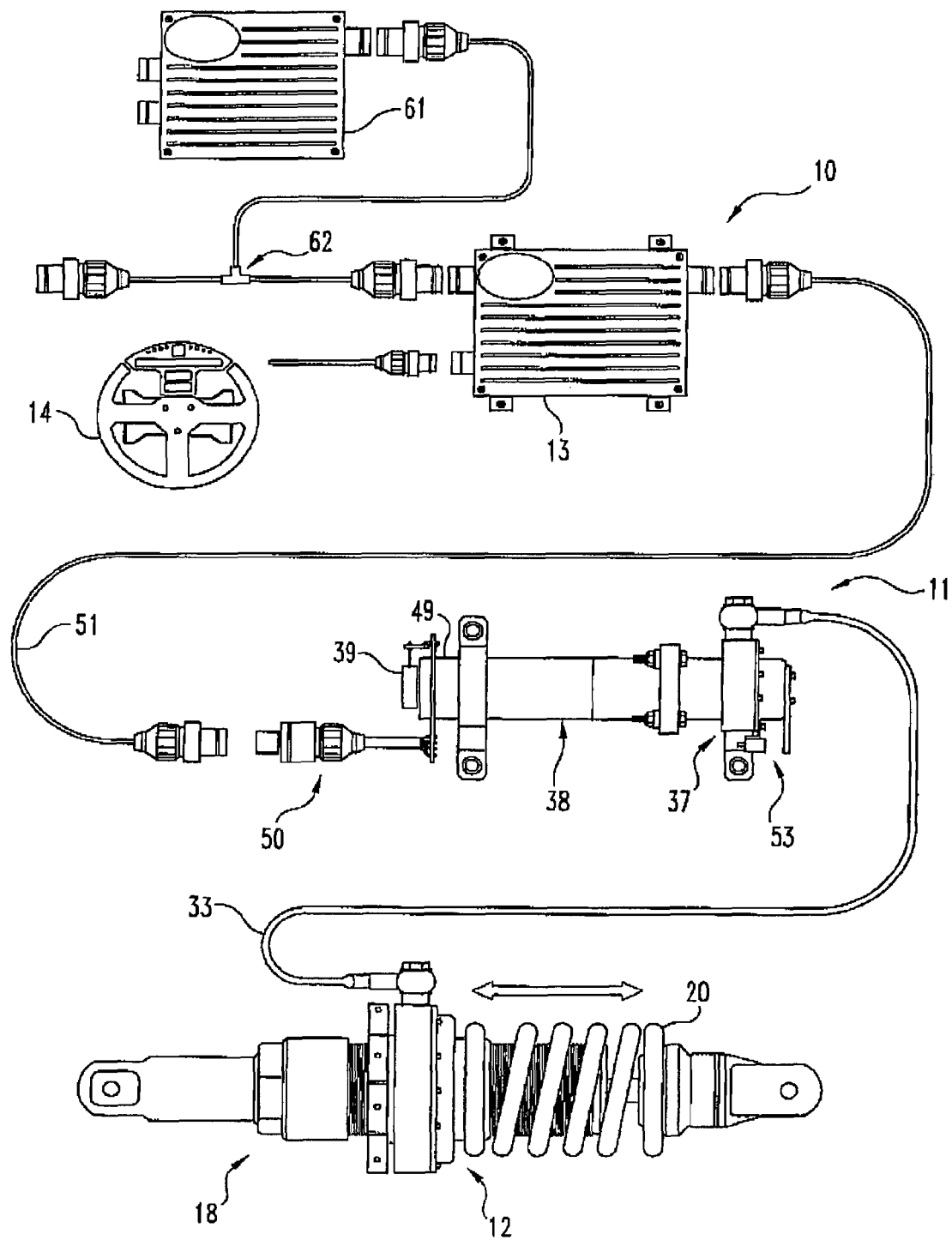
FIG. 1 is a diagrammatic view of an apparatus 10 for shifting the center of gravity of a vehicle in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and that any alterations or modifications in the illustrated device, and any further applications of the principles of the invention as illustrated therein are contemplated as would normally occur to one skilled in the art to which the invention relates.

Referring to FIG. 1, there is shown an apparatus or "weight jacker" 10 for shifting the center of gravity of a vehicle in accordance with one embodiment of the present invention. Weight jacker 10 generally includes a master cylinder assembly 11, a slave cylinder 12, a control unit 13, and a driver control assembly 14. The present invention is described connected to the shock and spring assembly 18 at just one corner of a vehicle (not shown), but it is contemplated that it can be connected to one corner (e.g. front right), two corners (e.g. front right and rear left), or any desired combination. Shock and spring assembly 18 generally includes a shock absorber 19 and a coil spring 20.

Figure 2:
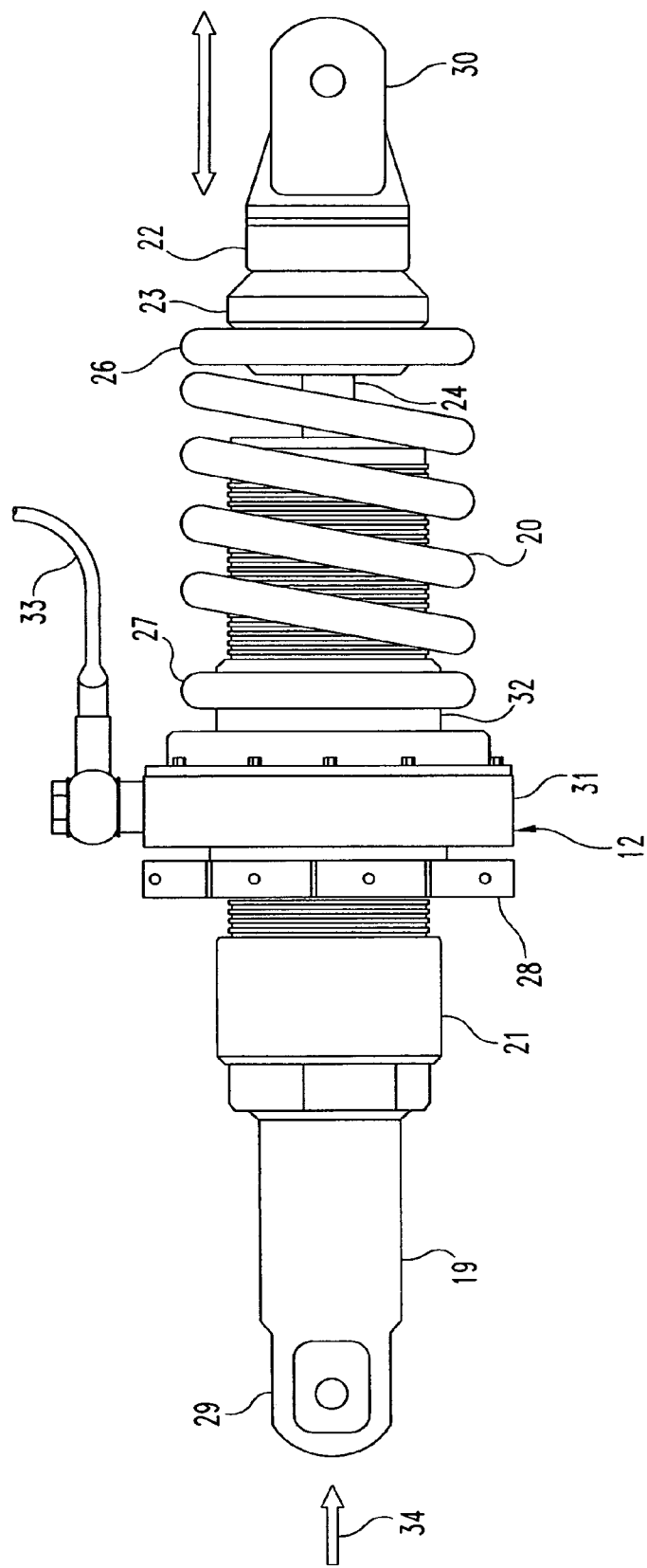
FIG. 2 is a side view of the slave cylinder 12 connected with the shock and spring assembly 18 of the apparatus 10 of FIG. 1.

Referring to FIG. 2, shock absorber 19 (shown in a lateral orientation for discussion purposes) includes an upper shock case 21 that is connected to the vehicle body, a lower piston end 22 that is connected to the suspension system (wishbone, etc.) and a donut 23 that freely encircles shock absorber piston rod 24. The lower end 26 of spring 20 is seated against donut 23, which is seated against piston end 22, as shown. The upper end 27 of spring 20 would normally be seated against an upper cap or perch (not shown), the position of which along upper shock case 21 is set by an axial adjustment mechanism such as adjustment nut 28, which is threadedly received around upper shock case 21, as shown. Spring 20 is thereby compressively loaded between collar 23 and adjustment nut 28, and rotation of adjustment nut 28 varies the pre-load distance between the upper and lower ends 29 and 30 of shock absorber 19. In addition to such manual preloading, slave cylinder 12 replaces the perch (not shown) and is coaxially interposed between the upper end 27 of spring 20 and adjustment nut 28. Hydraulic slave cylinder 12 can be one of many available from the manufacturers of the shock absorbers, such slave cylinders being configured to properly mate with a chosen shock absorber. Slave cylinder 12 includes a housing 31 and a piston 32 that axially extends and retracts upon hydraulic pressure increases and decreases delivered through hydraulic line 33. Piston 32 is sized and configured to receive the upper end 27 of spring 20 in a compressive seating arrangement, as shown. Thus, like rotation of adjustment nut 28, variation in hydraulic pressure to slave cylinder 12 extends/retracts piston 32 which, for a given weight 34 applied coaxially to shock absorber 19 (i.e. vehicle weight) varies the distance between the upper and lower ends 29 and 30 of shock absorber 19. As a consequence, since the vehicle weight 34 applied there at does not change, the compressed length of spring 20 does not change, and the vehicle is thus raised or lowered. However, such raising or lowering of the vehicle, however slight, will shift the vehicle's center of gravity, which will change the applied weight 34 at each wheel, and the length of spring 20 will therefore change slightly.

Figure 3:
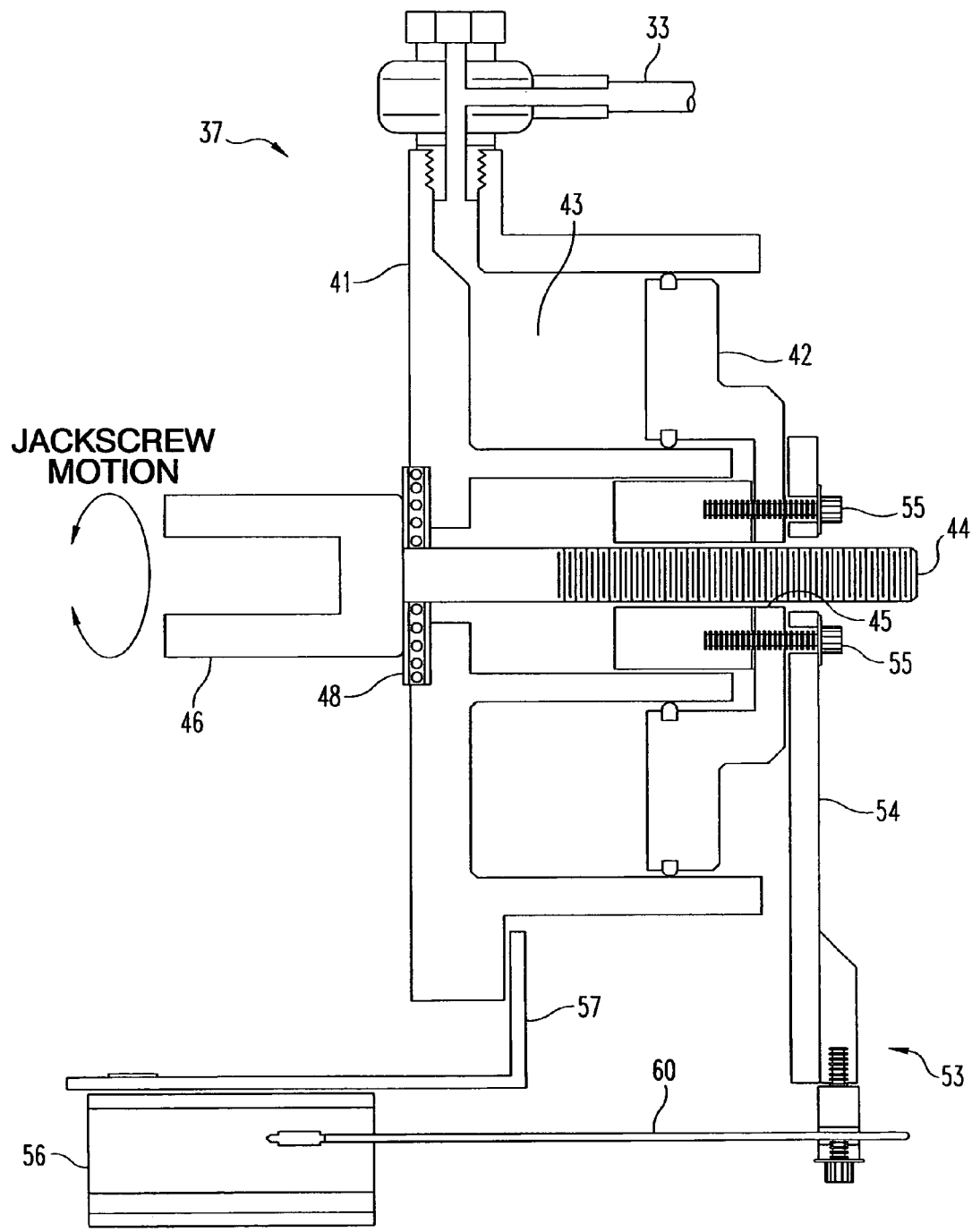
FIG. 3 is a side, partially cross-sectional view of the master cylinder 37 and potentiometer 56 of the apparatus 10 of FIG. 1.

Referring to FIGS. 1 and 3, master cylinder assembly 11 includes a master cylinder 37, a motor/gearbox assembly 38 and a rotary encoder 39. Master cylinder 37 is essentially the same as slave cylinder 12, except without the jackscrew 44 through the center, and includes a housing 41 and a piston 42 that together define a fluid chamber 43. A jackscrew 44 runs through the center of housing 41 and through a threaded opening 45 in the center of piston 42. The yoke 46 at the back end of jackscrew 44 bears against a thrust bearing 48 seated at the back of housing 41. Rotation of jackscrew 44 moves piston 42 axially in and out, which forces hydraulic fluid in and out of chamber 43 and, through its connection via line 33 to slave cylinder 12, moves slave cylinder piston 32 in and out. The preload on spring 20 maintains a positive pressure on the hydraulic fluid in chamber 43. Jackscrew 44 is angularly driven by connection with the motor/gearbox assembly 38 that is connected at the backside of master cylinder 37.

The optical rotary encoder 39 is provided to determine the output position of the master cylinder piston 42. Encoder 39 is connected to the shaft (not shown) of motor/gearbox assembly 38 on the opposite end 49 of the motor from the gearbox output, the latter being connected to the jackscrew yoke 46. For every revolution of the motor shaft (which, through the gearing (not shown) of motor/gearbox 38, is directly related to the number of rotations of jackscrew 44), encoder 39 produces a known number of counts. The electronic output of encoder 39 reflecting the number of counts and the rotation direction of the shaft is fed via coupling 50 and cable 51 to control unit 13. Since the gearbox ratio and the jackscrew thread pitch are known, the exact position and direction and speed of movement of the master cylinder piston 42 can be determined at any time following an initial calibration. If desired, a secondary potentiometer assembly 53 can be used. Assembly 53 includes a sensor arm 54 connected to the master cylinder piston 42 by any appropriate means such as screws 55, and includes a position sensor potentiometer 56 connected as by a bracket 57 to housing 41. The pot string 60 extends out from potentiometer 56 and is connected to the sensor arm 54, as shown. Other embodiments contemplate any appropriate potentiometer type (e.g. rotary) and connection method, so long as the position of master cylinder piston 42 is tracked and the data fed to control unit 13 to some other data gathering device or directly to the driver control assembly 14, the vehicle cockpit or the pit crew. Optical rotary encoder 39 is the preferred device, however, for monitoring the position and movement of master cylinder piston 42.

Control unit 13 receives data from encoder 39 (and secondary potentiometer assembly 53, if used), as well as from the vehicle's DAQ (data acquisition unit) 61 and the driver control assembly 14. Control unit 13 contains appropriate computer components to receive and store such data along with programming to output instructions through cable 51 to drive motor/gearbox 38, and ultimately to and/or from slave cylinder 12, as desired. In one embodiment, control unit 13 is constructed in accordance with the schematics shown in FIG. 6. FIGS. 7-22 show an enlarged view of the respective portions of the schematics of FIG. 6. And in one embodiment, a control unit 13 constructed in accordance with the schematics of FIGS. 6-22 is made operational by the programming presented in Exhibit A below. Control unit 13 also provides output back to the driver control assembly 14, such as the real-time state of operation of the master cylinder assembly 11 (e.g. its position, direction of movement and/or any other information desired to be provided to the driver). Control unit 13 is also contemplated to output wireless data for receipt by the driver's crew located away from the vehicle. Power and connection to control unit 13 is provided through cable connection 62.

Figure 5:
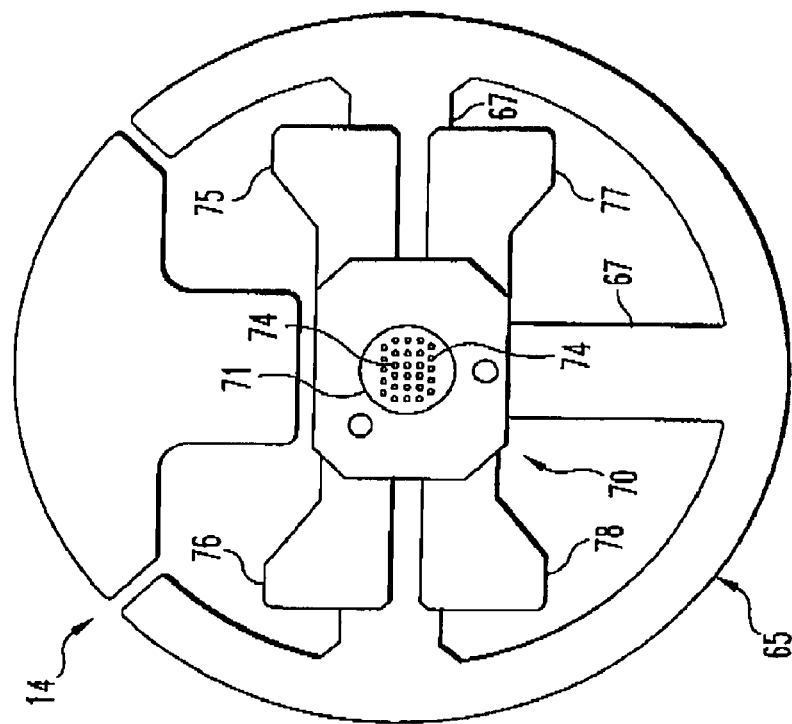
FIG. 5 is a rear view of the driver control assembly 14 of the apparatus 10 of FIG. 1.
Figure 4:
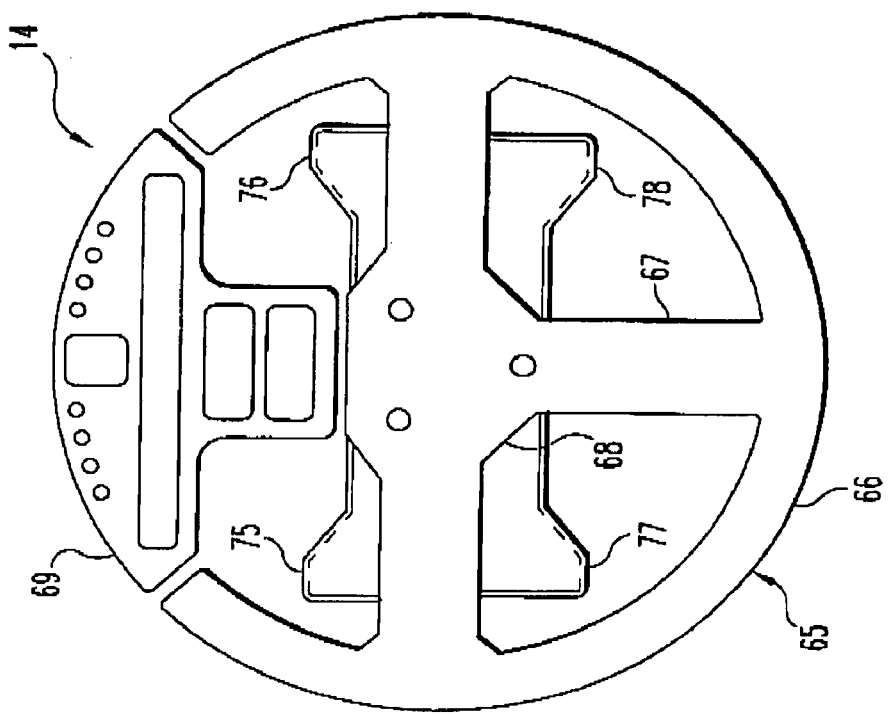
FIG. 4 is a front view of the driver control assembly 14 of the apparatus 10 of FIG. 1.
Figure 7:
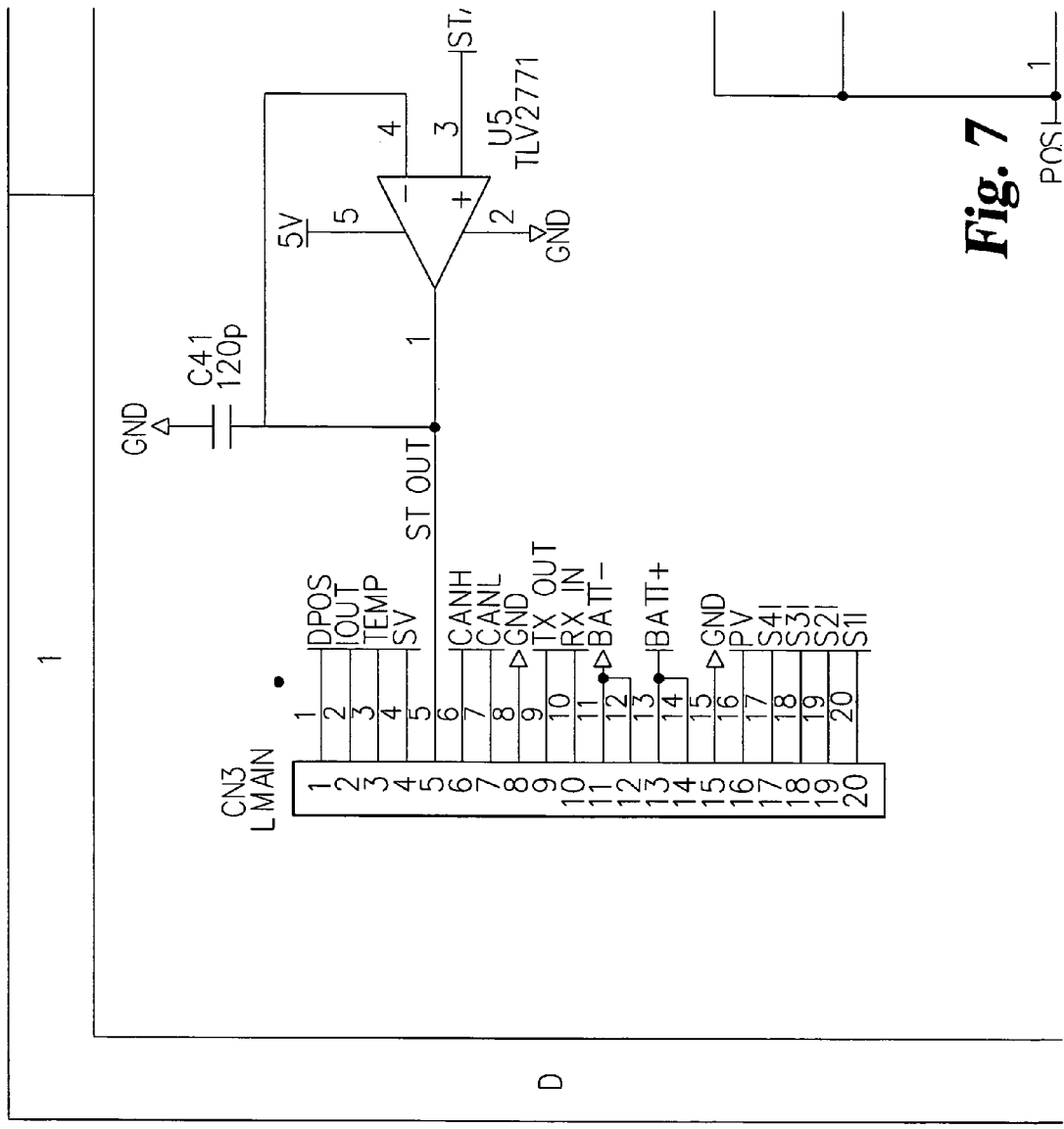
FIGS. 7-22 are partial views, together showing the schematics for constructing control unit 13 of the apparatus 10 of FIG. 1.
Figure 8:
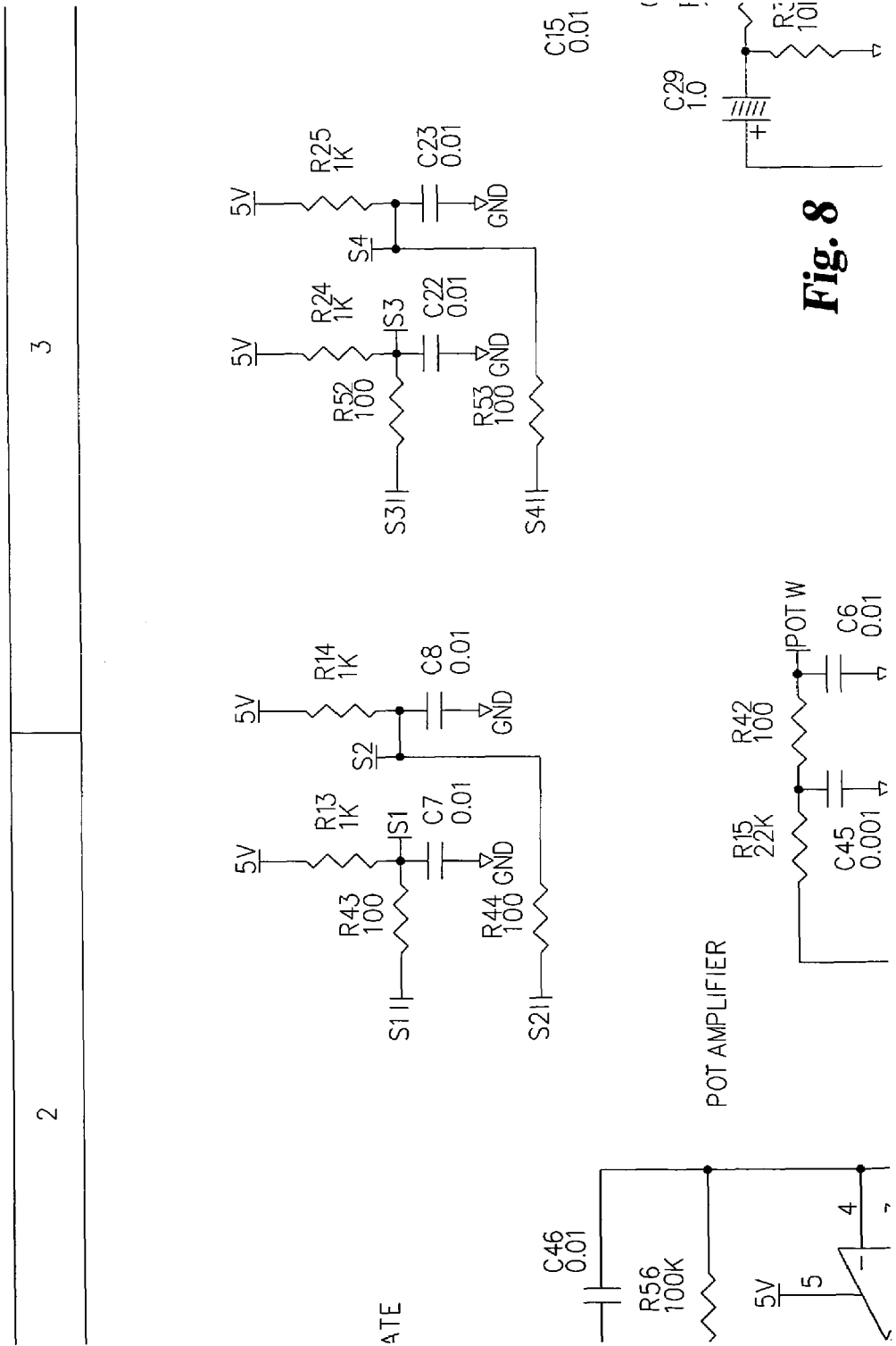
Figure 9:
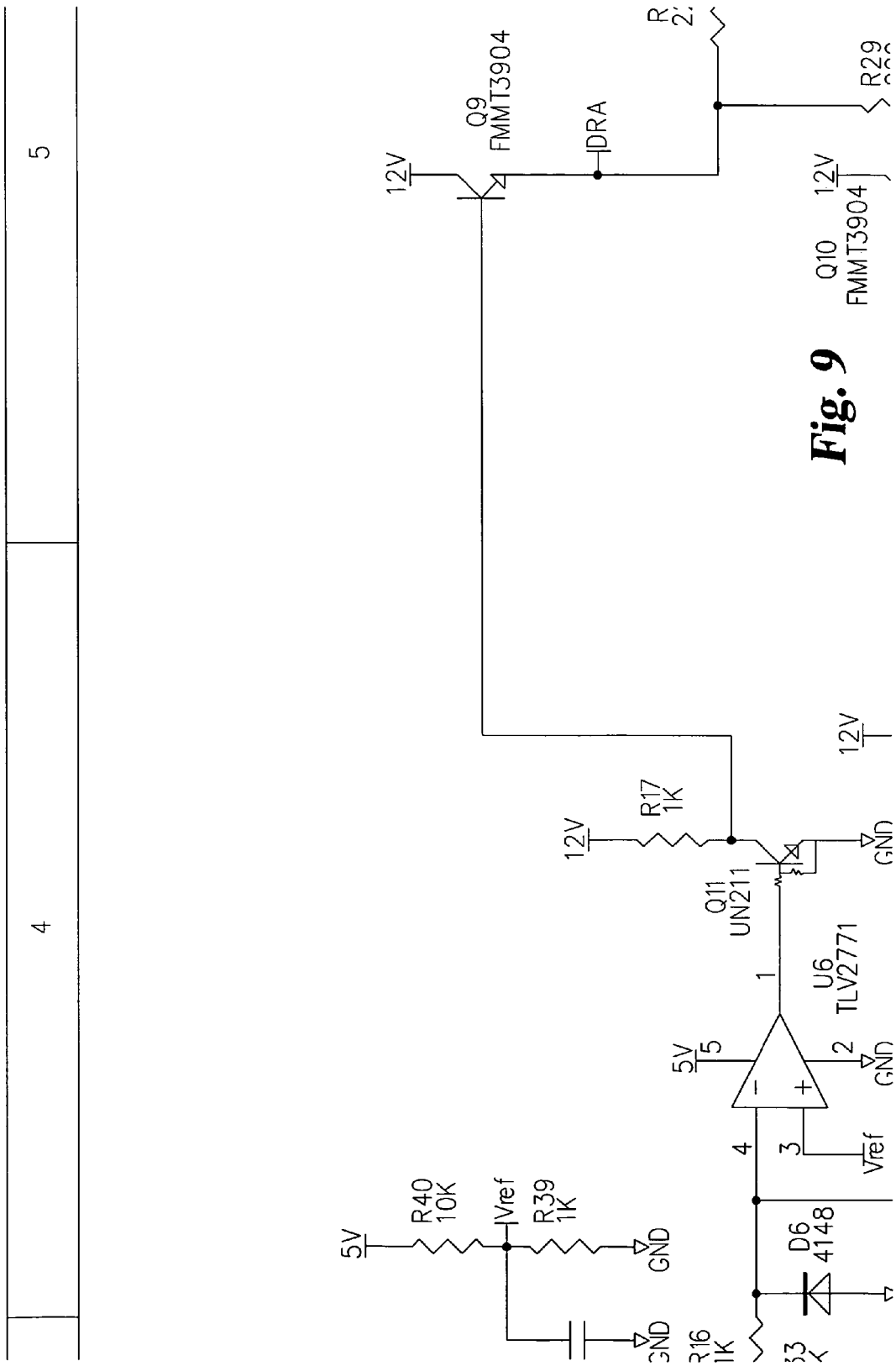
Figure 10:
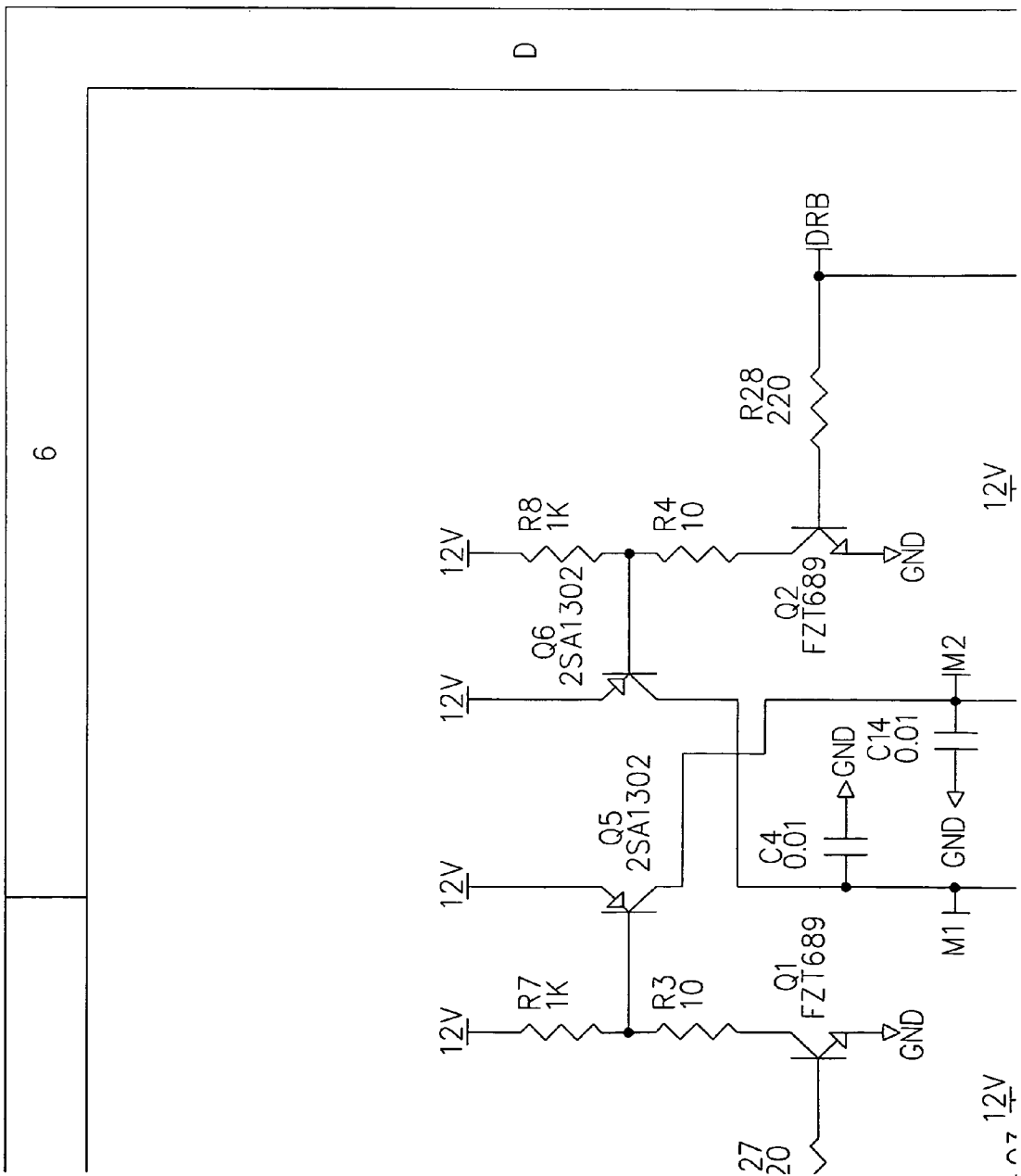
Figure 11:
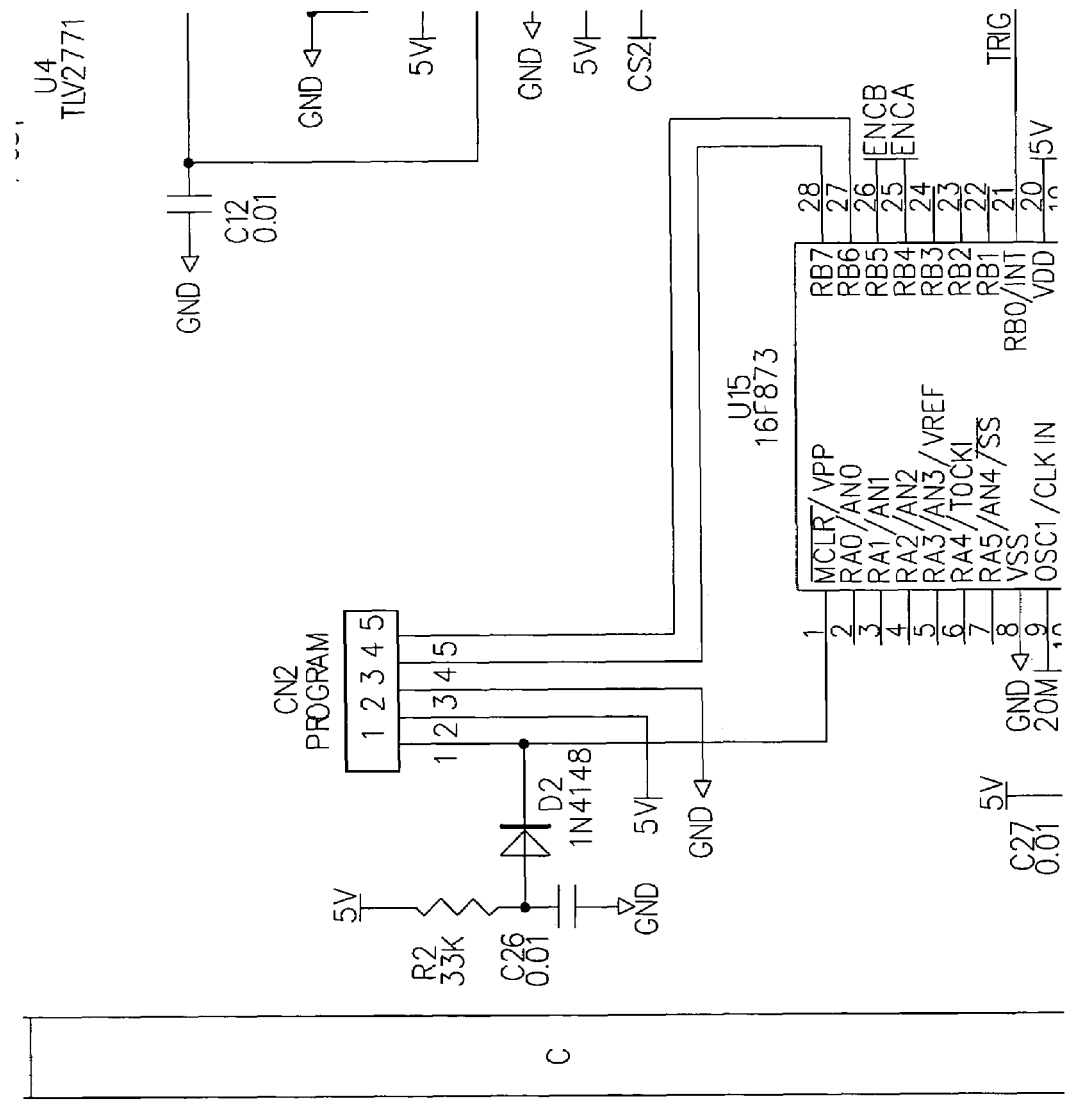
Figure 12:
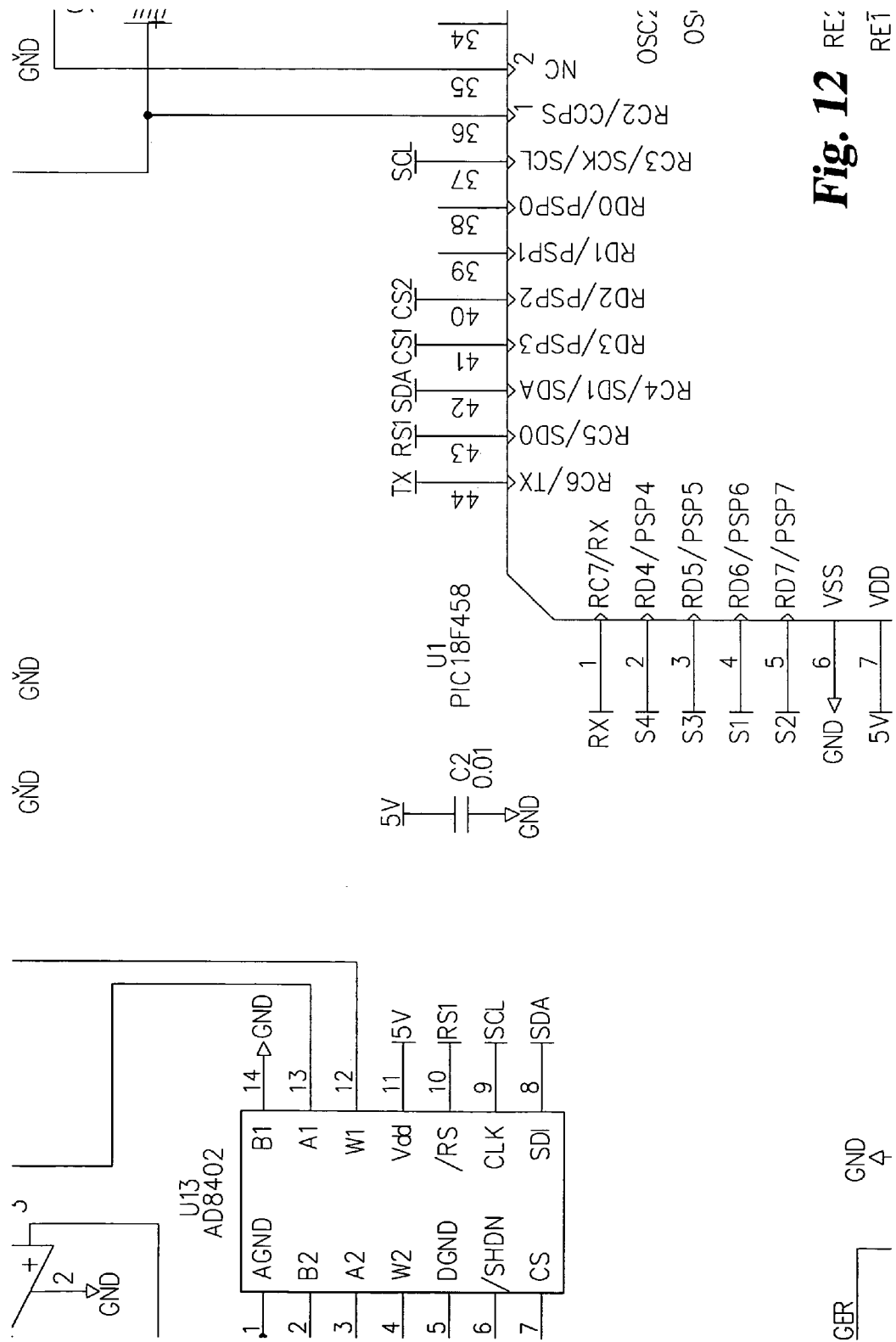
Figure 13:
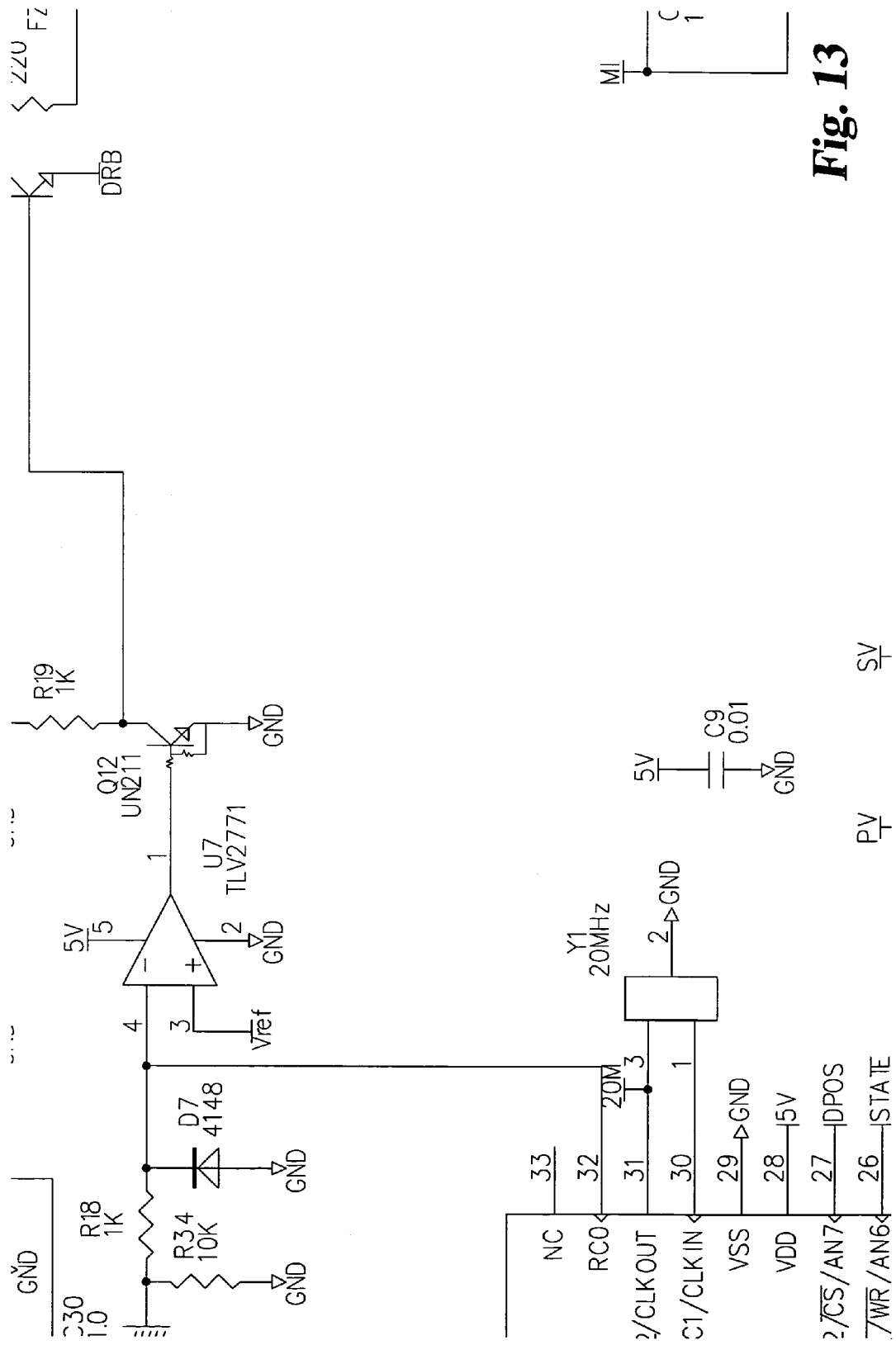
Figure 14:
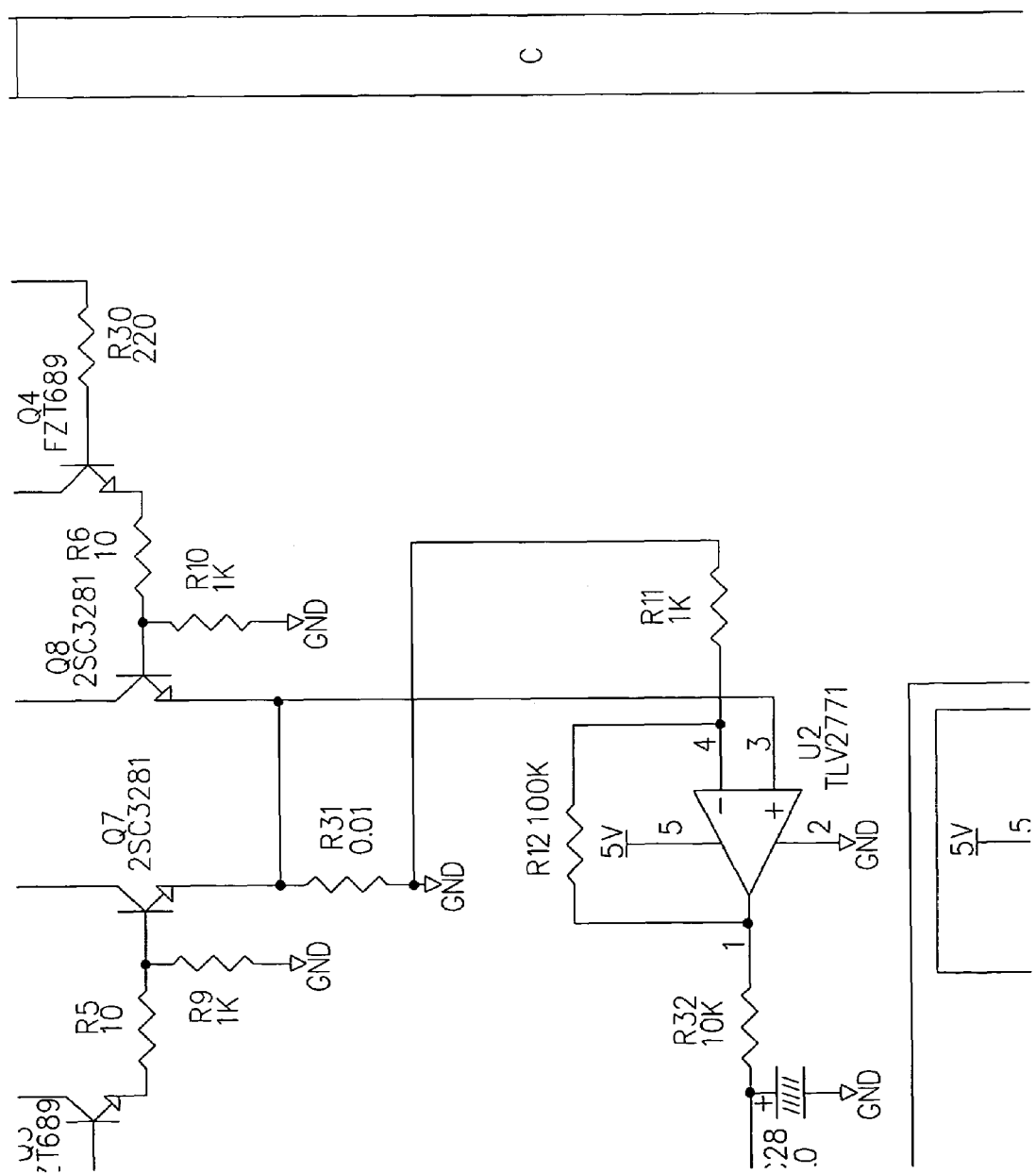
Figure 15:
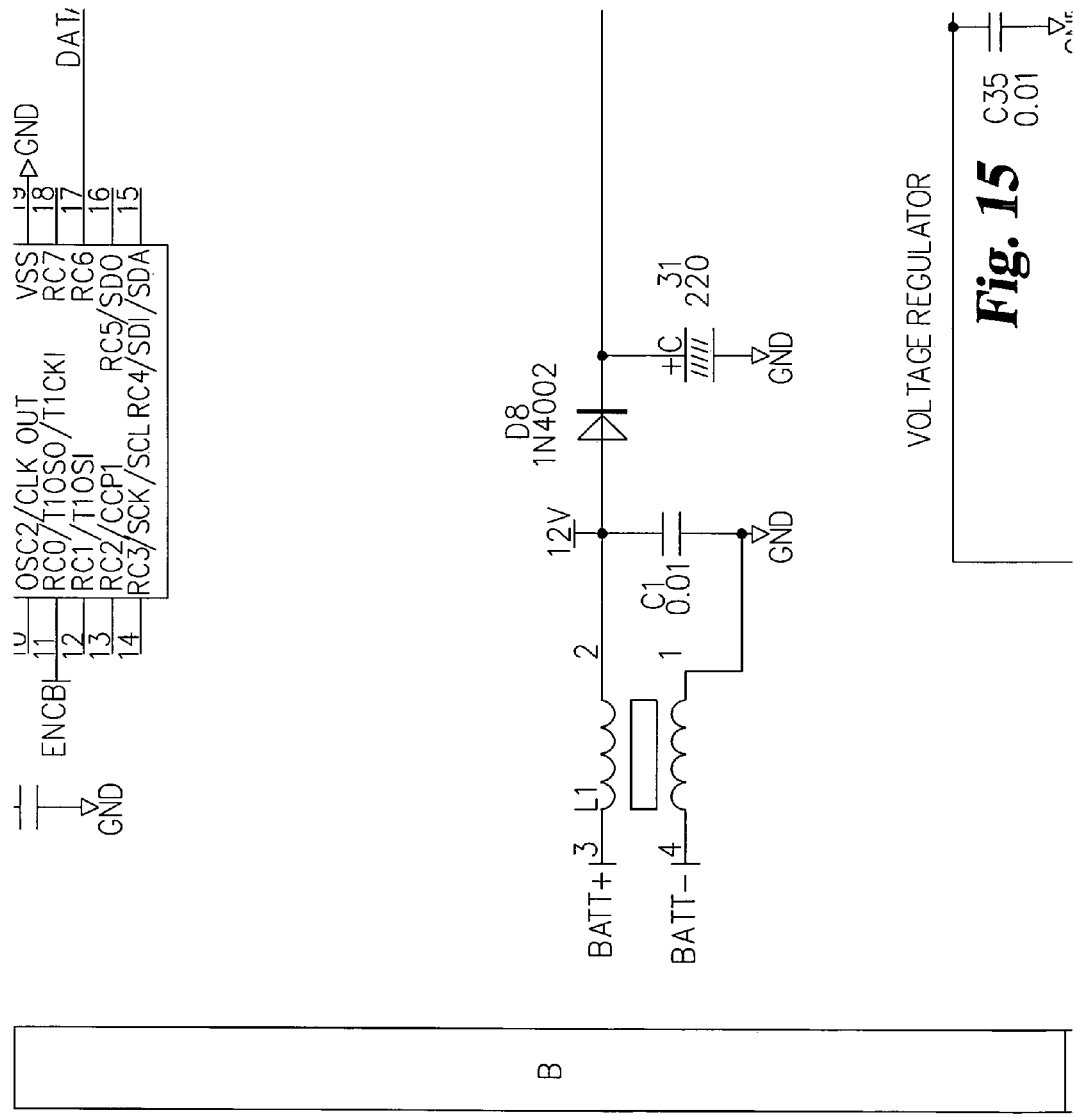
Figure 16:
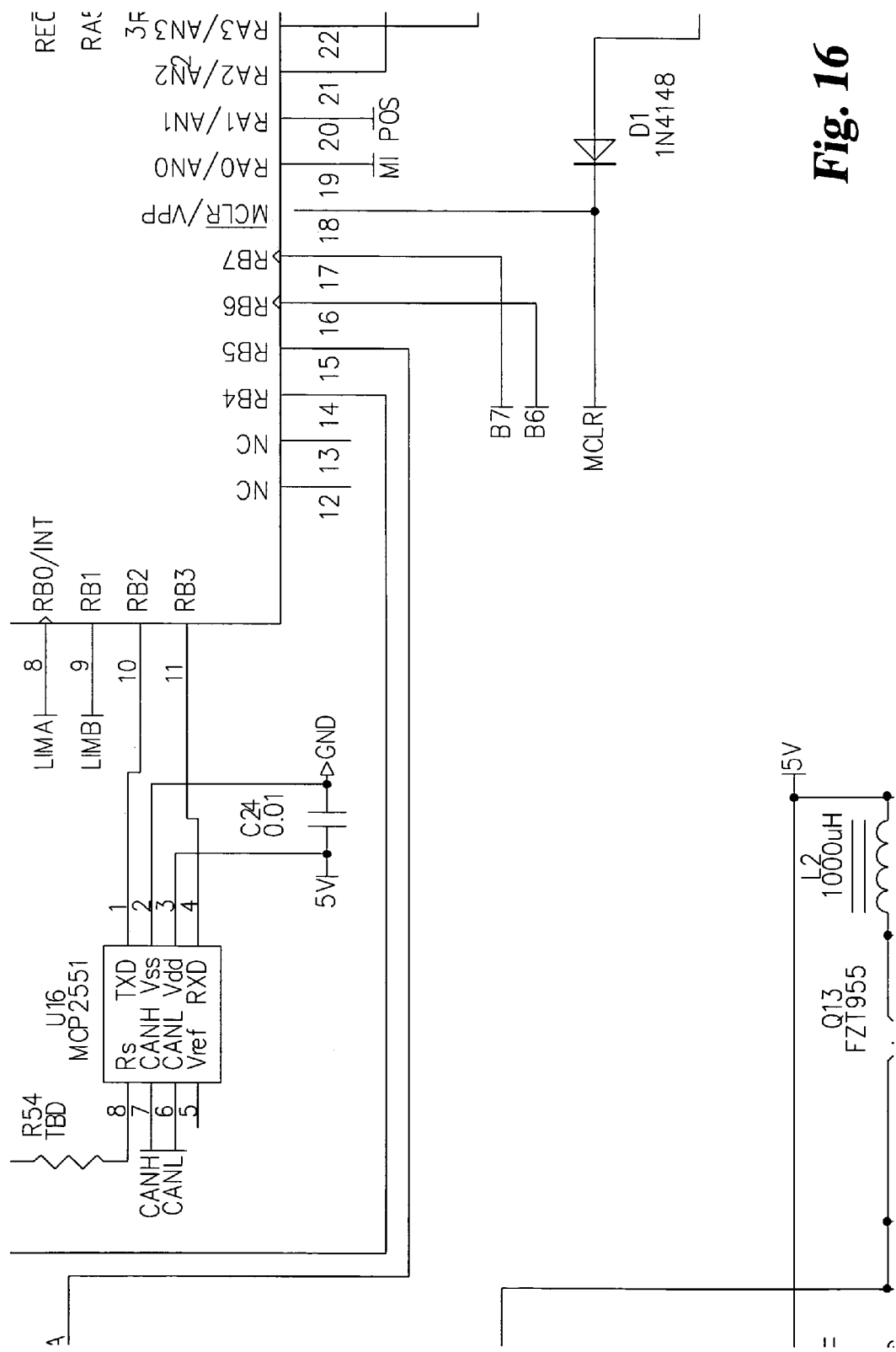
Figure 17:
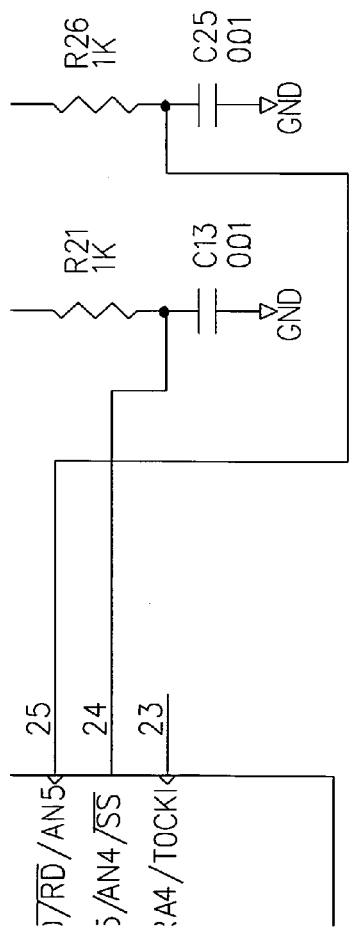
Figure 17:
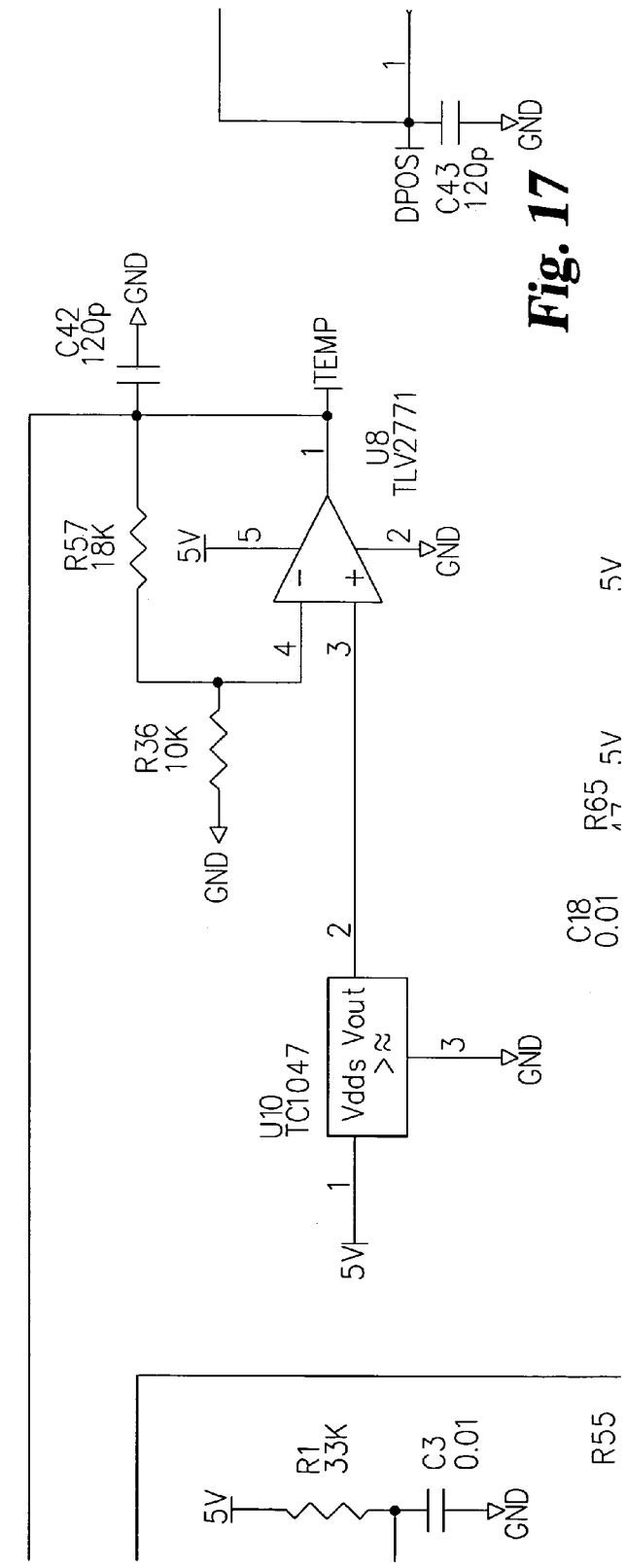
Figure 18:
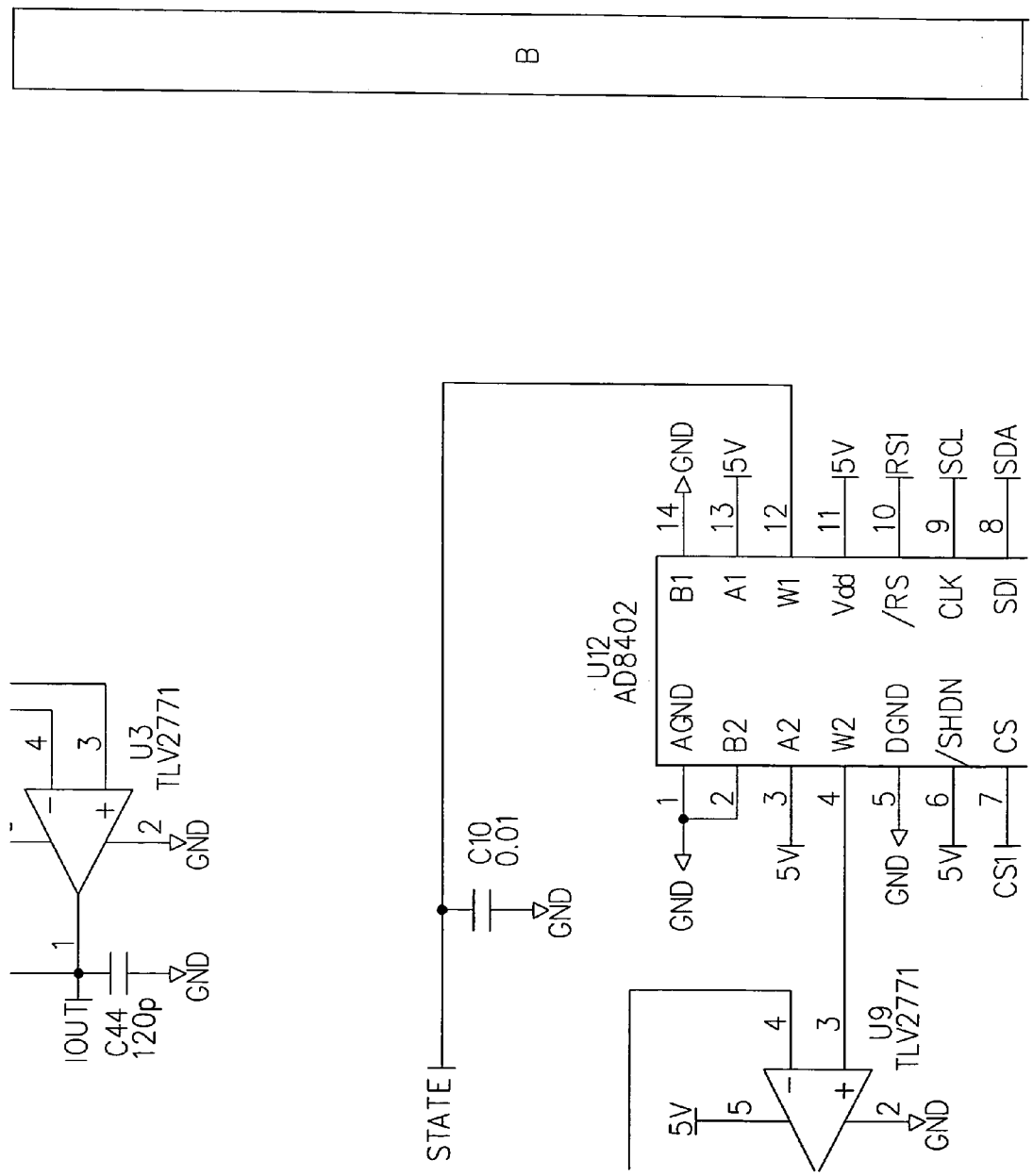
Figure 19:
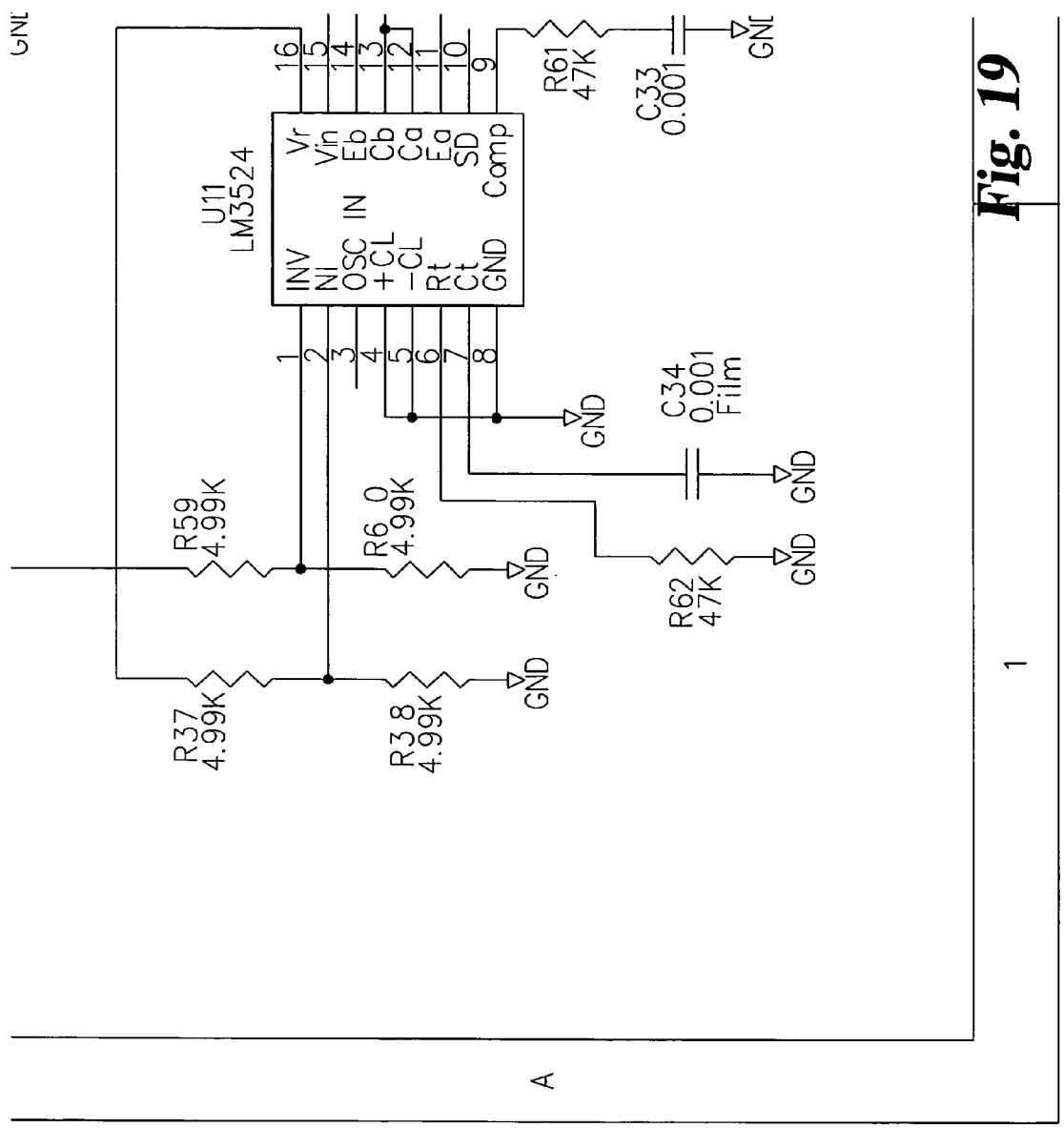
Figure 20:
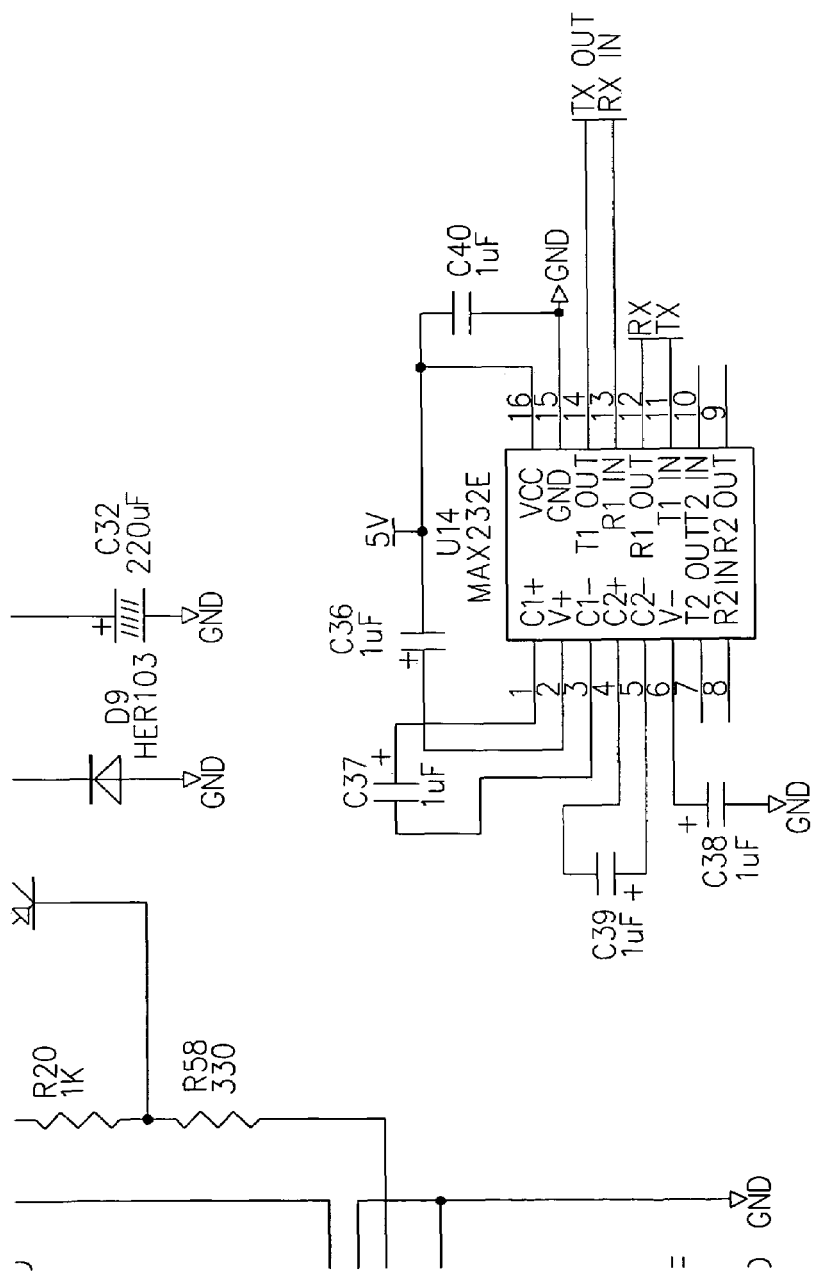
Figure 21:
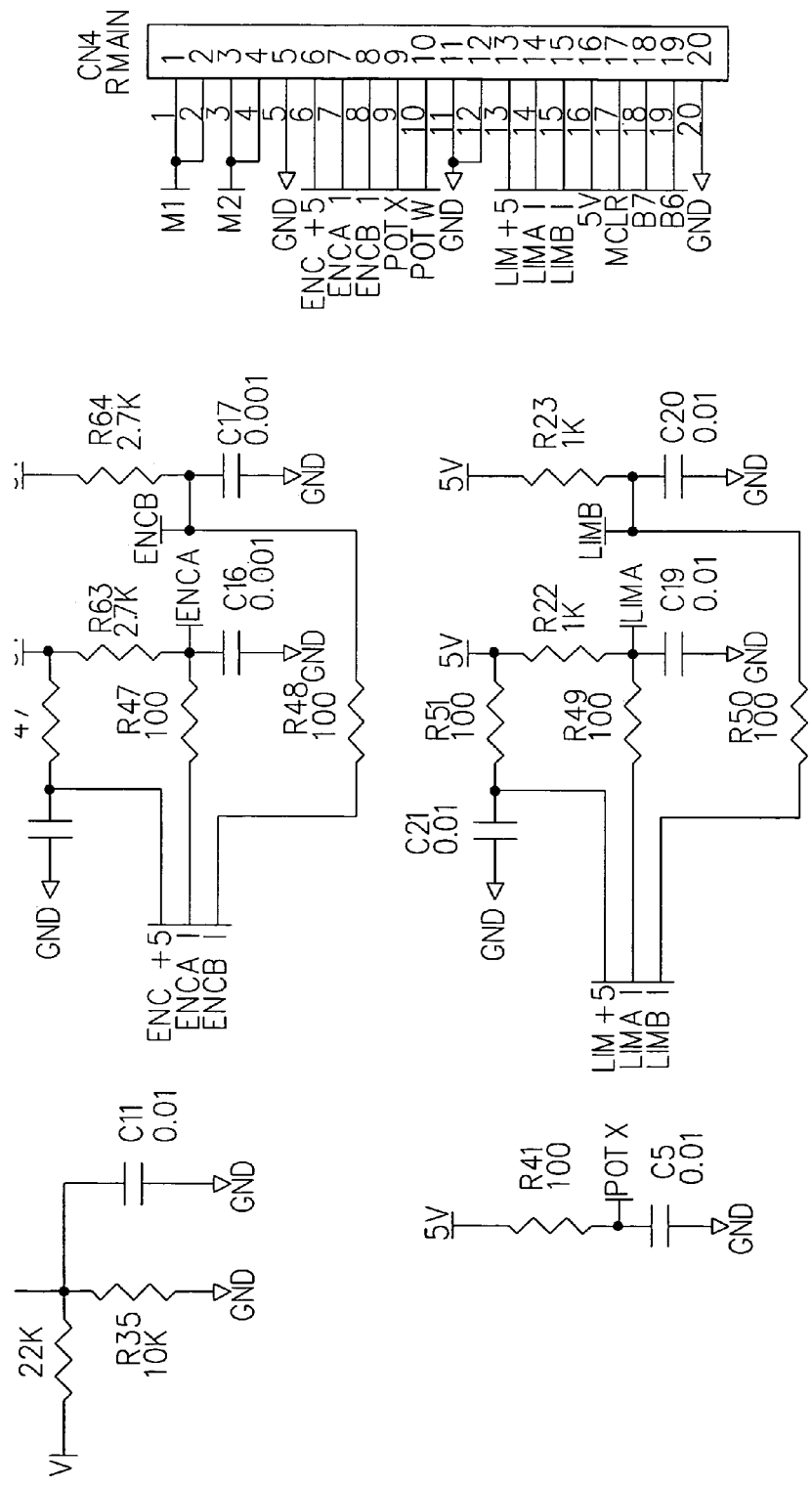
Figure 22:
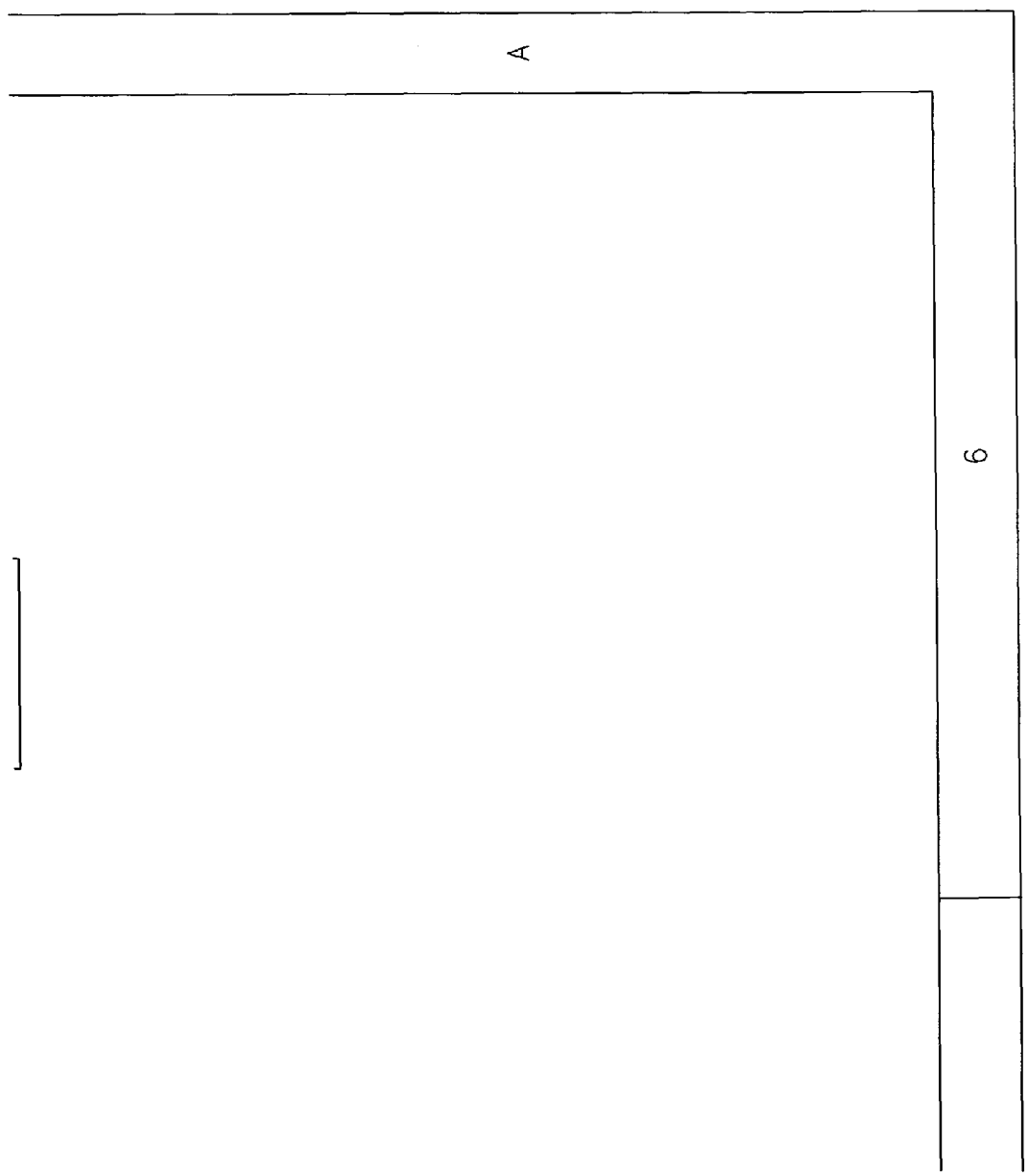

Referring to FIGS. 1, 4 and 5, one configuration of driver control assembly 14 is shown. In the present embodiment, driver control assembly 14 is incorporated directly into the removable steering wheel 65 of the vehicle. Steering wheel 65 includes the outer grip 66, spokes 67, central housing 68, display panel 69, user actuation assembly 70 and steering wheel mounting coupling 71. Coupling 71 is one of a male/female connection ends that permits the steering wheel to be removably locked, in proper angular alignment, with the vehicle's steering column (not shown). Coupling 71 defines a series of pin holes 74 that receive a set of aligned pins upon connection with the steering column to enable data transfer between the switches and readouts of the steering wheel and the various data collection and control units in the rest of the vehicle. The user actuation assembly 70 includes a set of four paddles 75-78 that are mounted at their inboard ends (not shown) at the backside of steering wheel 65, as shown. Paddles 75-78 include appropriate elements, structure and/or characteristics to make them resilient or spring biased so that a driver, with his hands on outer grip 66, can extend one or more fingers behind one or more of paddles 75-78 (as viewed in FIG. 4) and pull it (them) toward the driver (i.e. toward the plane defined by outer grip 66), enough to cause such paddle(s) to actuate an electrical switch(es) (not shown) connected between the paddles and one or more of the spokes 67, central housing 68 and display panel 69. The activation of such electrical switch(es) is transmitted through coupling 71 to control unit 13. Upon release, such paddle(s) through its resiliency or spring bias will return to a rest position where such electrical switch is disengaged. Other embodiments are contemplated where such paddles are constructed and mounted to be pushed and/or pulled as opposed to just pulled. Other switches, dials and/or other user controlled items are located, as desired, on the central housing for easy access by the driver. Output information is provided to the driver via known display elements on display panel 69. Wiring for the various switches, displays and the like provide in steering wheel 66 are routed to one or more circuit boards (not shown) that are safely enclosed within central housing 68 to facilitate assembly and service.

Programming may be provided using any appropriate software or PC kit on a laptop or other PC and by programming any desired operating parameters such as end limits, speed, preset return points, failure modes, etc. The program is then downloaded to the control unit 13 using any appropriate linkage such as, but without limitation a serial or CAN link. In one embodiment, programming for running control unit 13 to control operation of apparatus 10 was written in Ladview, Version 5.1, which is commercially available from National Instruments, Inc., and the code for which is shown in FIGS. 25-34. The PC running such Ladview program can then be connected with control unit 13 to set parameter values and govern its operation.

In one embodiment, apparatus 10 for shifting the center of gravity of a vehicle is programmed to operate as follows:

If the driver, while driving or stationary, feels an adjustment to the vehicle's weight distribution (center of gravity) is desired, he can take one of several actions. He can pull the upper left paddle 75 ("paddle 1"), which causes jackscrew 44 to rotate and push master cylinder piston 42 out, which pulls slave cylinder piston 32 in, which lowers the vehicle at the corner at which the slave cylinder 12 is located and the vehicle's center of gravity is accordingly shifted. Actuation continues until paddle 1 is released or until the limit of travel of master cylinder assembly 11 is reached. Such limit may be reached mechanically by the limits of the various components of apparatus 10, but it is preferable to program such limits into control unit 13. In one embodiment, motor/gearbox assembly 38 is capable of a 0.7 inch throw, but a maximum range of about a 0.34 inch throw is programmed into control unit 13. Even with this small range, in one embodiment, a shift of 40 lbs. from the vehicle corner supplied with the slave cylinder 12 was achieved. If the driver feels he overshot the adjustment, he releases paddle 1 and pulls paddle 76 ("paddle 2"), which rotates jackscrew 44 in the opposite direction, thus extending slave cylinder piston 32 and raising the vehicle at the corresponding corner. The programming further provides for a "home" position. That is, should the driver wish to return to a designated default or home position, the driver simply has to pull both paddles 1 and 2, whereupon control unit 13 automatically returns slave cylinder 32 to its preprogrammed home position.

It is contemplated that the maximum range, home position and other limits, ranges, and automatic operations can be modified through the programming of the control unit by hard wire connection (i.e. in the pits), through wireless access (i.e. by the pit crew while the driver is racing), or even by the driver while racing. In the latter case, the driver may find an ideal position and may want to set that as the new home position. In such case the system could be set up to enter the new home setting by pulling all four paddles at once, or by pulling just the bottom two paddles 77 and 78 ("paddle 3" and "paddle 4", respectively). Other combinations are contemplated, as well. Alternatively, a separate switch may be provided on the central housing 68 or elsewhere inside or outside the vehicle, as desired, to enable a change in home position.

Paddles 3 and 4 may be programmed to two pre-programmed positions using the Ladview software (or any similar appropriate software). Alternatively, paddles 3 and 4 could be taught a new setting. For example and without limitation, the driver may find a certain setting is optimum upon entering turn 1 and another setting is optimum upon exiting turn 2. Control unit 13 may be programmed to "remember" a setting upon pulling and holding paddle 3 for five seconds, for example. Thereafter, upon entering turn 1 the driver need only pull paddle 3 to engage its switch, which would cause control unit 13 to move the slave cylinder(s) to the remembered position. Paddle 4 would be similarly taught to remember a desired setting (i.e. when the driver finds a desired setting upon exiting turn 2). In this way, the unit can be used to quickly adjust the car to adapt to both ends of a very different racetrack, for example. Using the car's serial or CAN Link, and some manner of initial and/or periodic position sensor (such as an infrared light crossing the track at a specific place and a sensor mounted in the car), control unit 13 could be directed to automatically adjust slave cylinder 12 based on track position.

Figure 23:
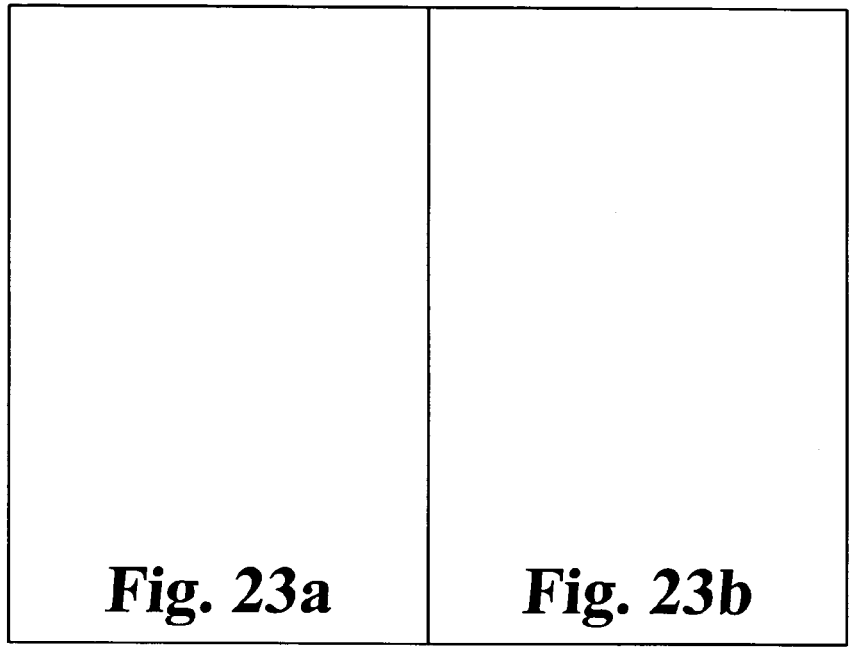
FIG. 23 is a layout view showing the orientation of the partial views shown in FIGS. 23a-23b.
Figure 24:
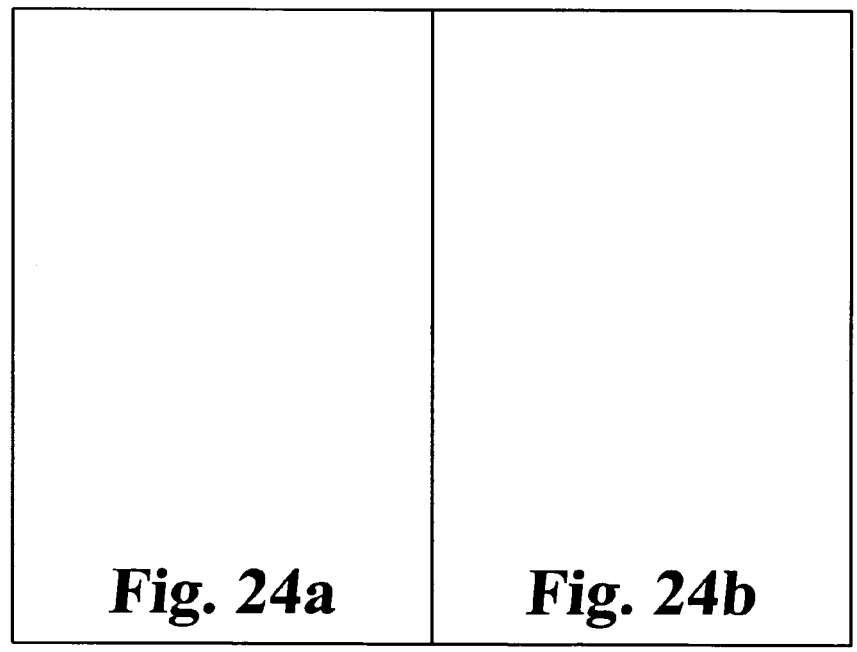
FIG. 24 is a layout view showing the orientation of the partial views shown in FIGS. 24a-24b.
Figure 23A:
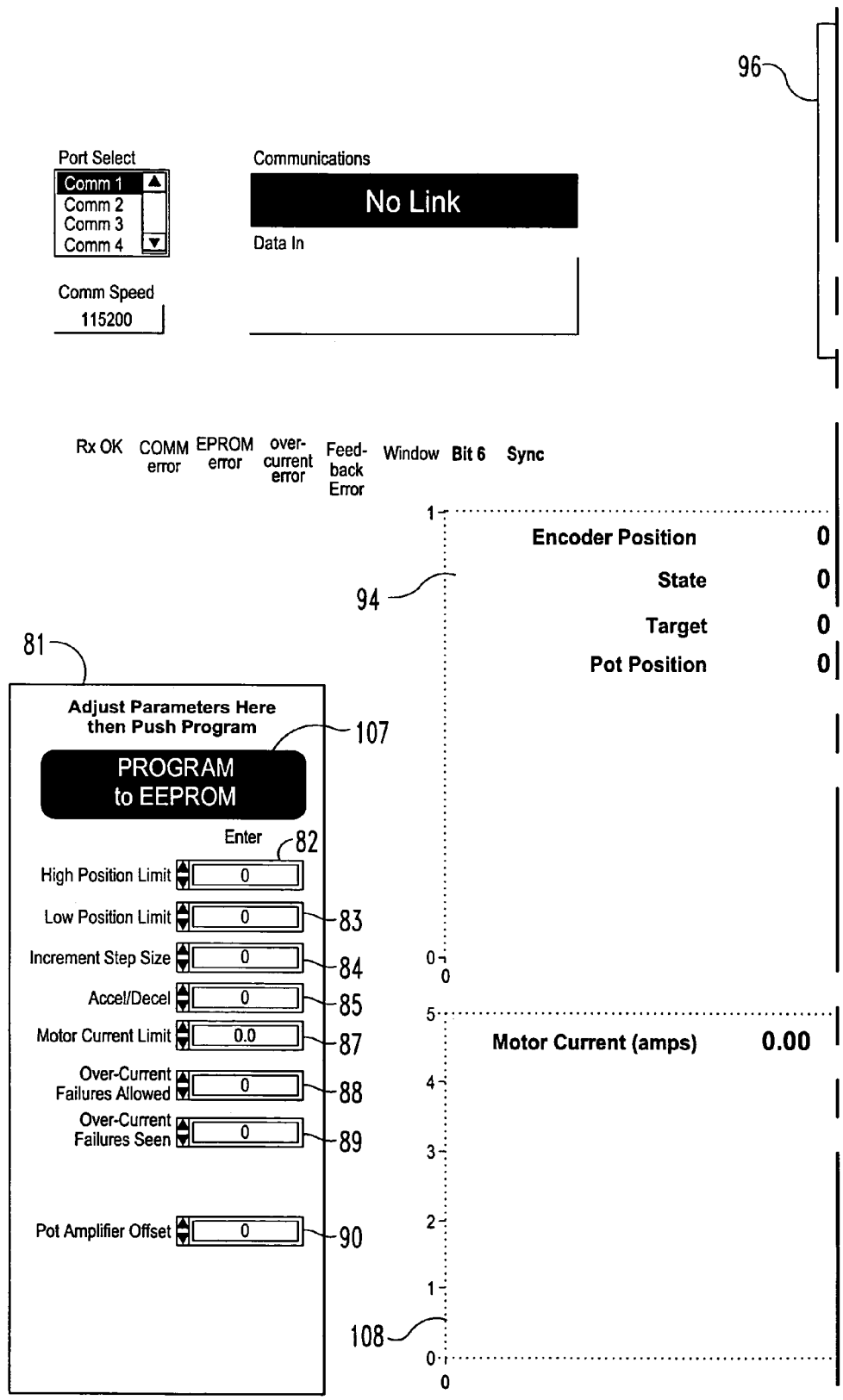
FIGS. 23a-23b together show a computer screen shot showing the user interface for configuring the program shown in FIGS. 25 through 35, inclusive.
Figure 23B:
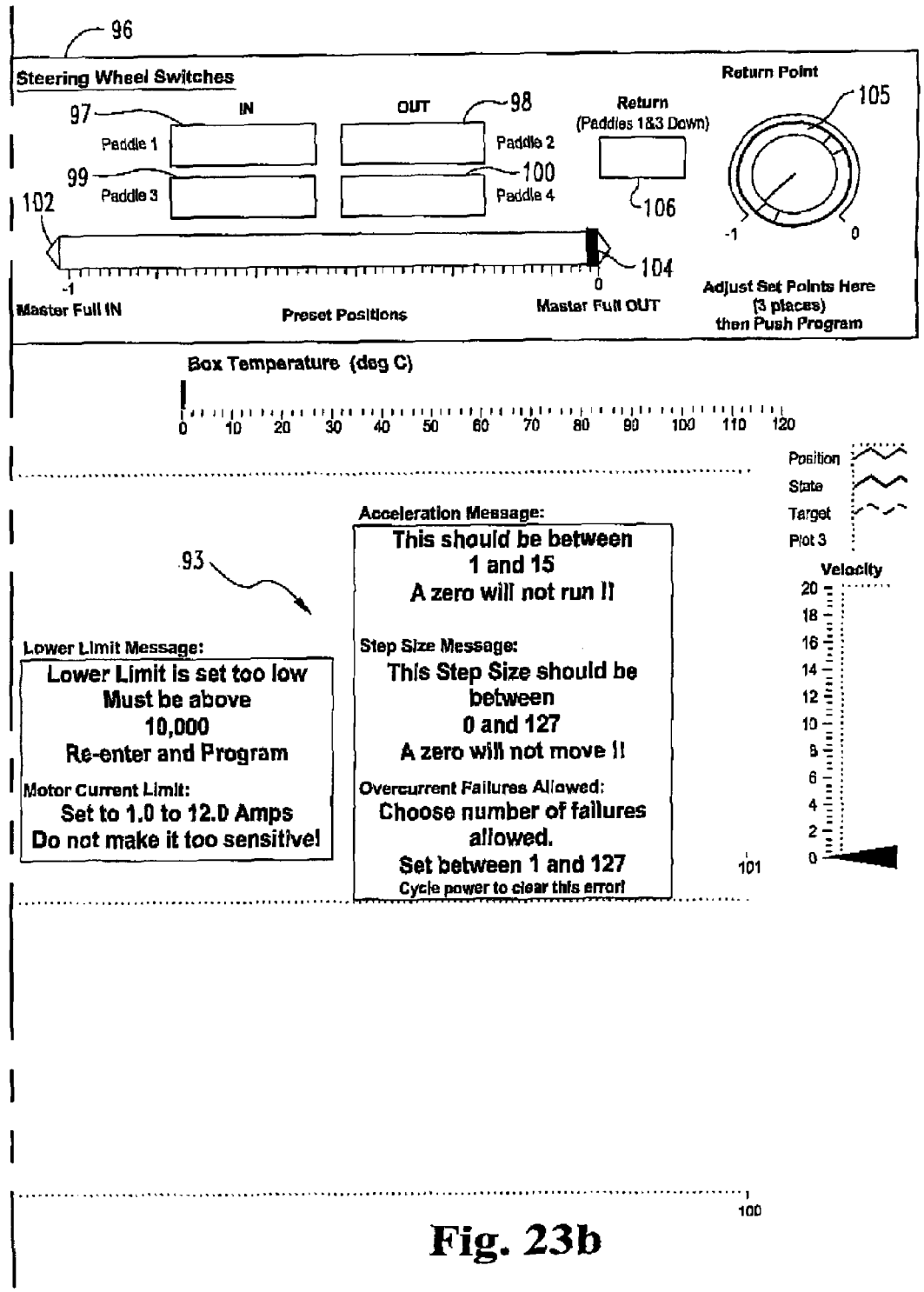
Figure 24A:
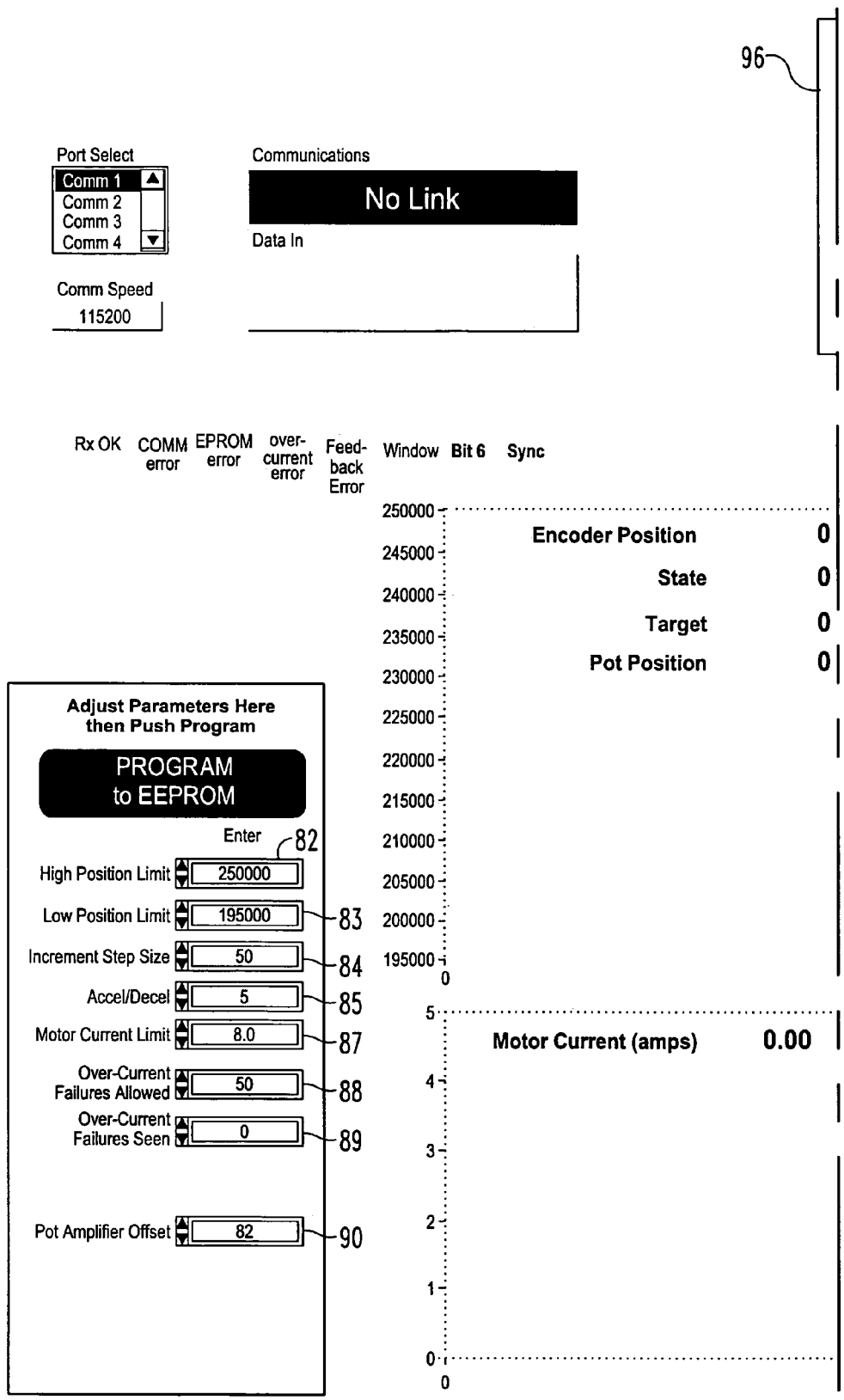
FIGS 24a-24b together show the computer screen shot of FIG. 23, but showing operation parameters entered into certain fields.
Figure 24B:
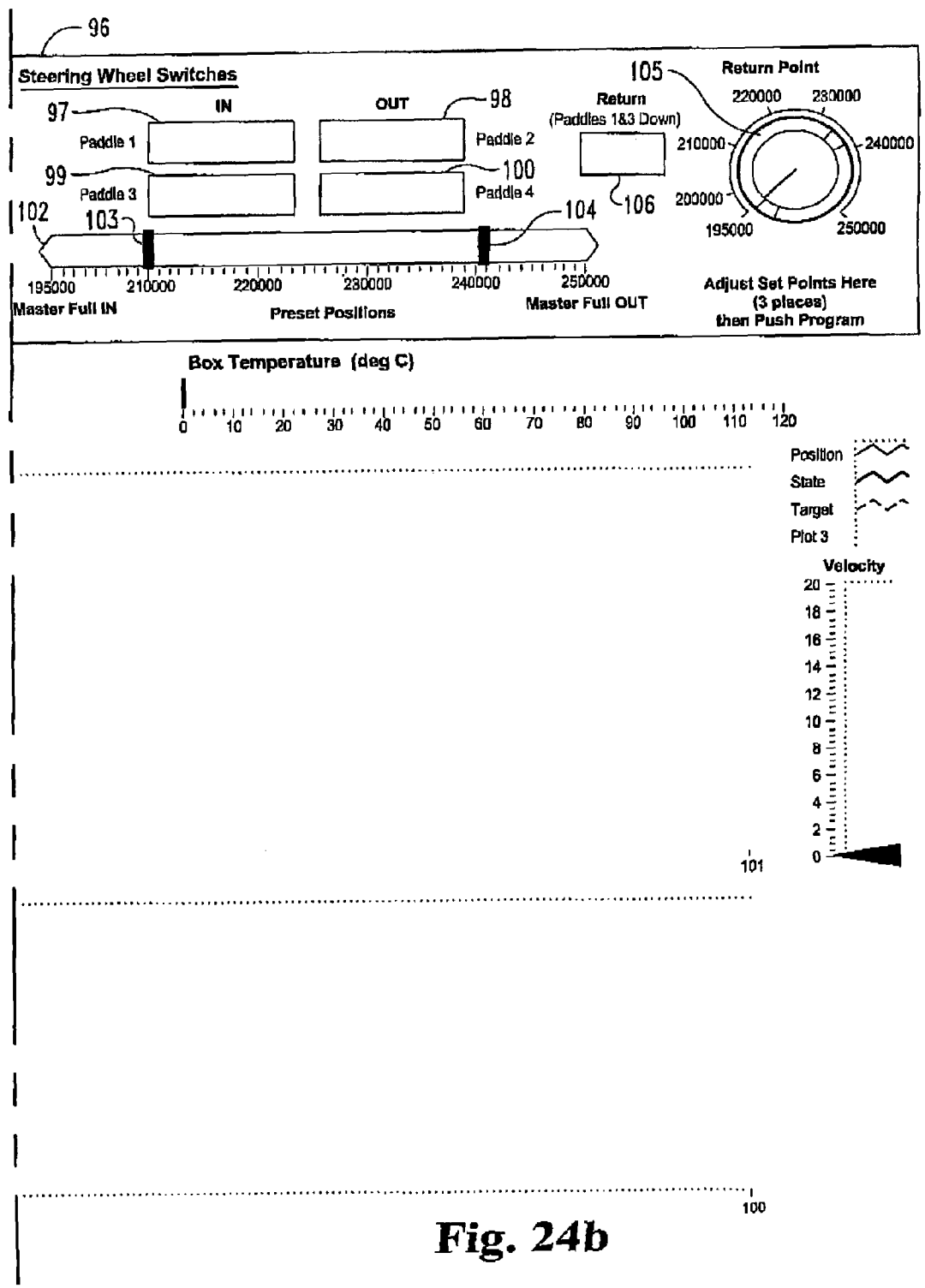
Figure 25:
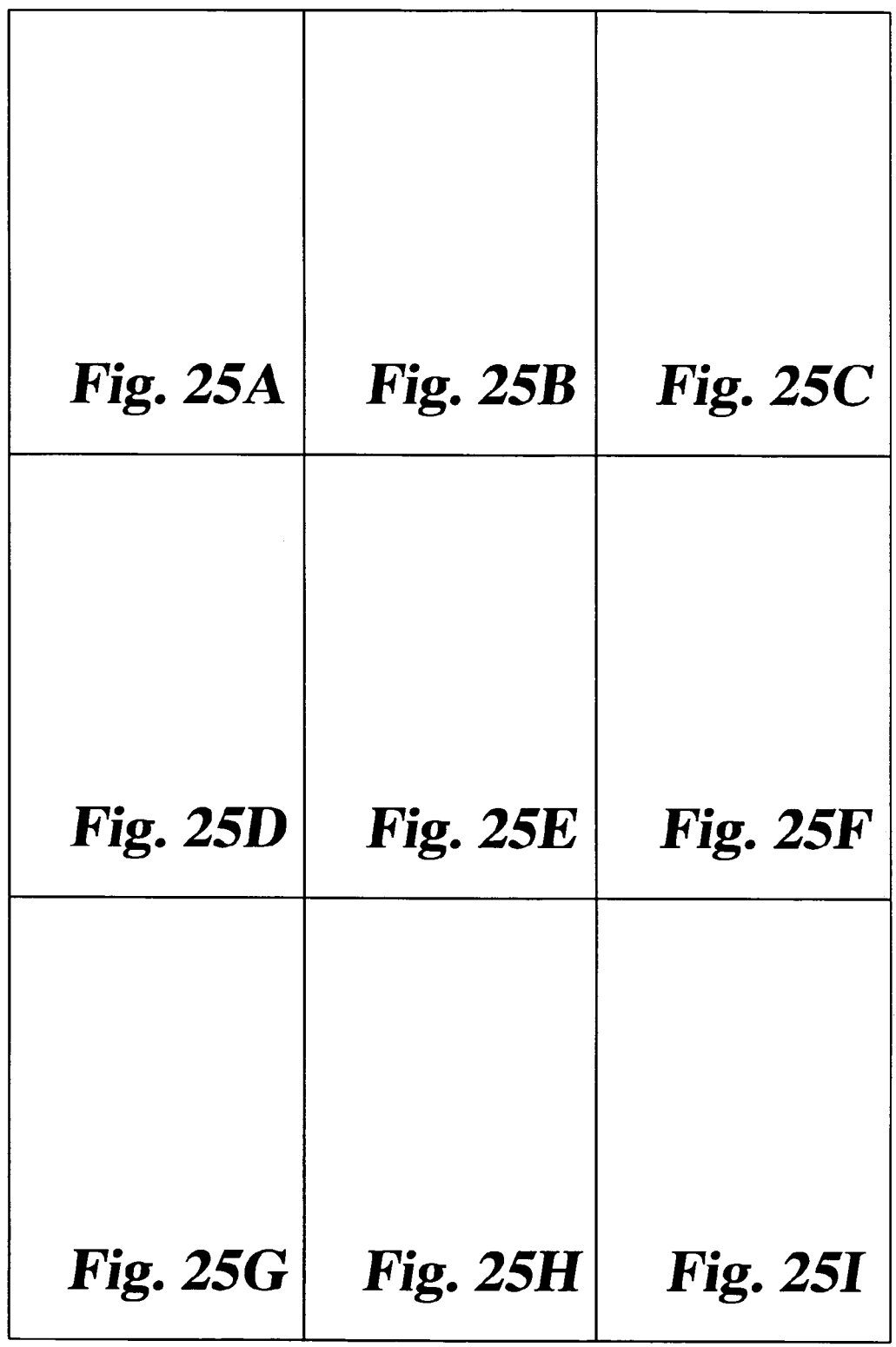
FIGS. 25, 26, 27, 28, 30. 31, 32, 33 and 34 are layout views showing the orientation of the corresponding partial views shown in FIGS. 25A-25I, 26A-26B, 27A-27I, 28A-28I, 30A-30I, 31A-31B, 32A-32I, 33A-33I and 34A-34I.
Figure 25A:
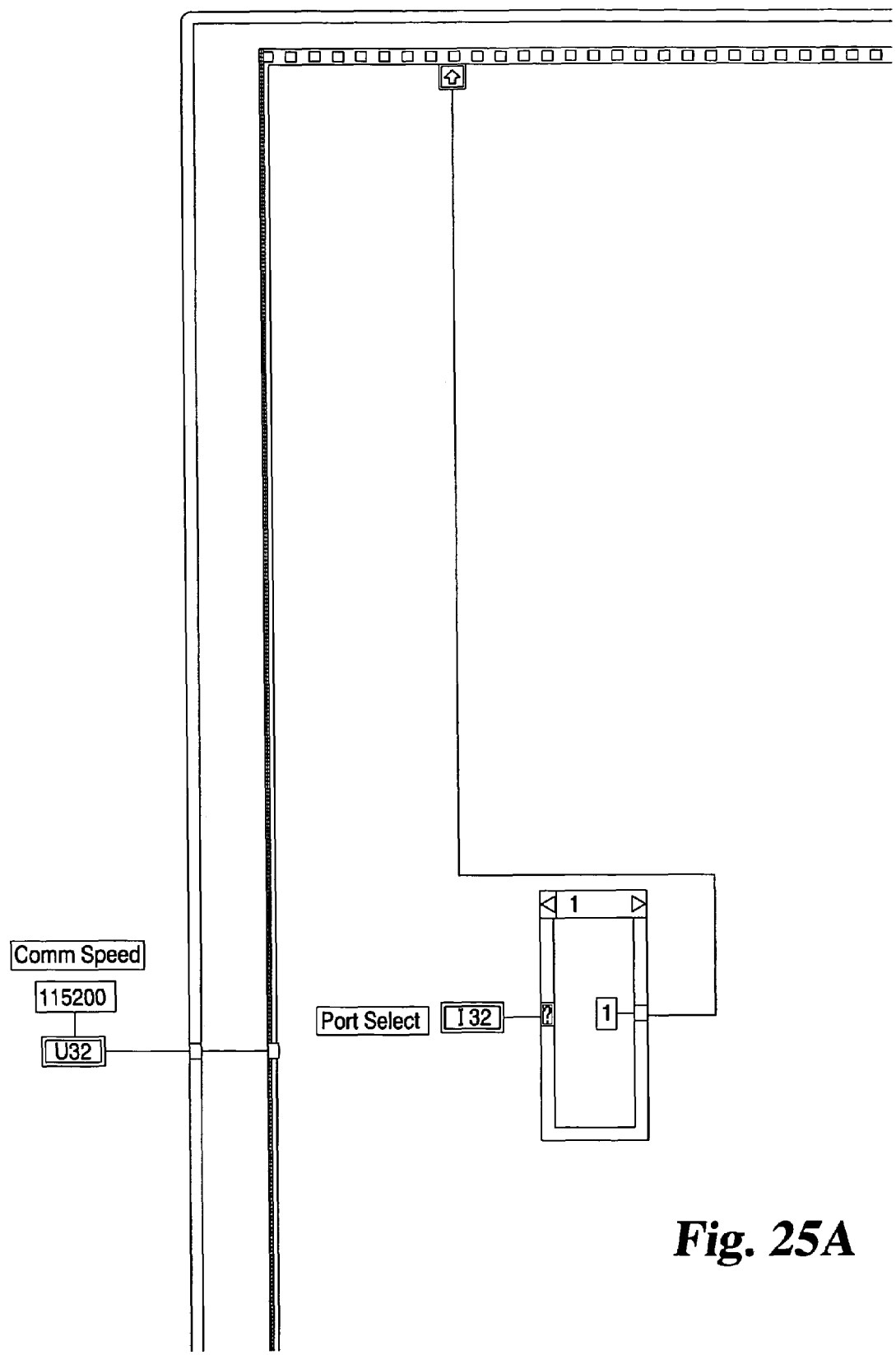
Figure 25B:
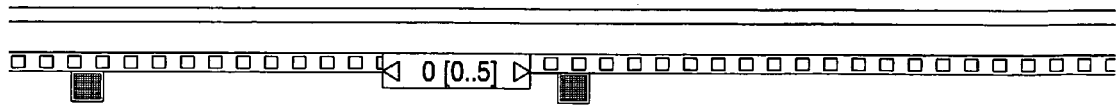
Figure 25C:
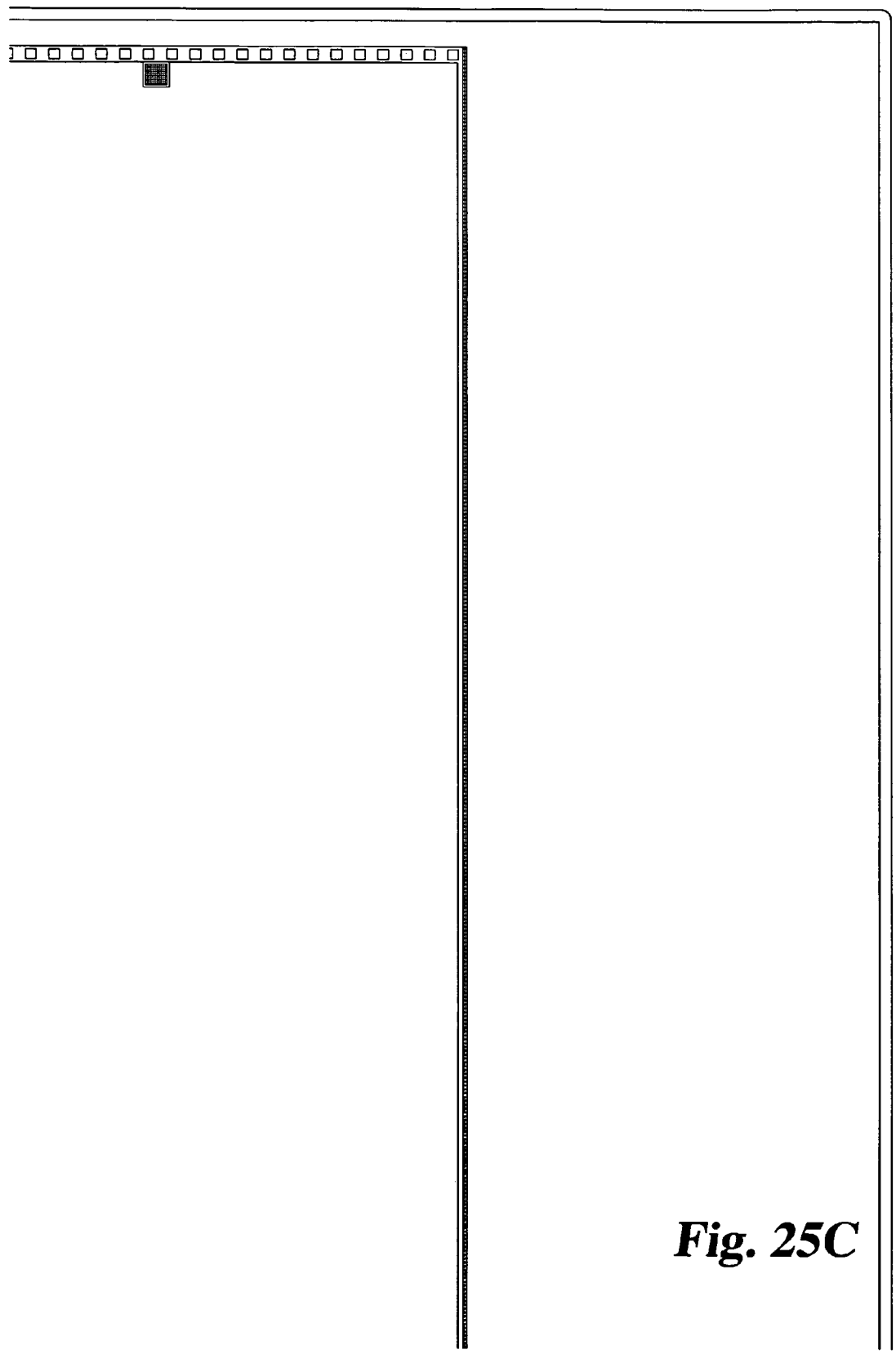
Figure 25D:
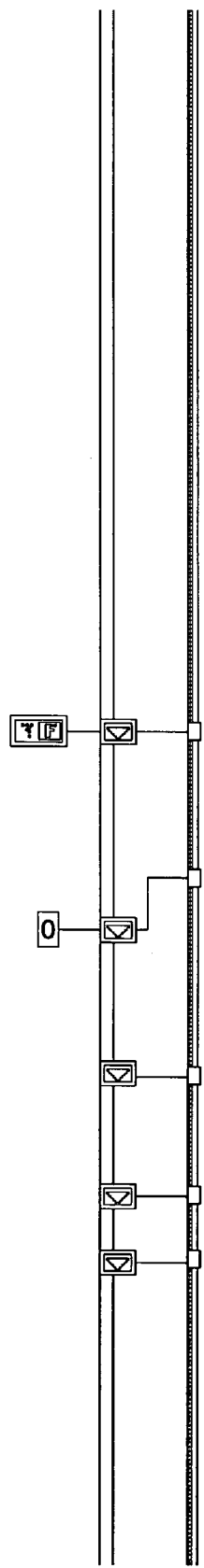
Figure 25F:
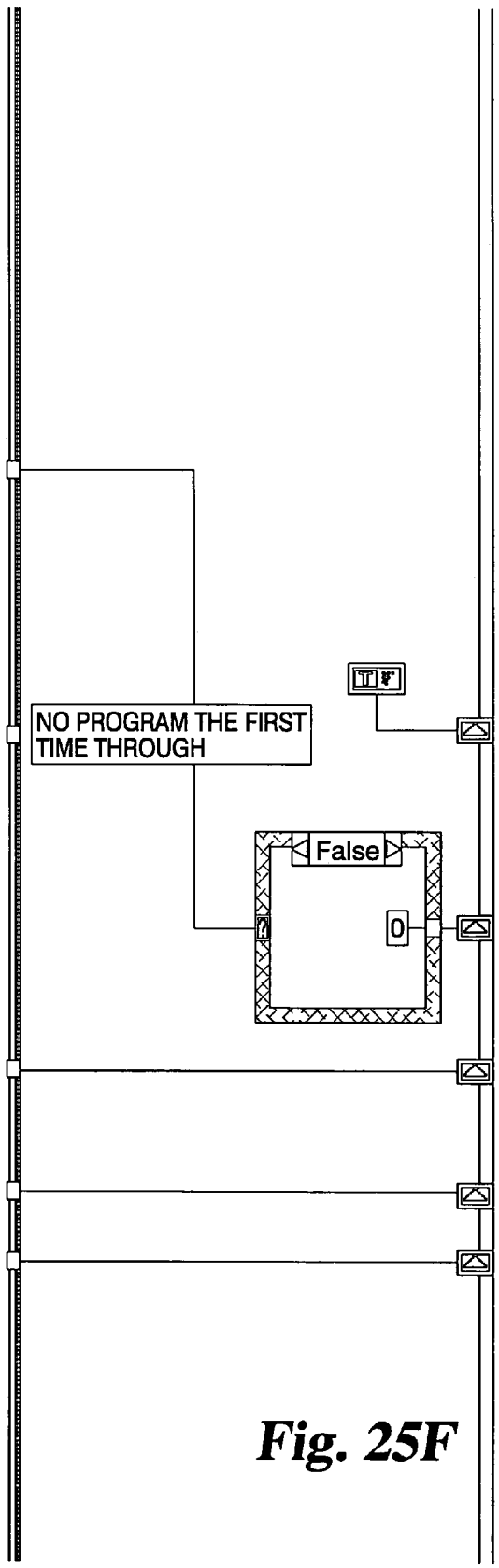
Figure 25G:
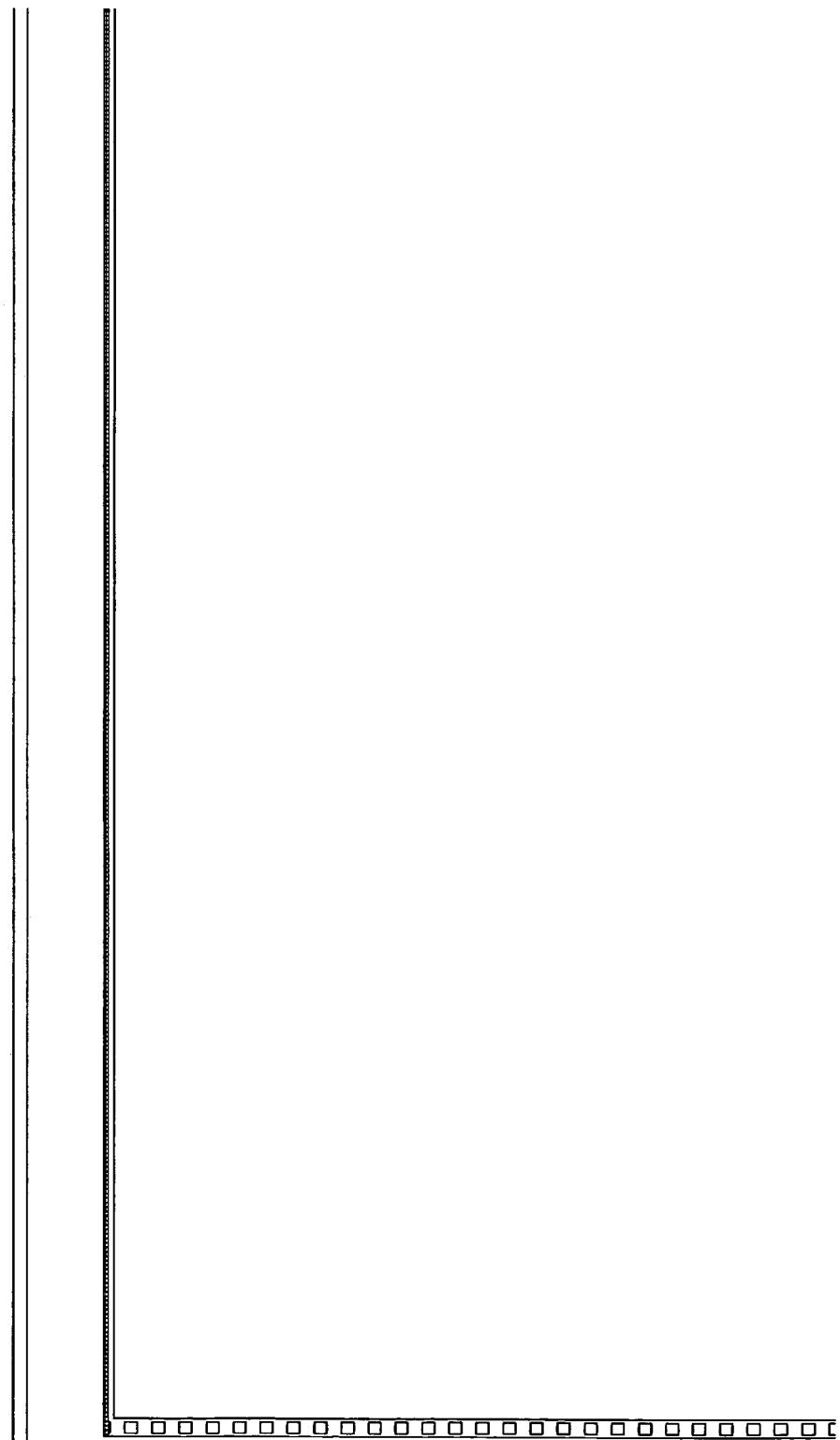
Figure 25H:
Figure 25I:
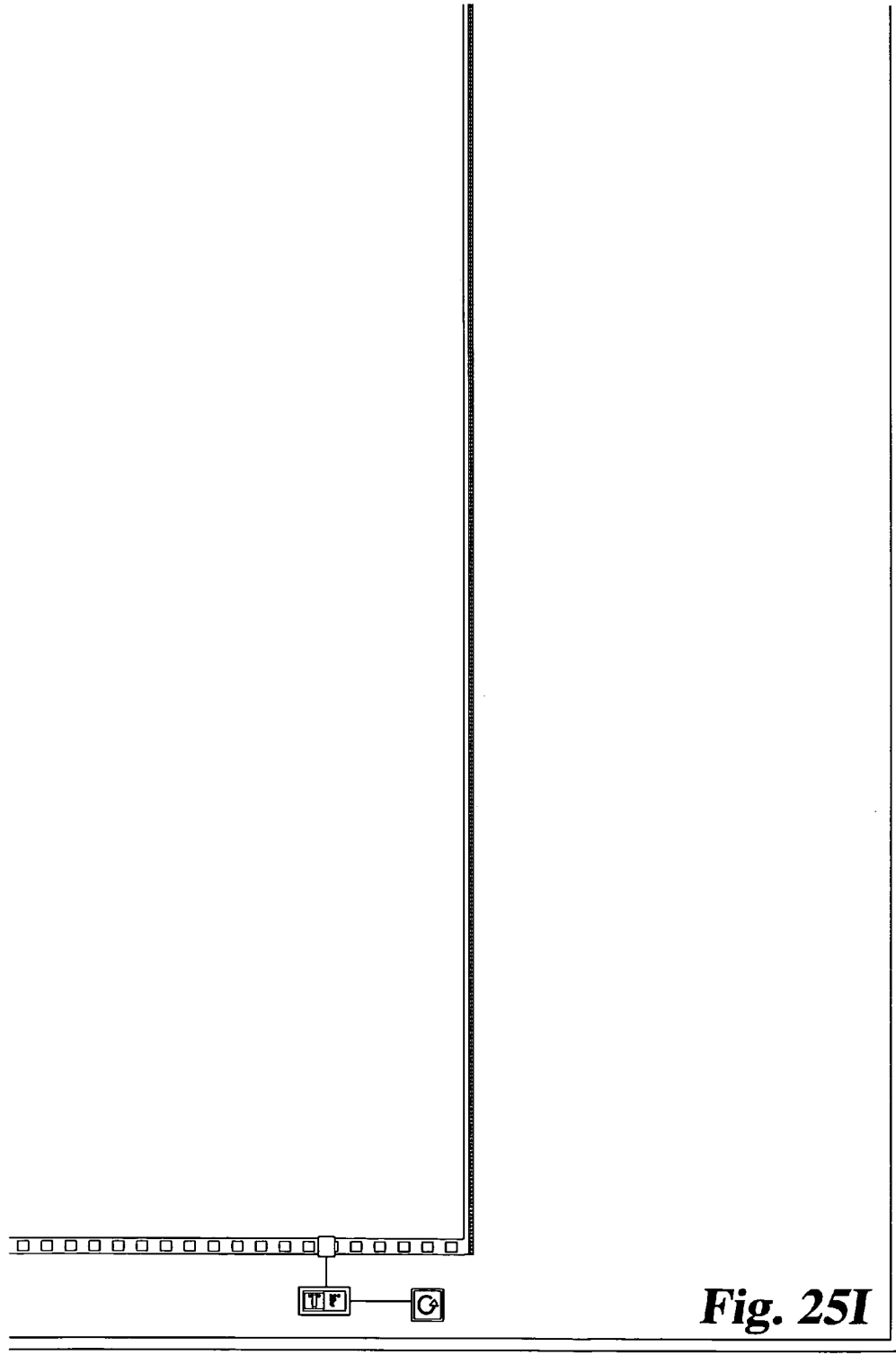
Figure 26:
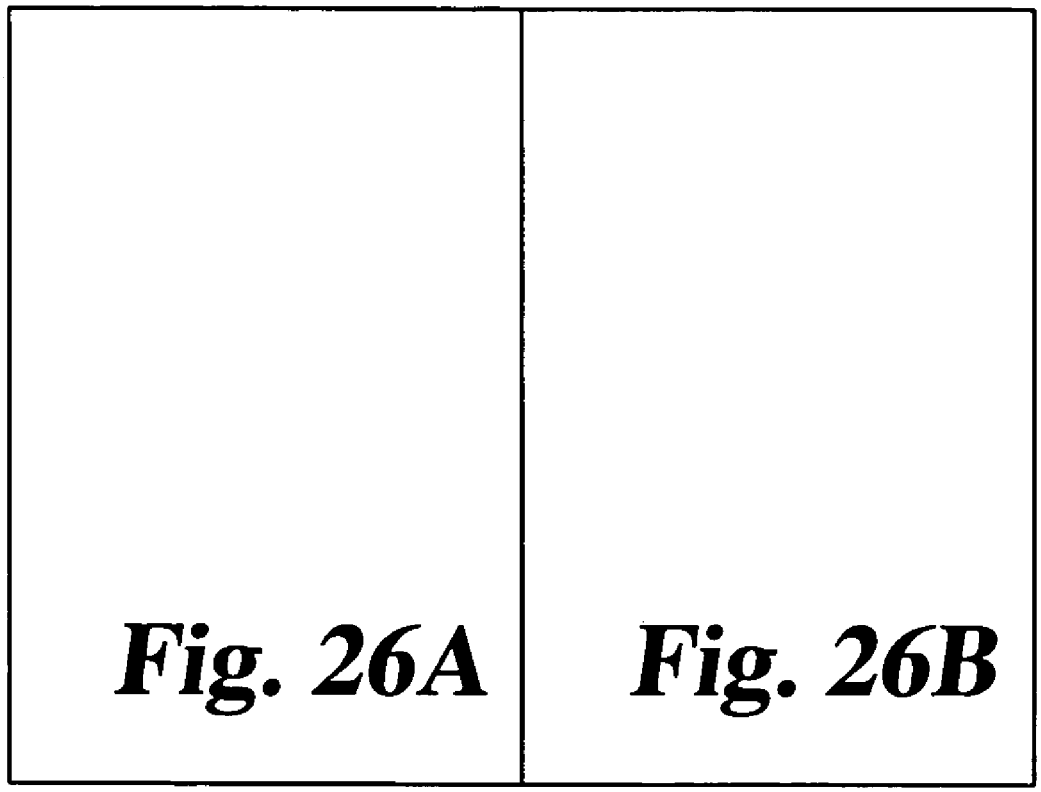
Figure 26A:
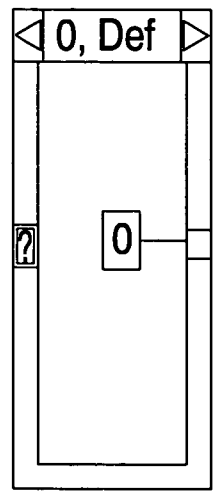
FIGS. 26A-26B are partial views which show, in combination, the second page of the diagram (code) of the computer program referenced in FIGS. 25A-25I.
Figure 26A:
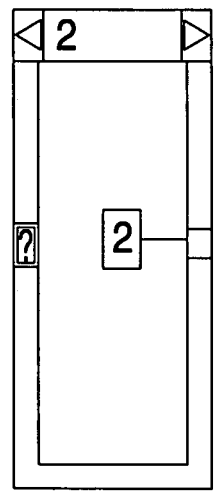
Figure 26A:
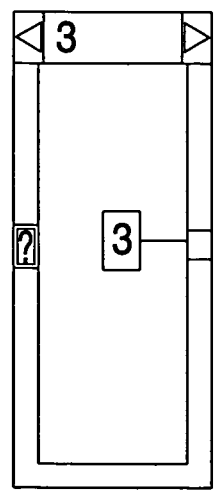
Figure 26B:
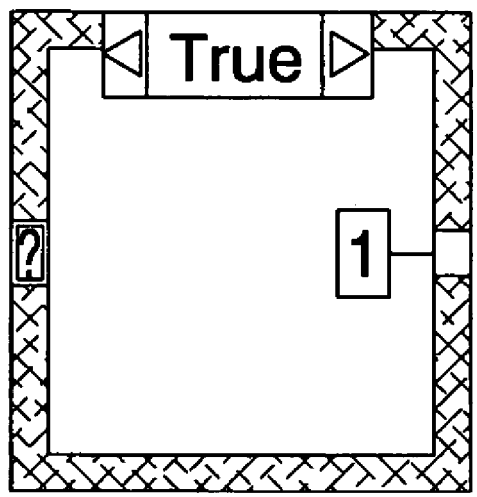
Figure 27:
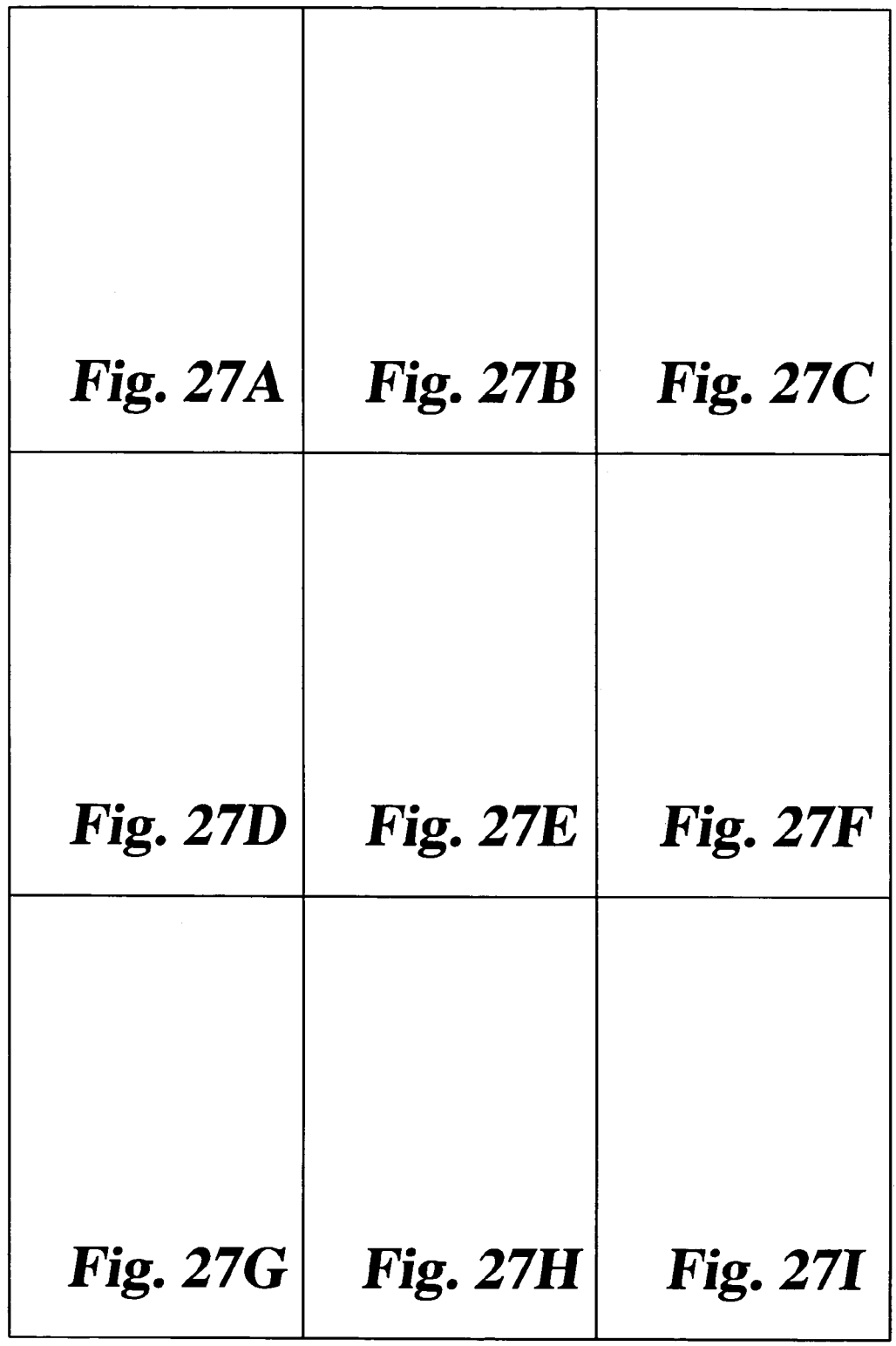
Figure 27A:
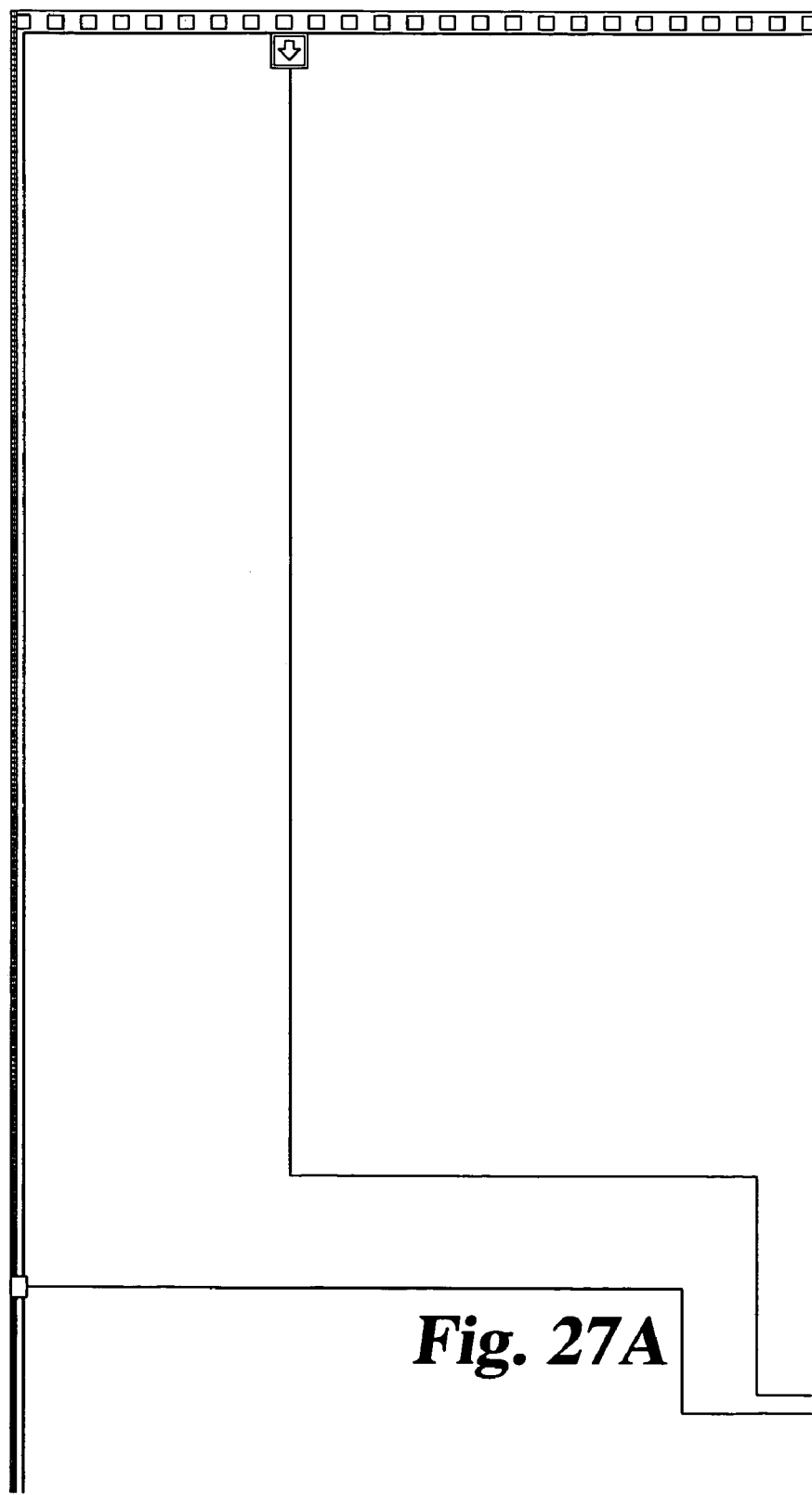
FIGS. 27A-27I are partial views which show, in combination, the third page of the diagram (code) of the computer program referenced in FIGS. 25A-25I.
Figure 27B:
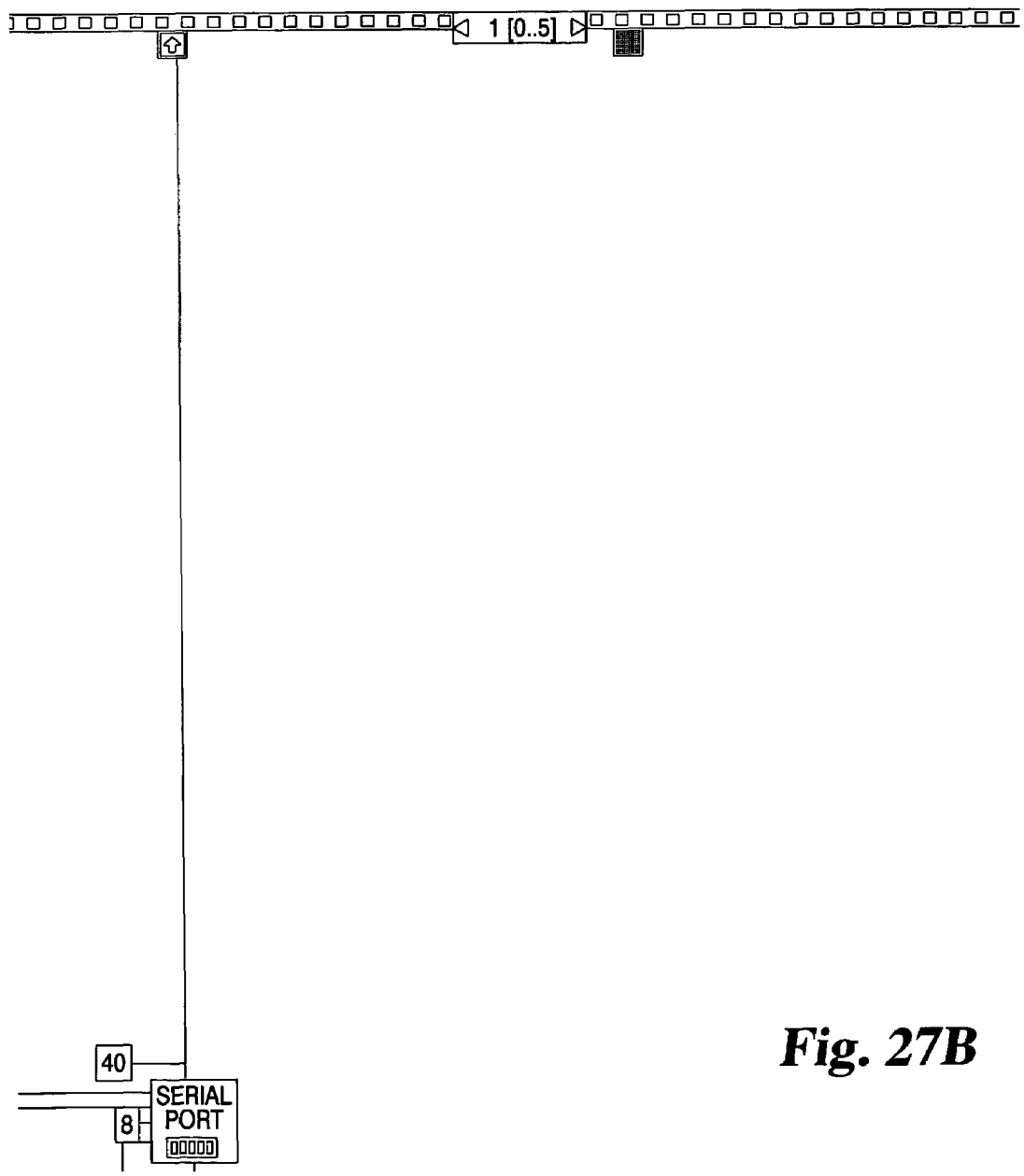
Figure 27C:
Figure 27D:
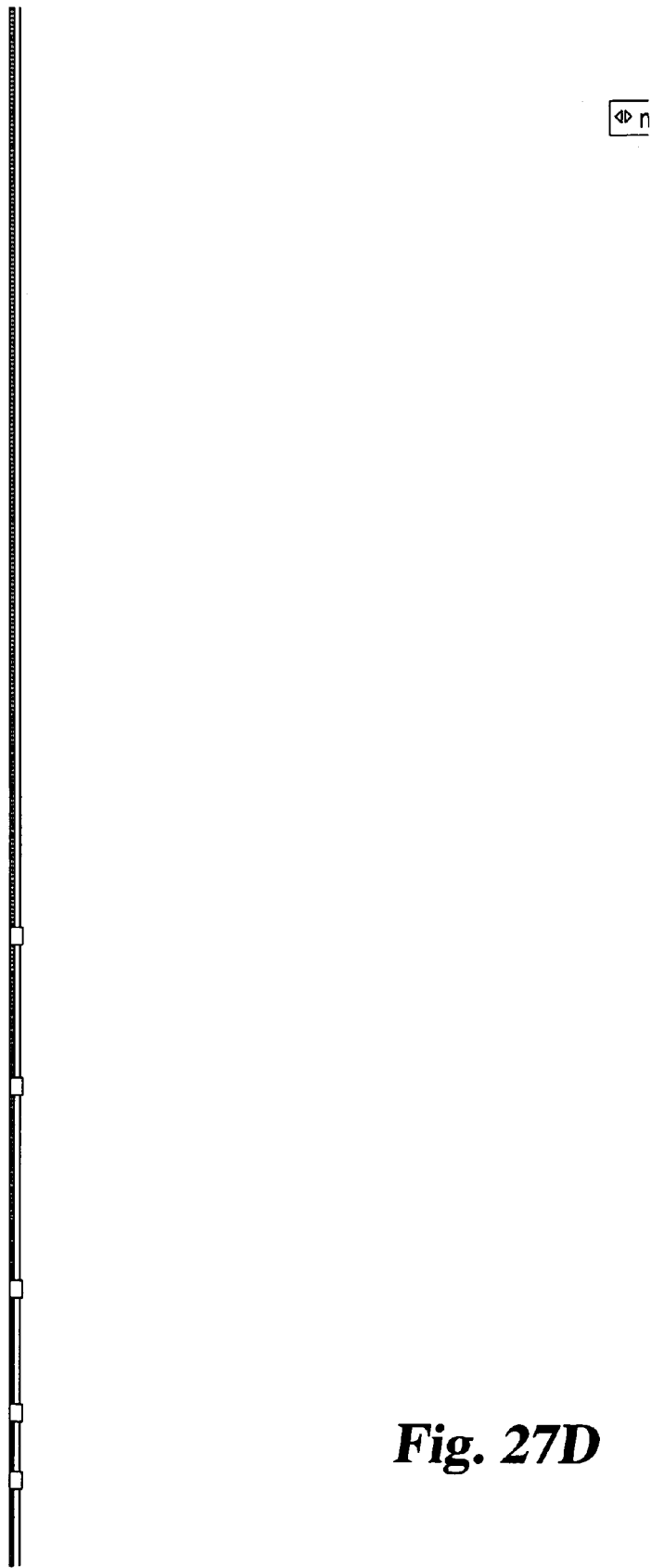
Figure 27E:
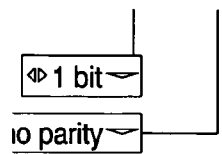
Figure 27F:
Figure 27G:
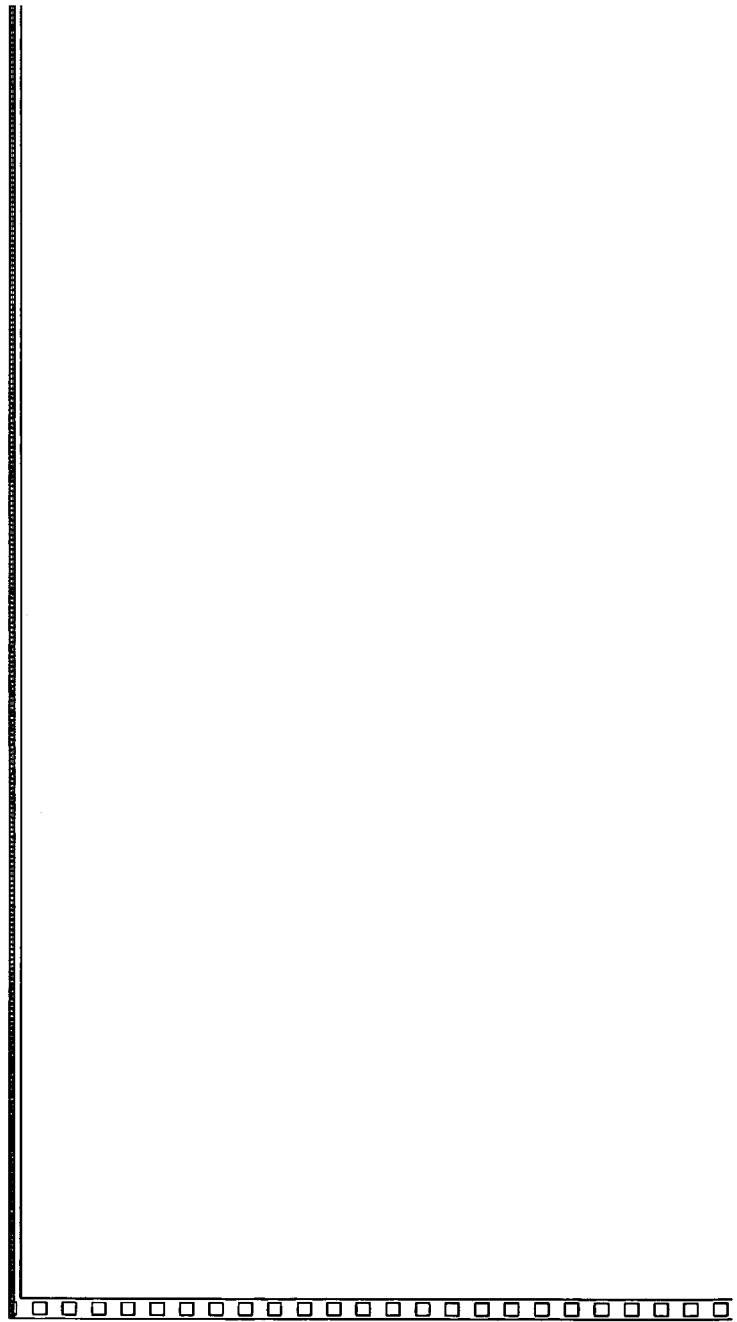
Figure 27H:
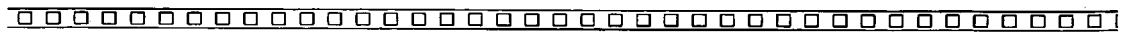
Figure 27I:
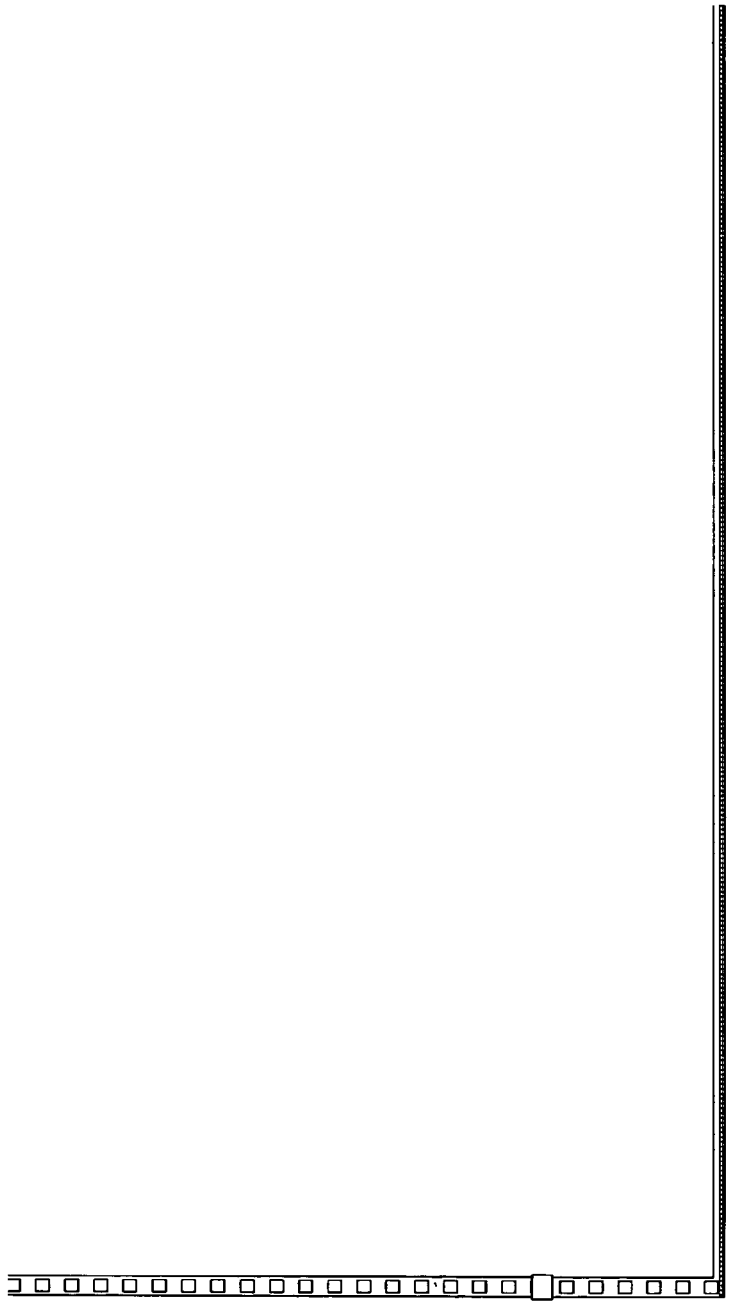
Figure 28:
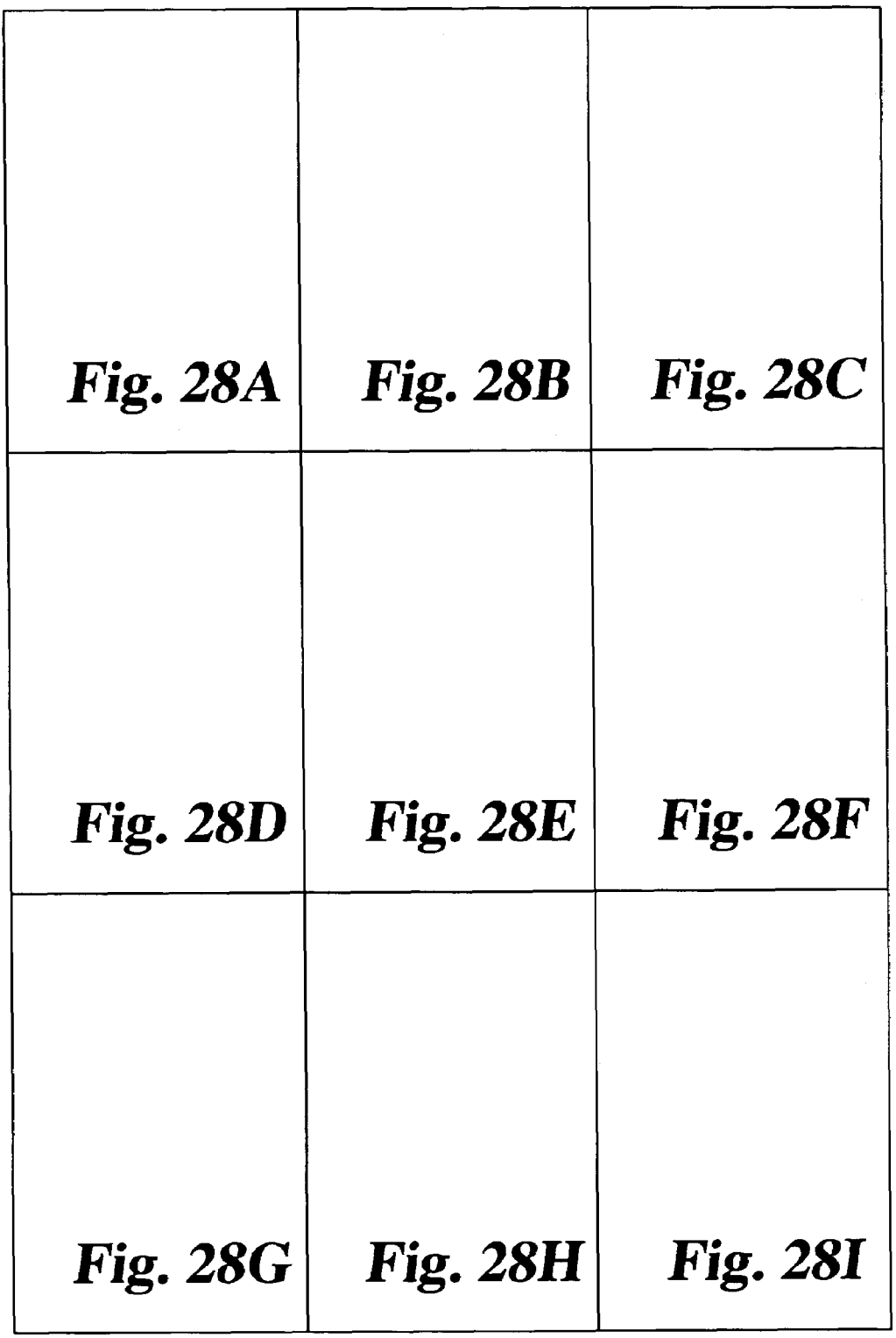
Figure 28A:
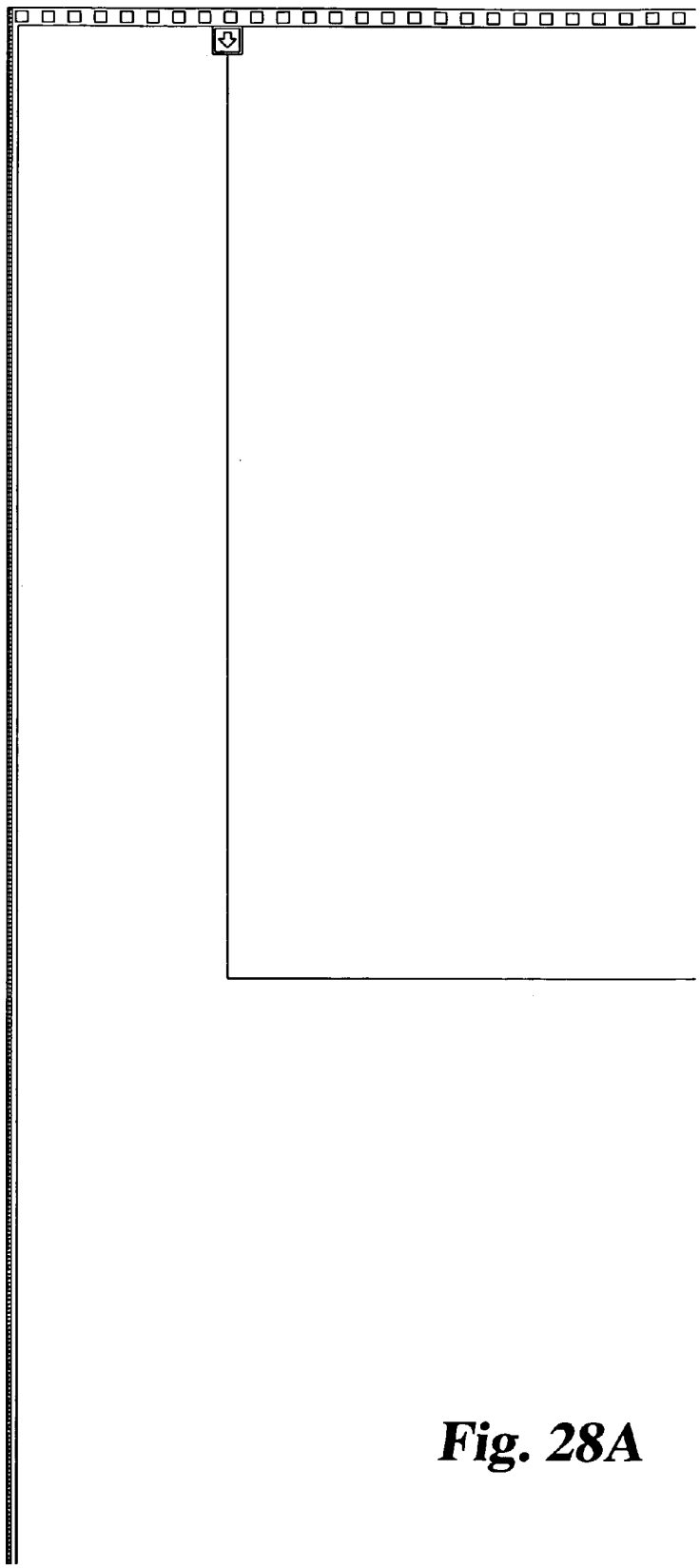
FIGS. 28A-28I are partial views which show, in combination, the fourth page of the diagram (code) of the computer program referenced in FIGS. 25A-25I.
Figure 28B:
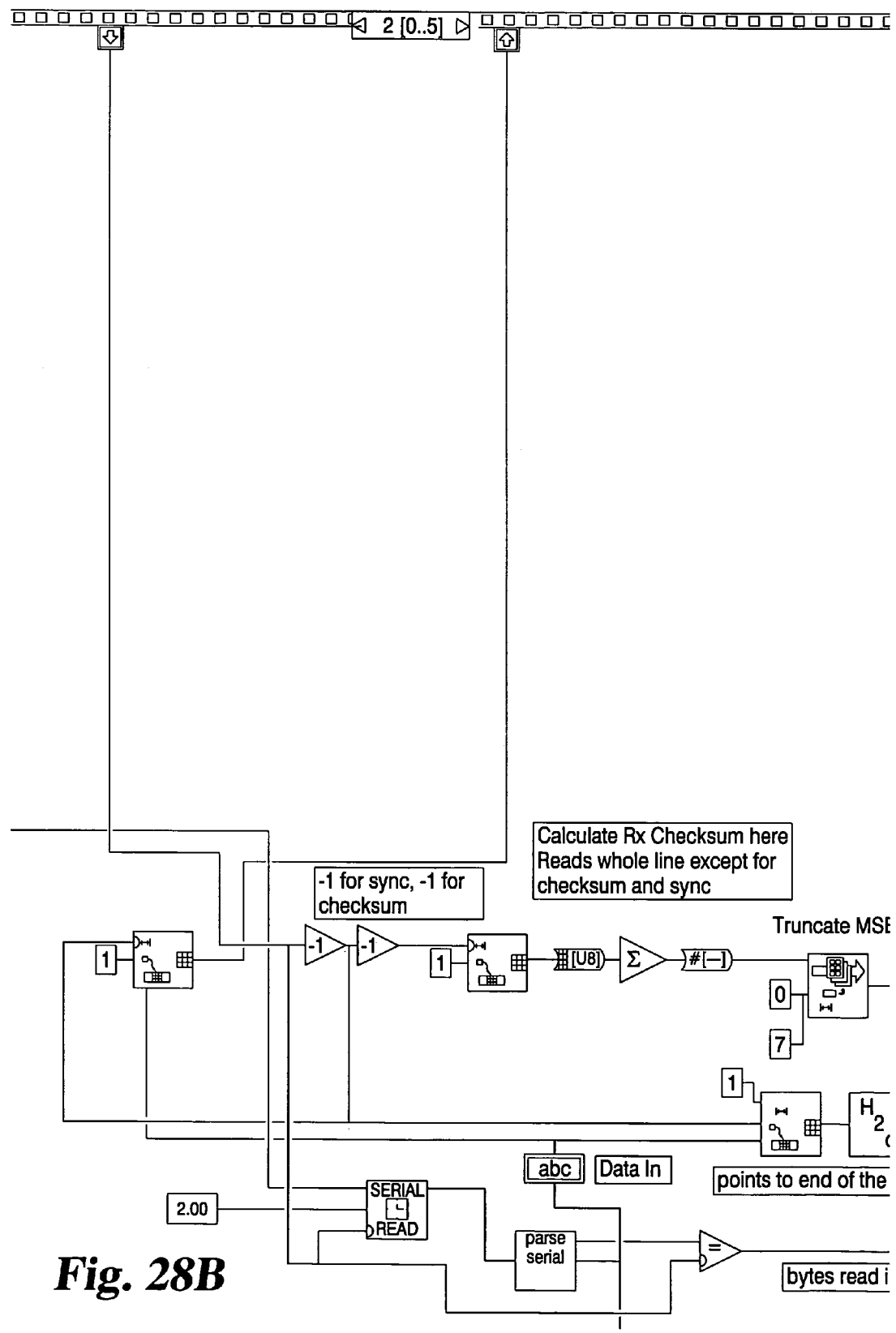
Figure 28C:
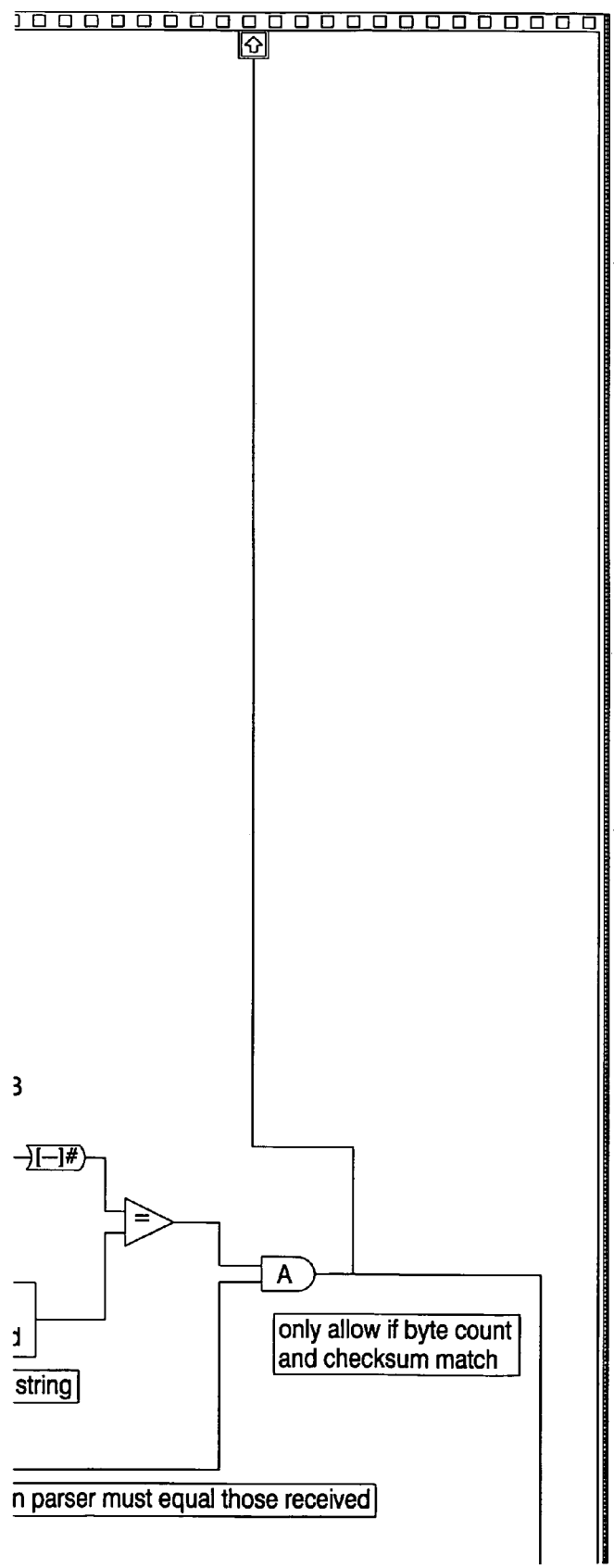
Figure 28D:
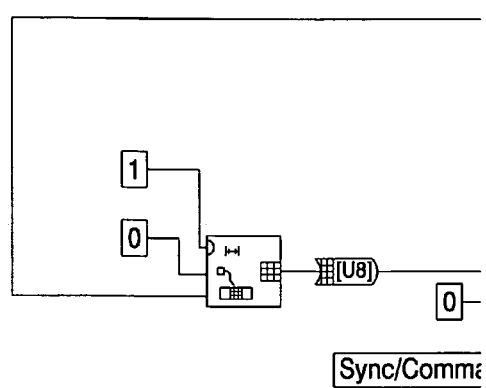
Figure 28E:
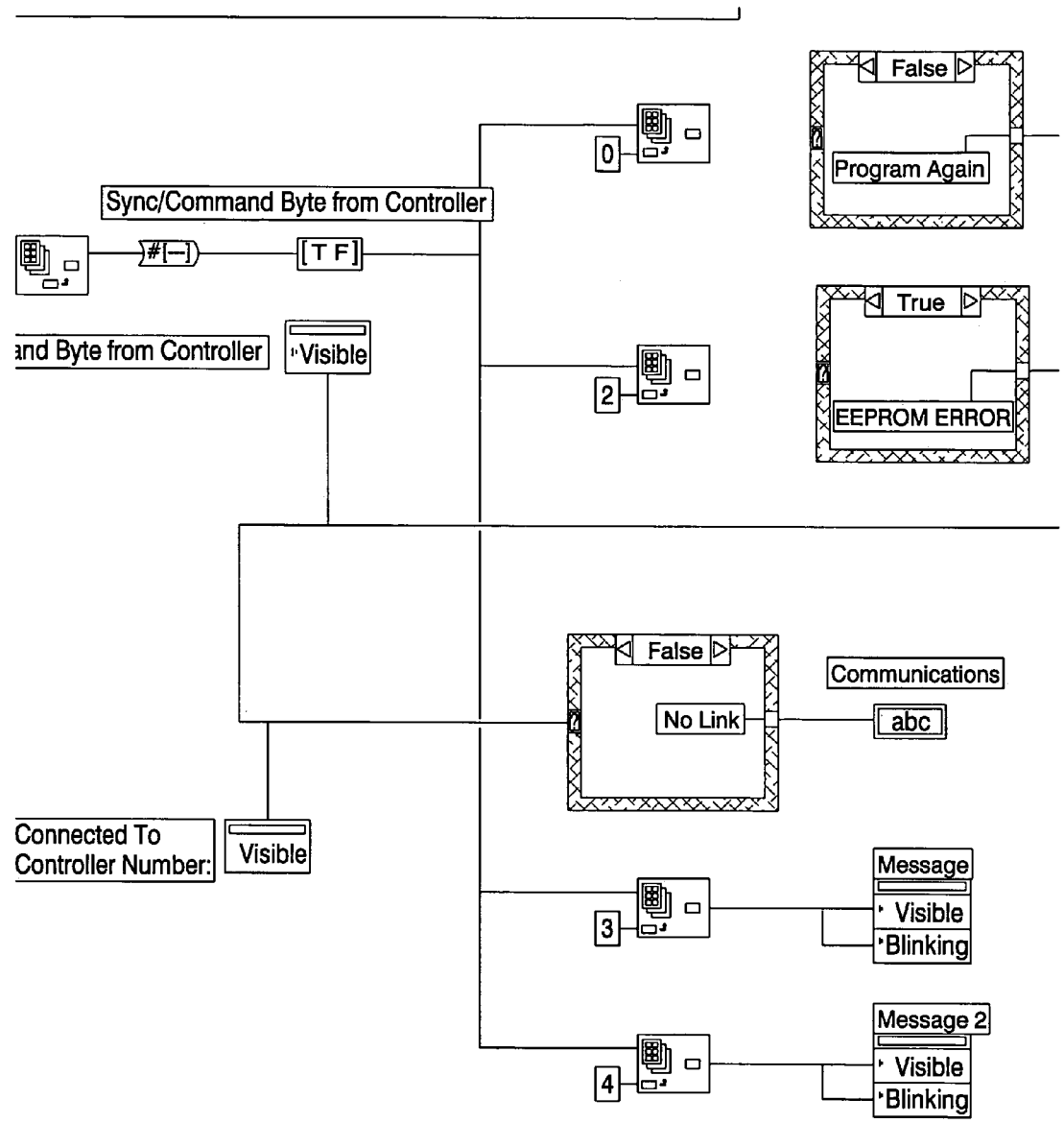
Figure 28F:
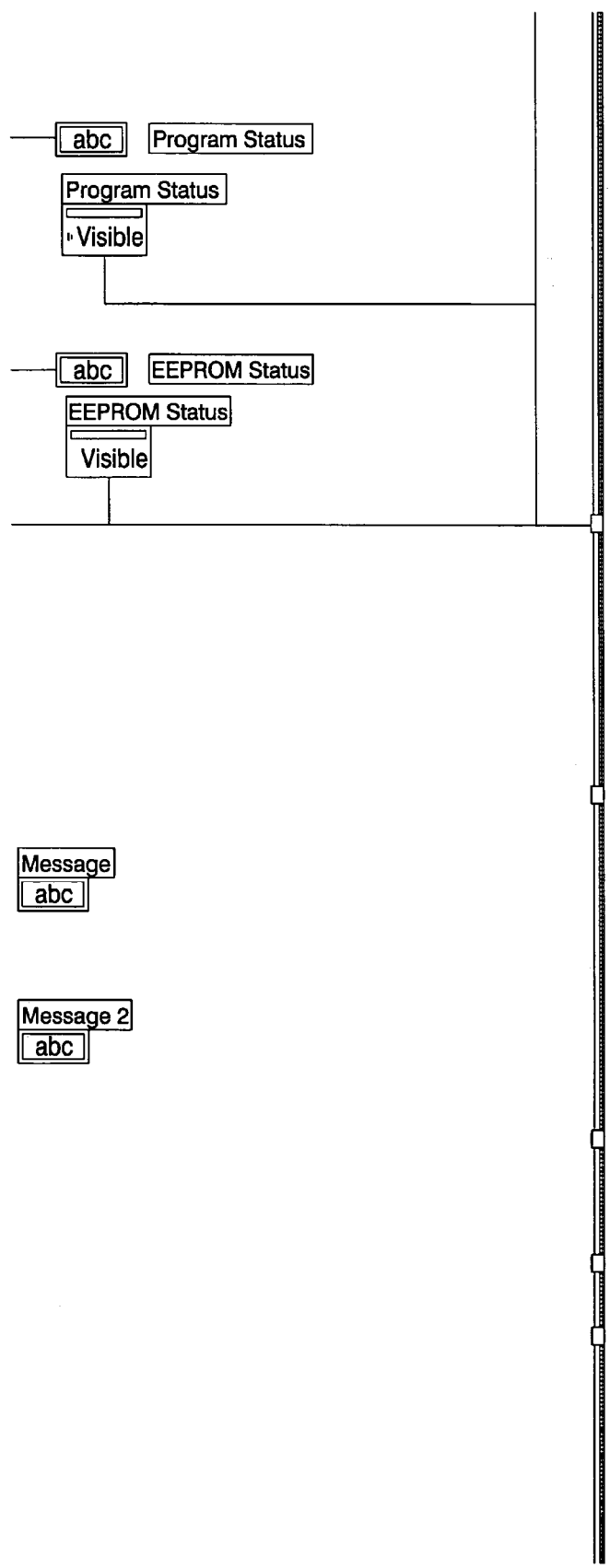
Figure 28G:
Figure 28G:
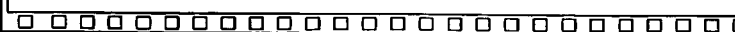
Figure 28H:
Figure 28I:
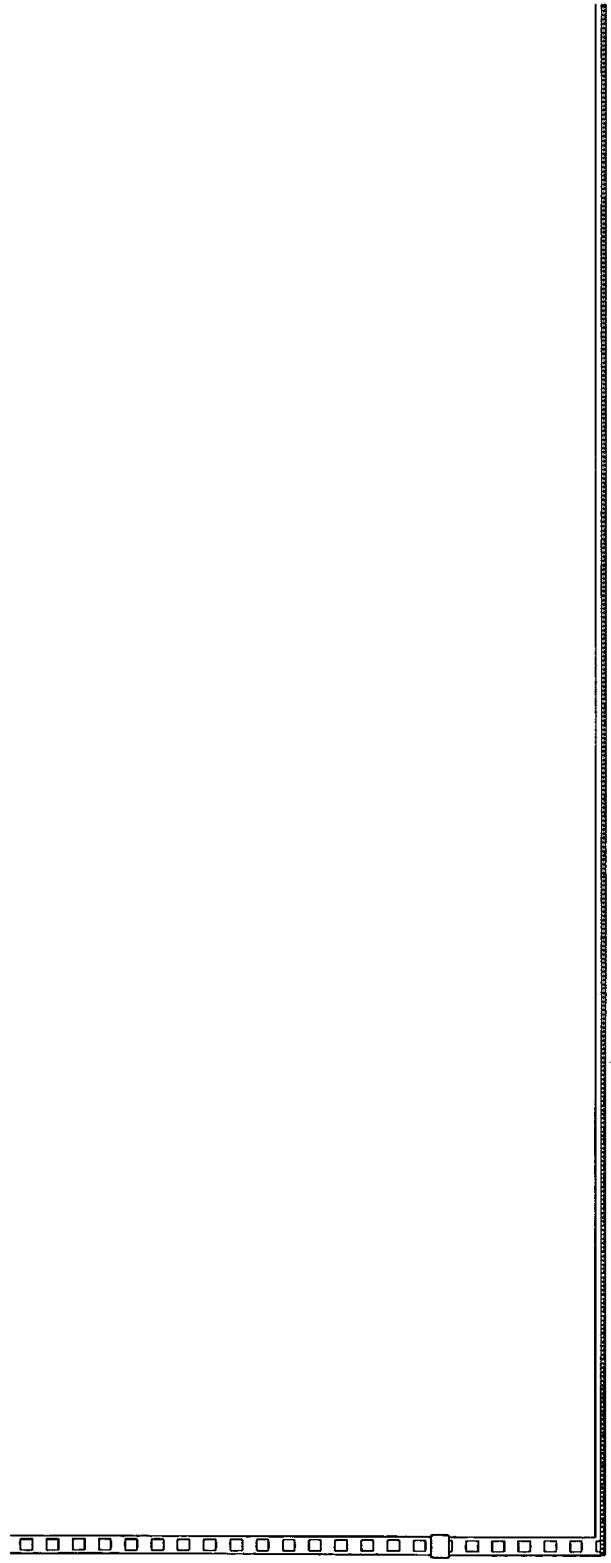
Figure 29:
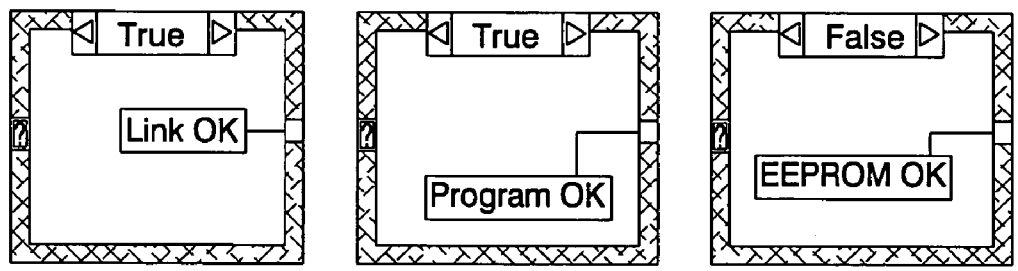
FIG. 29 shows the fifth page of the diagram (code) of the computer program referenced in FIGS. 25A-25I.
Figure 30:
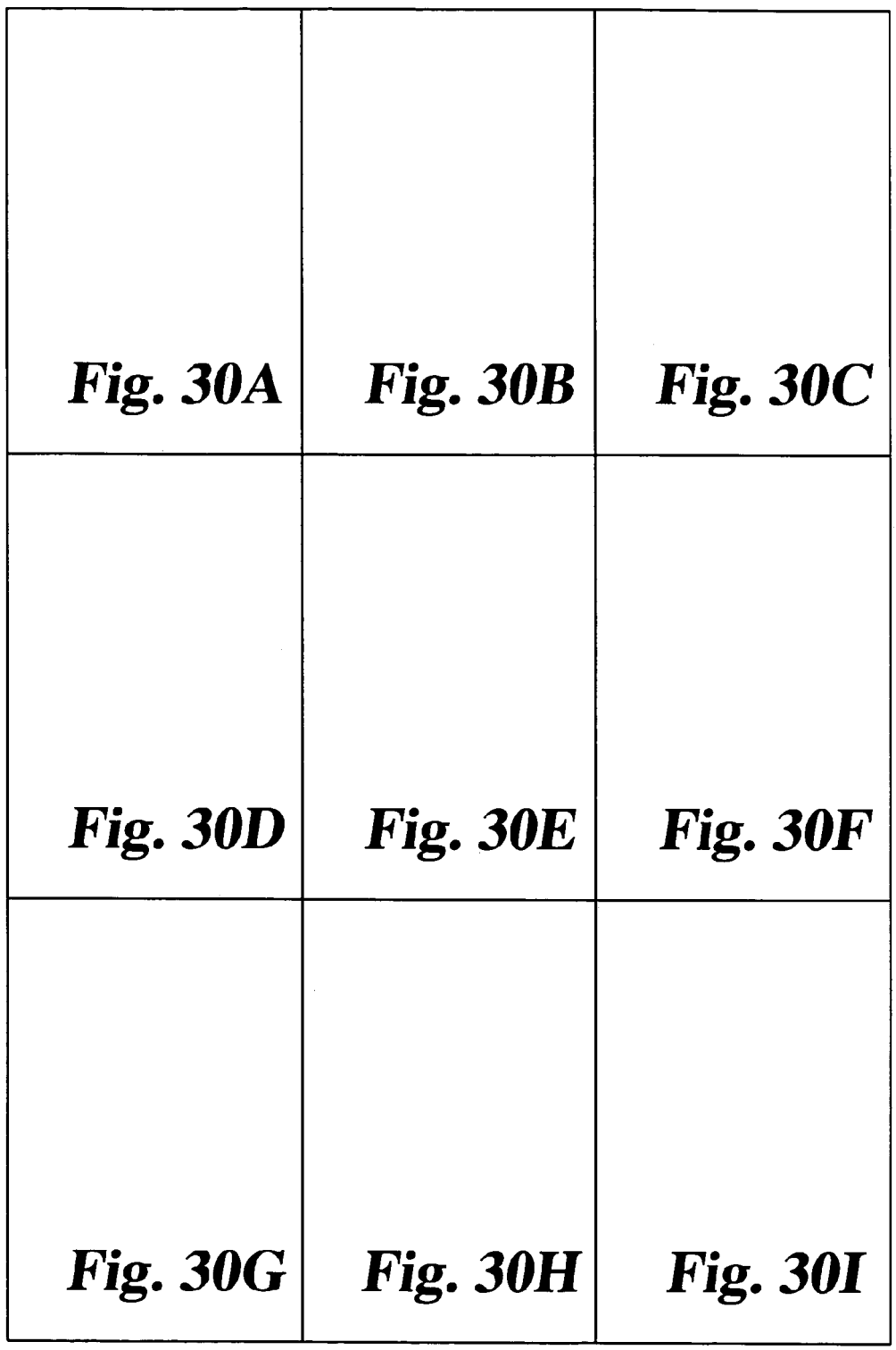
Figure 30A:
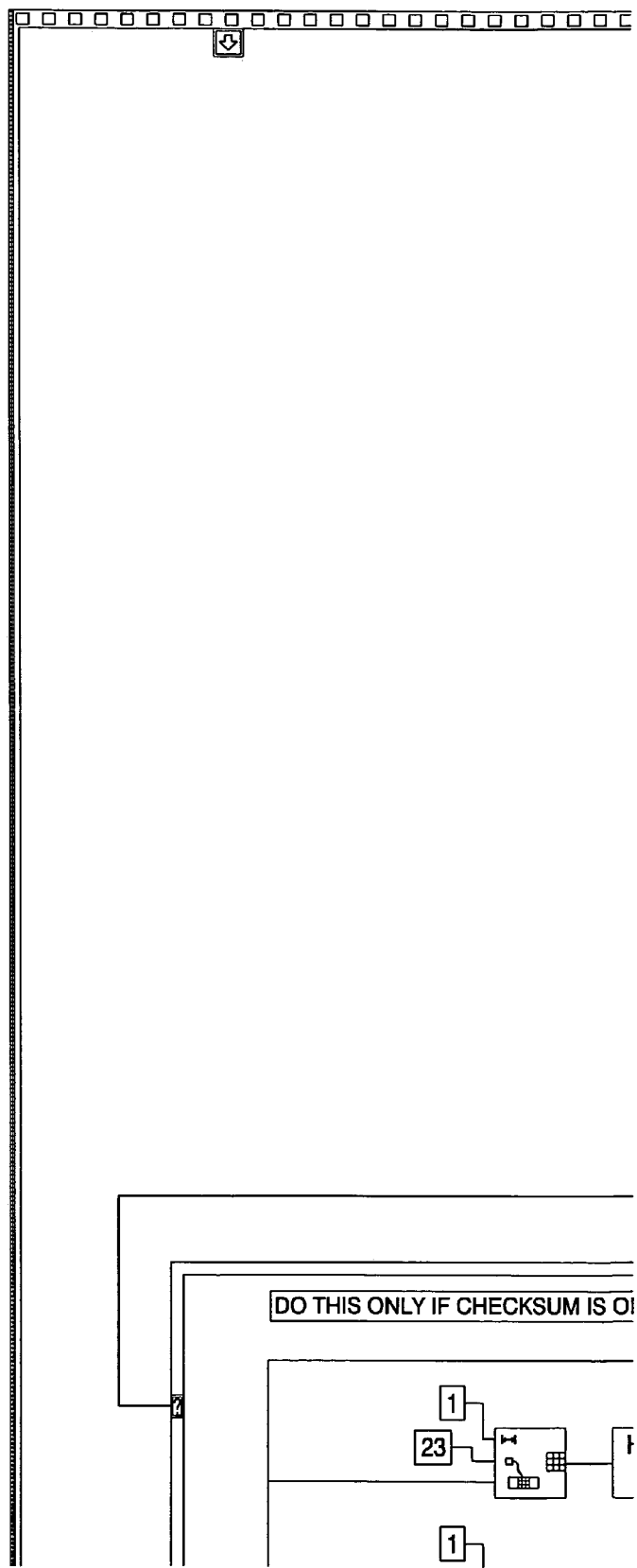
FIGS. 30A-30I are partial views which show, in combination, the sixth page of the diagram (code) of the computer program referenced in FIGS. 25A-25I.
Figure 30B:
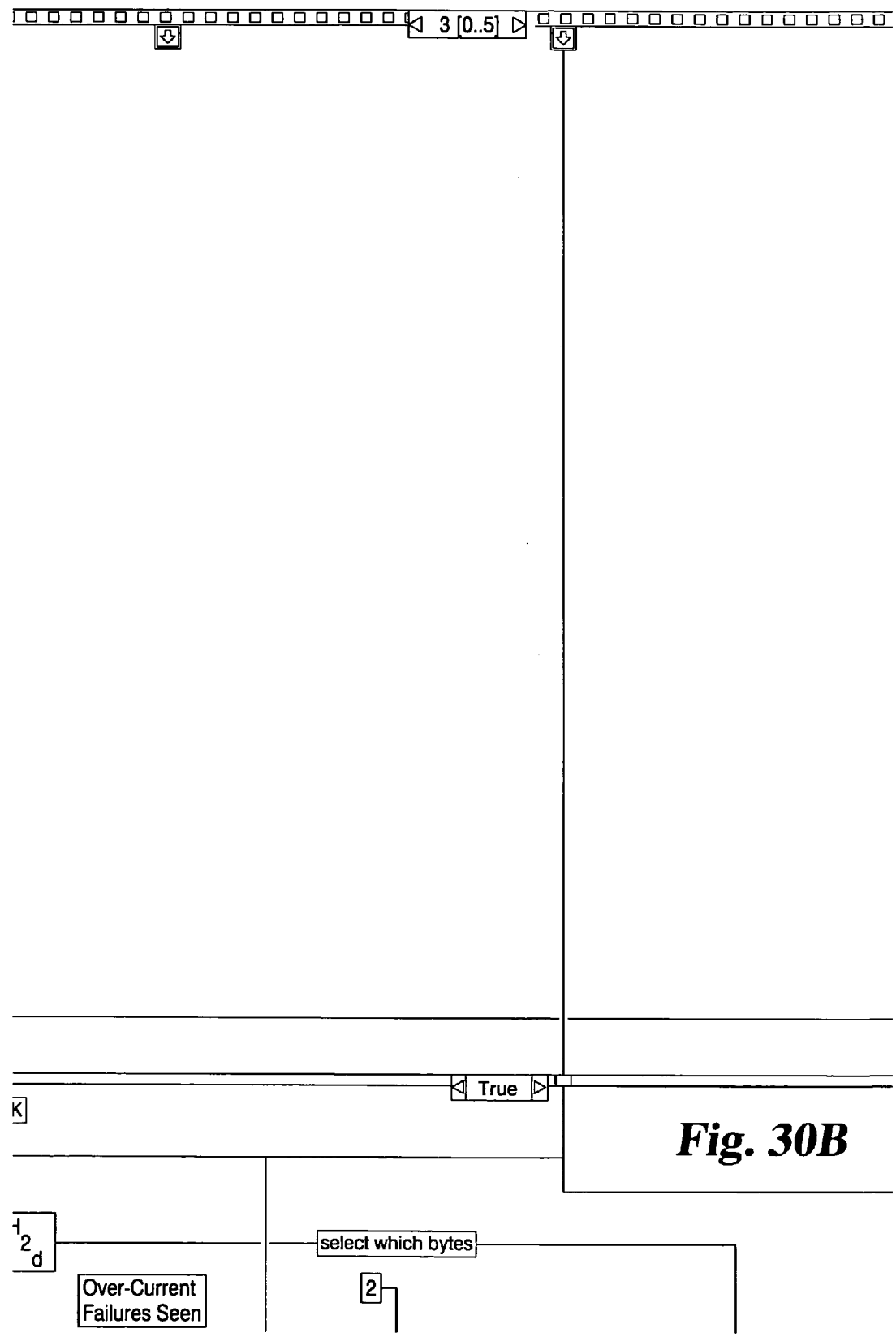
Figure 30C:
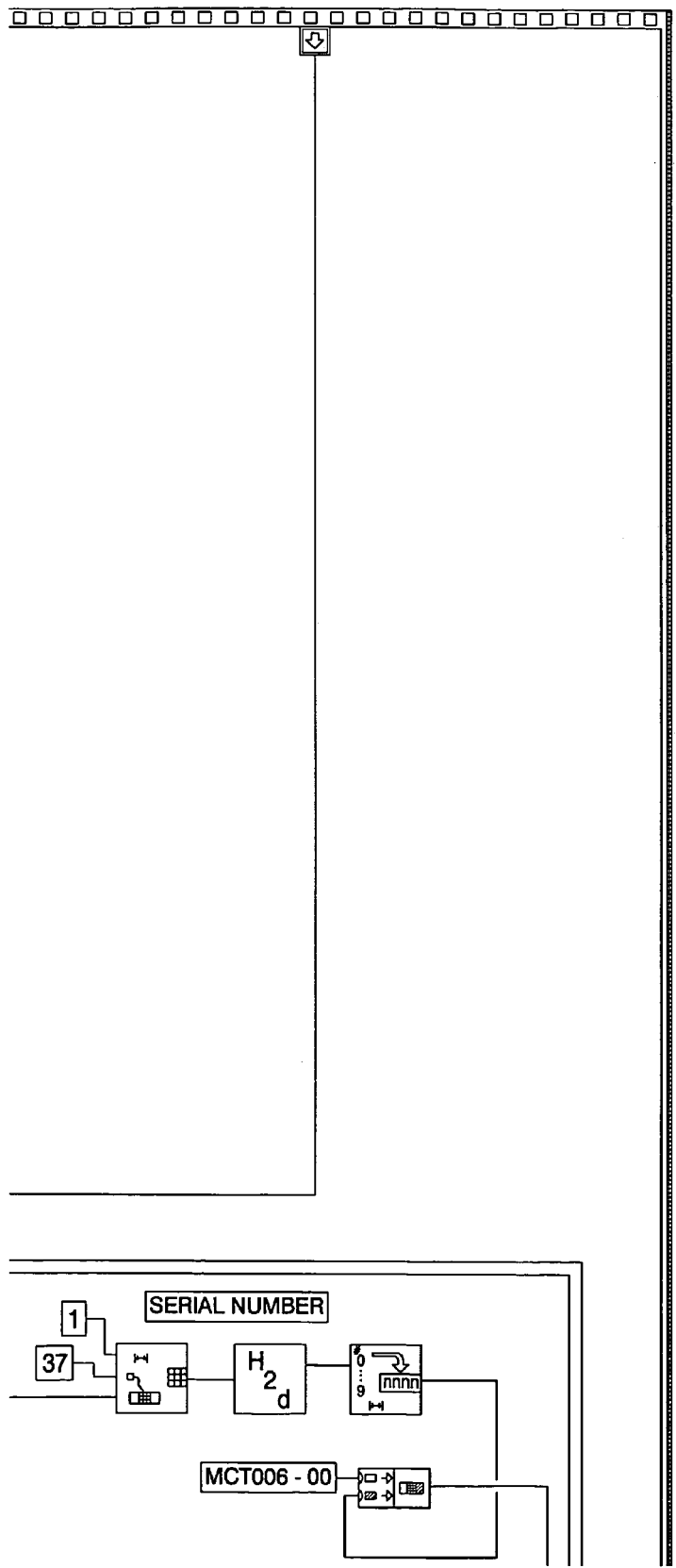
Figure 30D:
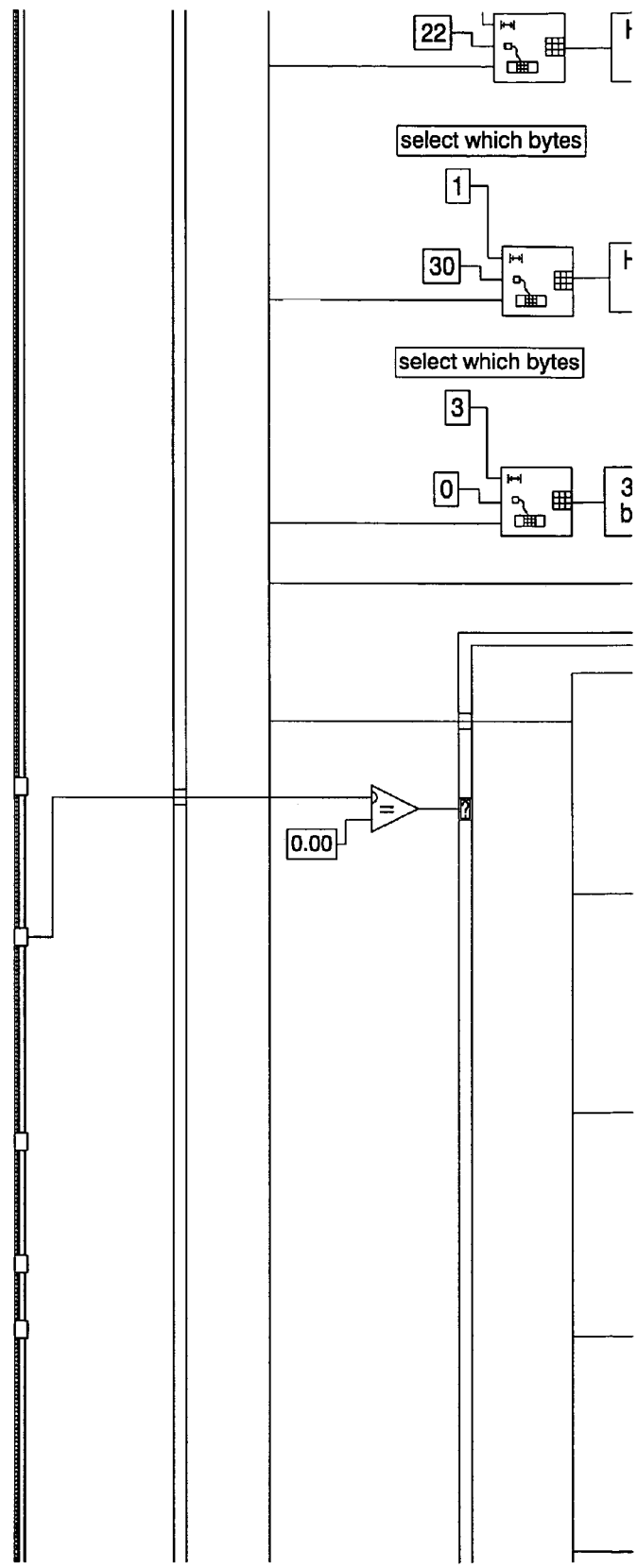
Figure 30E:
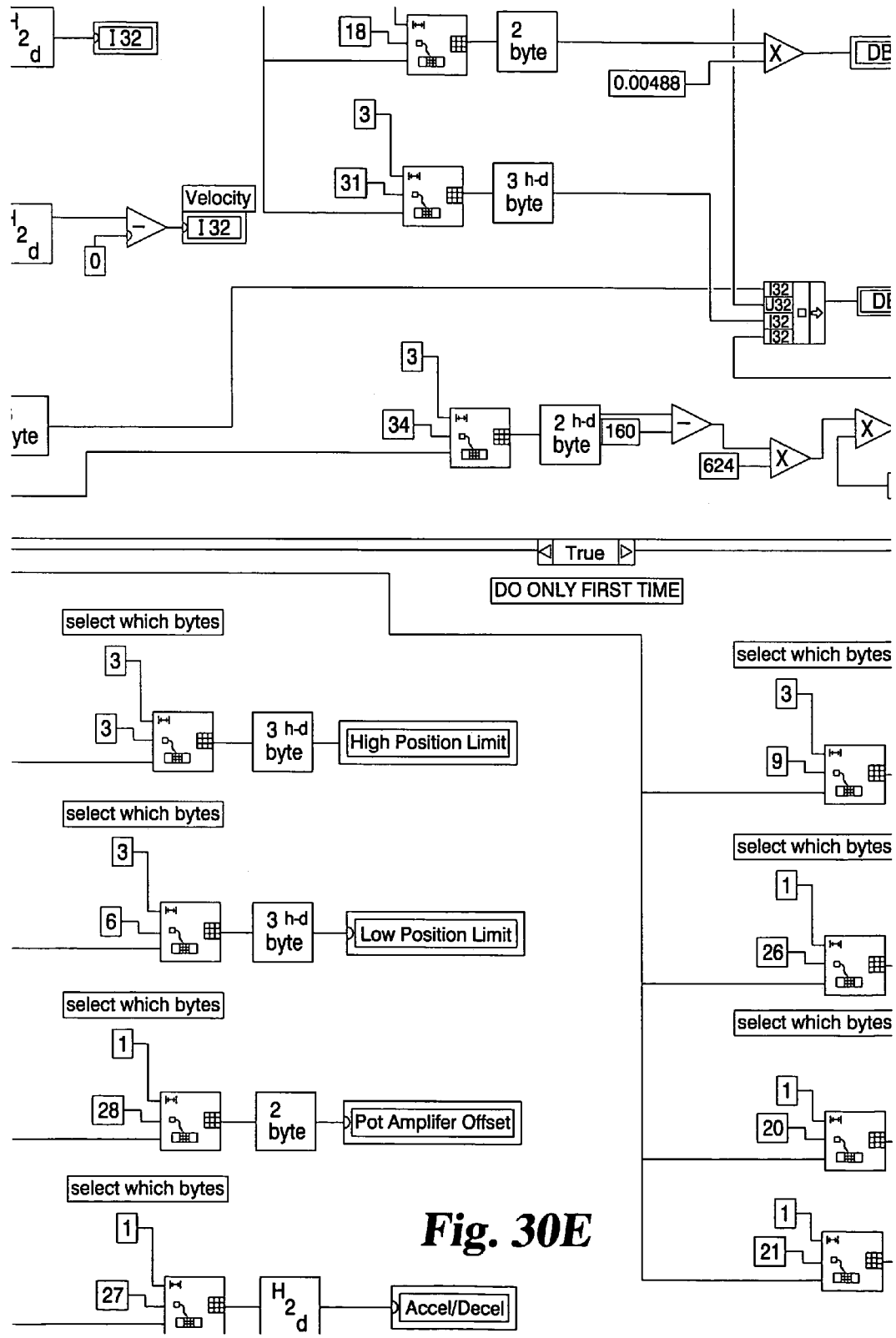
Figure 30F:
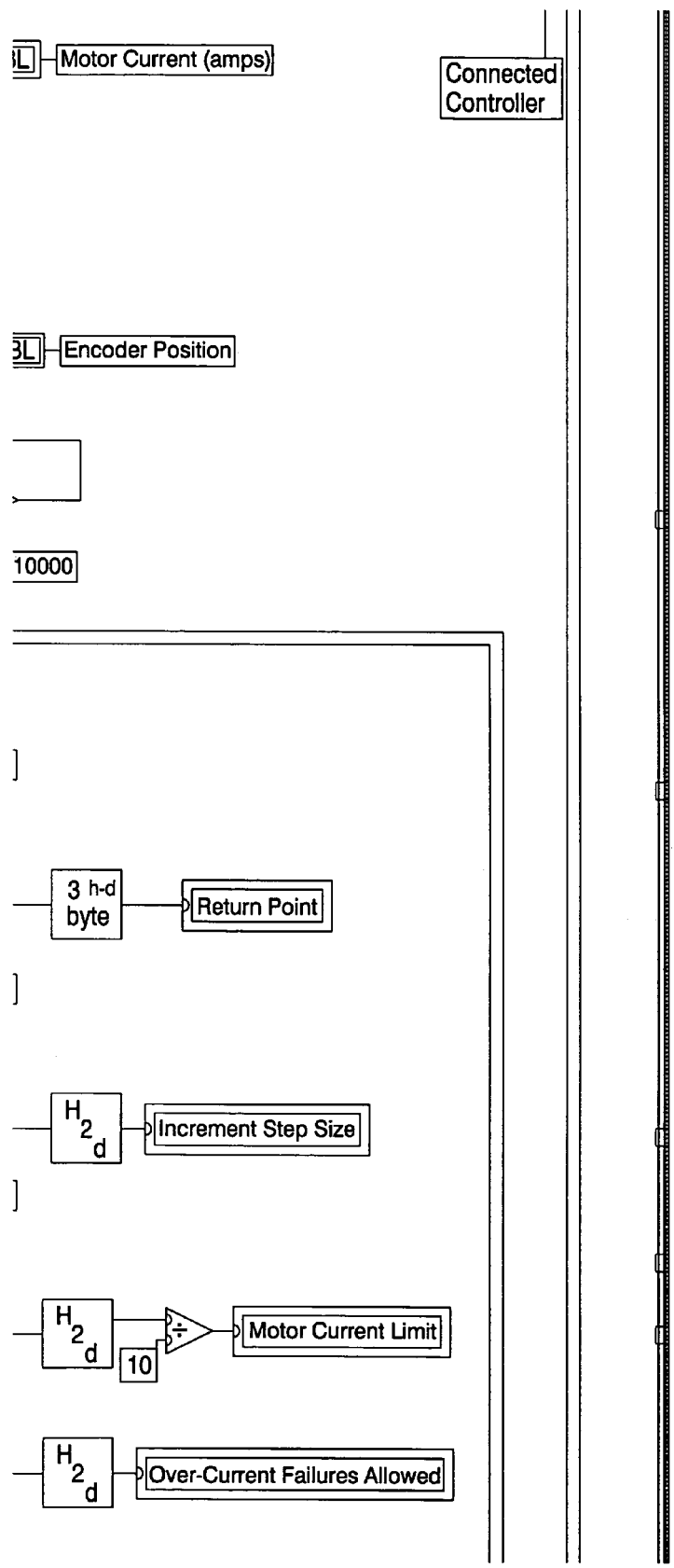
Figure 30G:
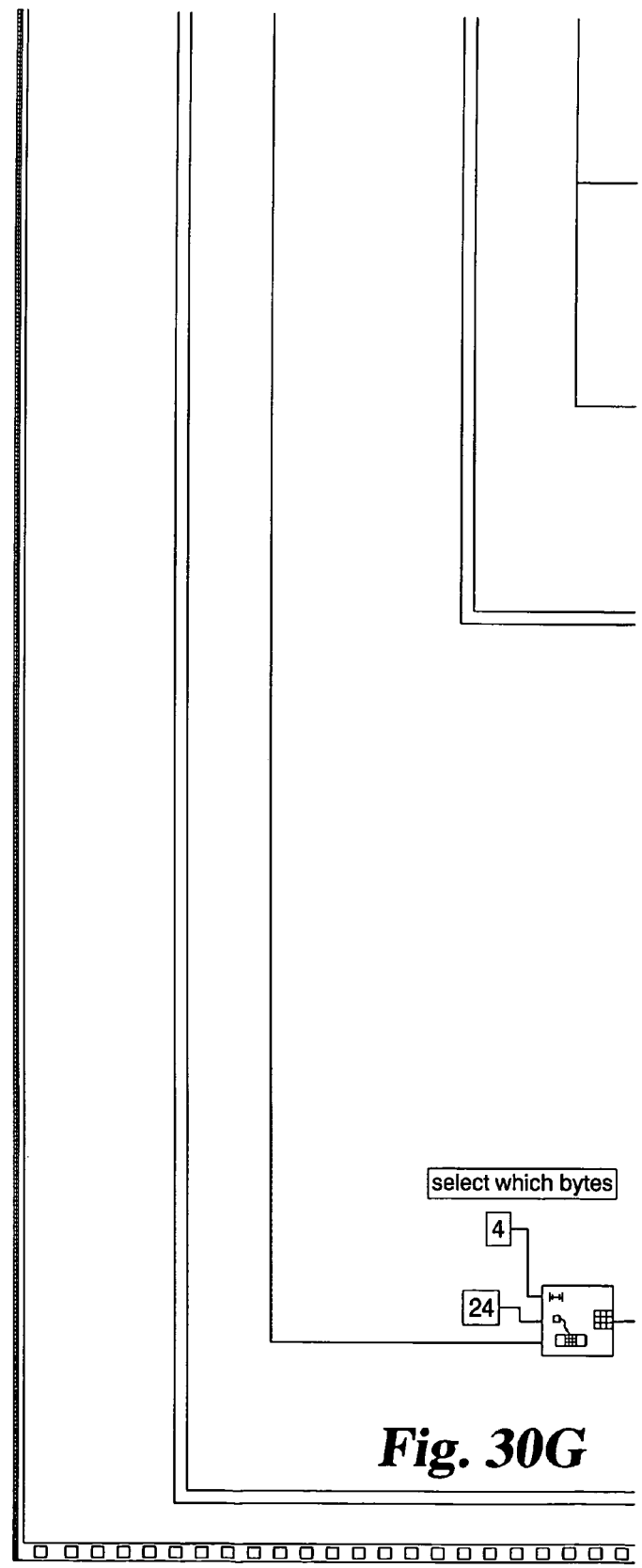
Figure 30H:
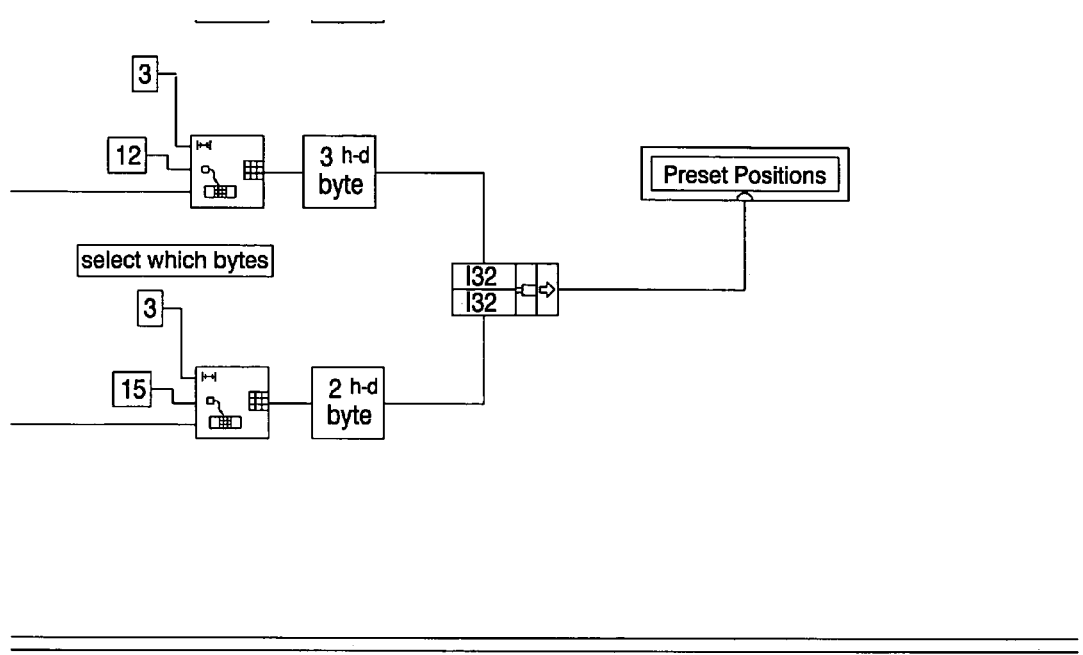
Figure 30H:
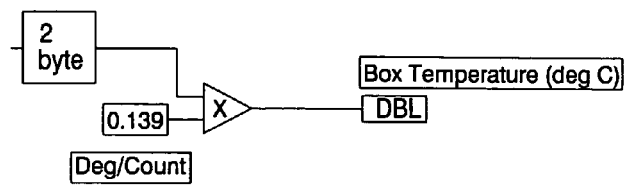
Figure 30I:
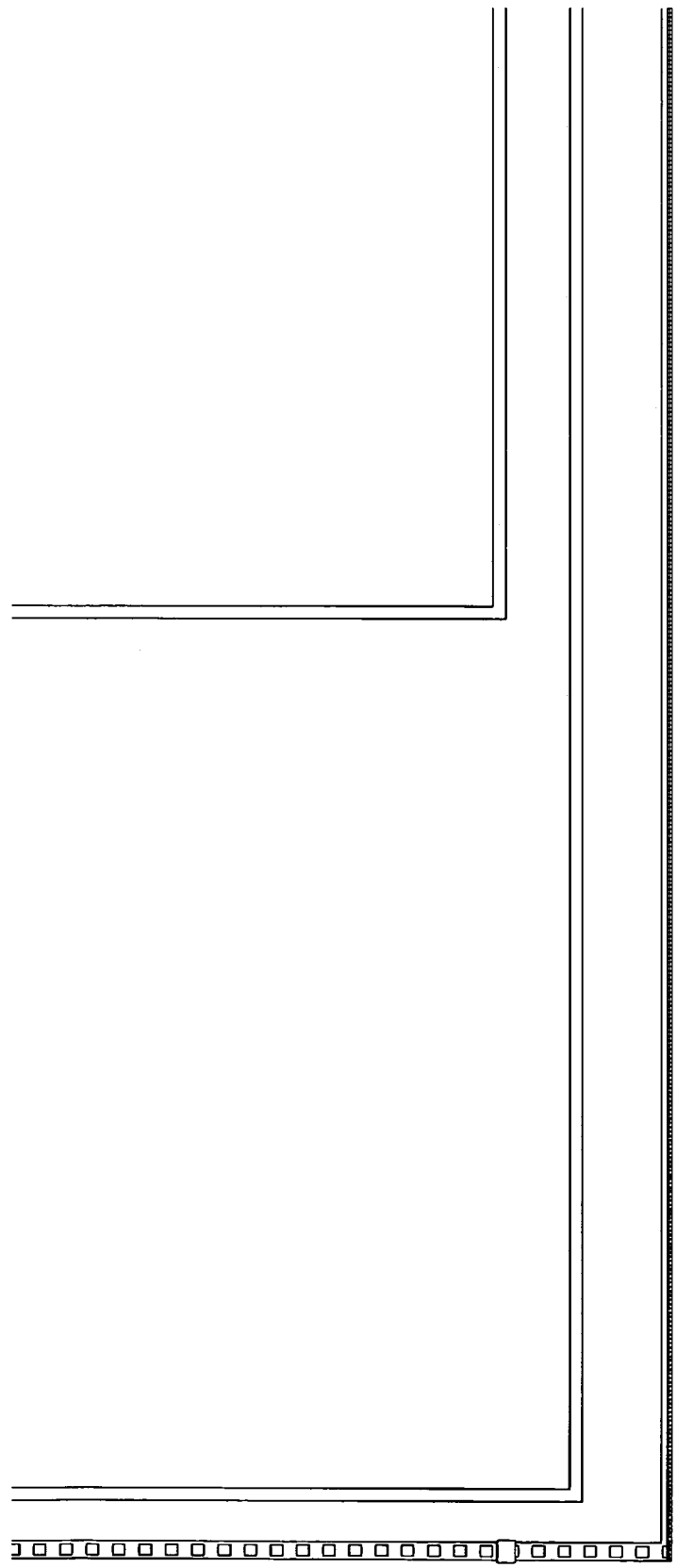
Figure 31:
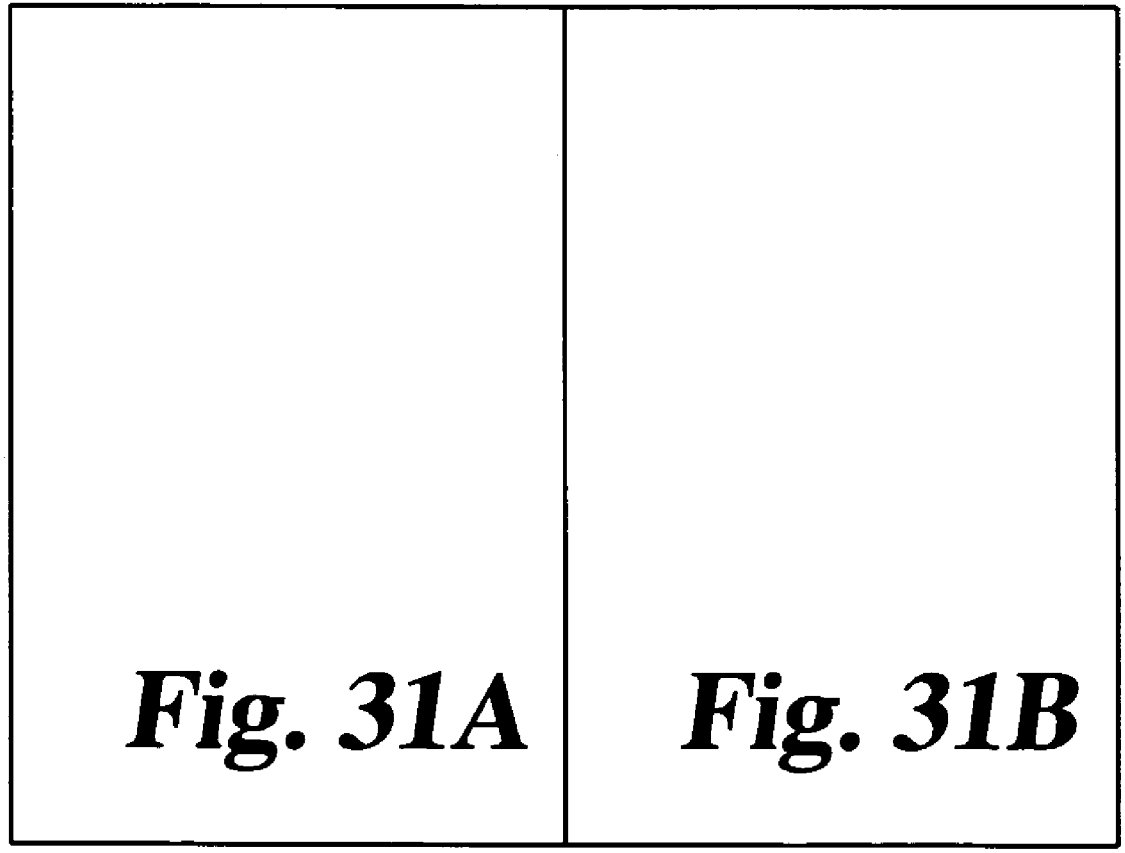
FIGS. 31A-31B are partial views which show, in combination, the seventh page of the diagram (code) of the computer program referenced in FIGS. 25A-25I.
Figure 31A:
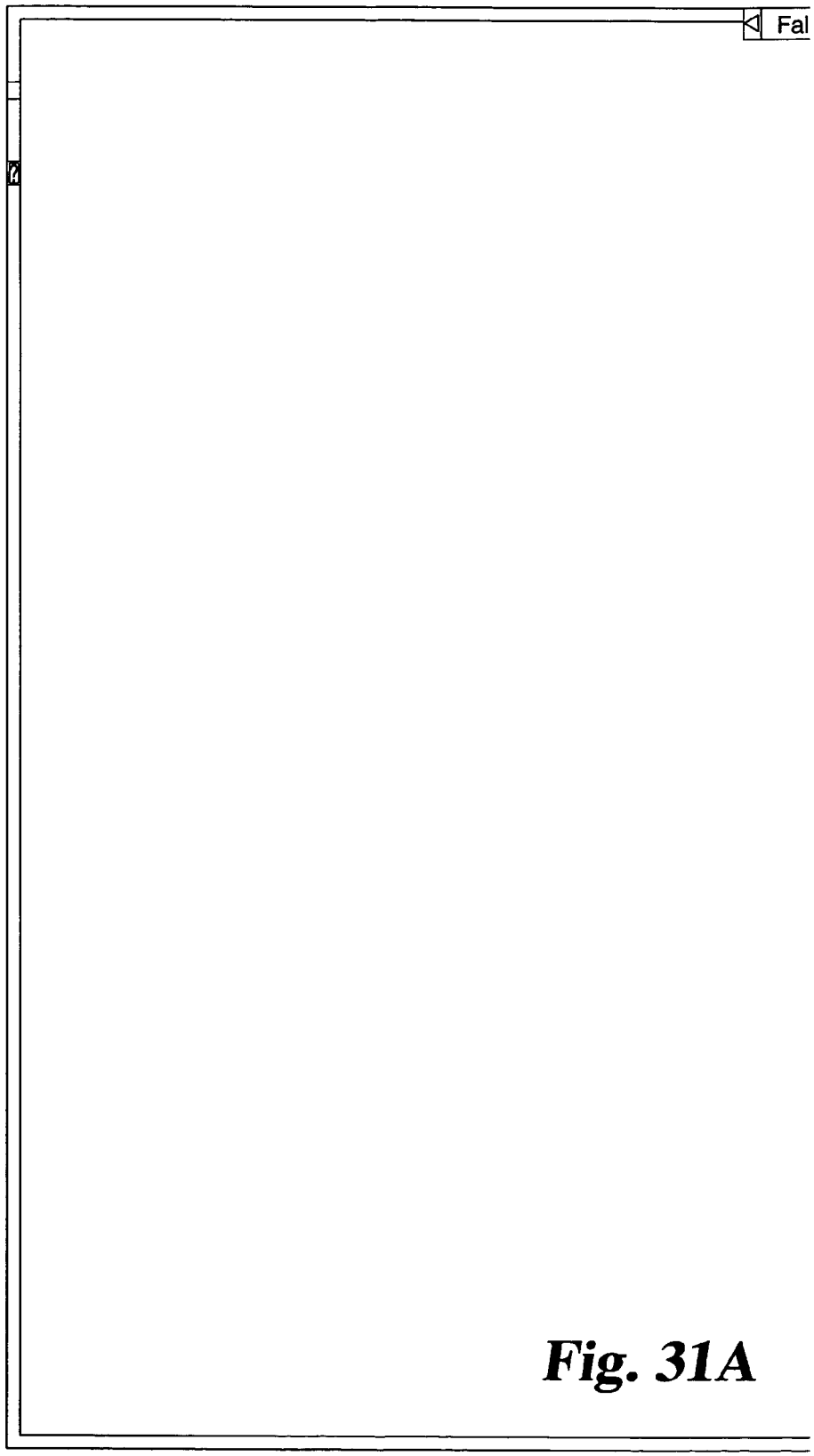
Figure 32:
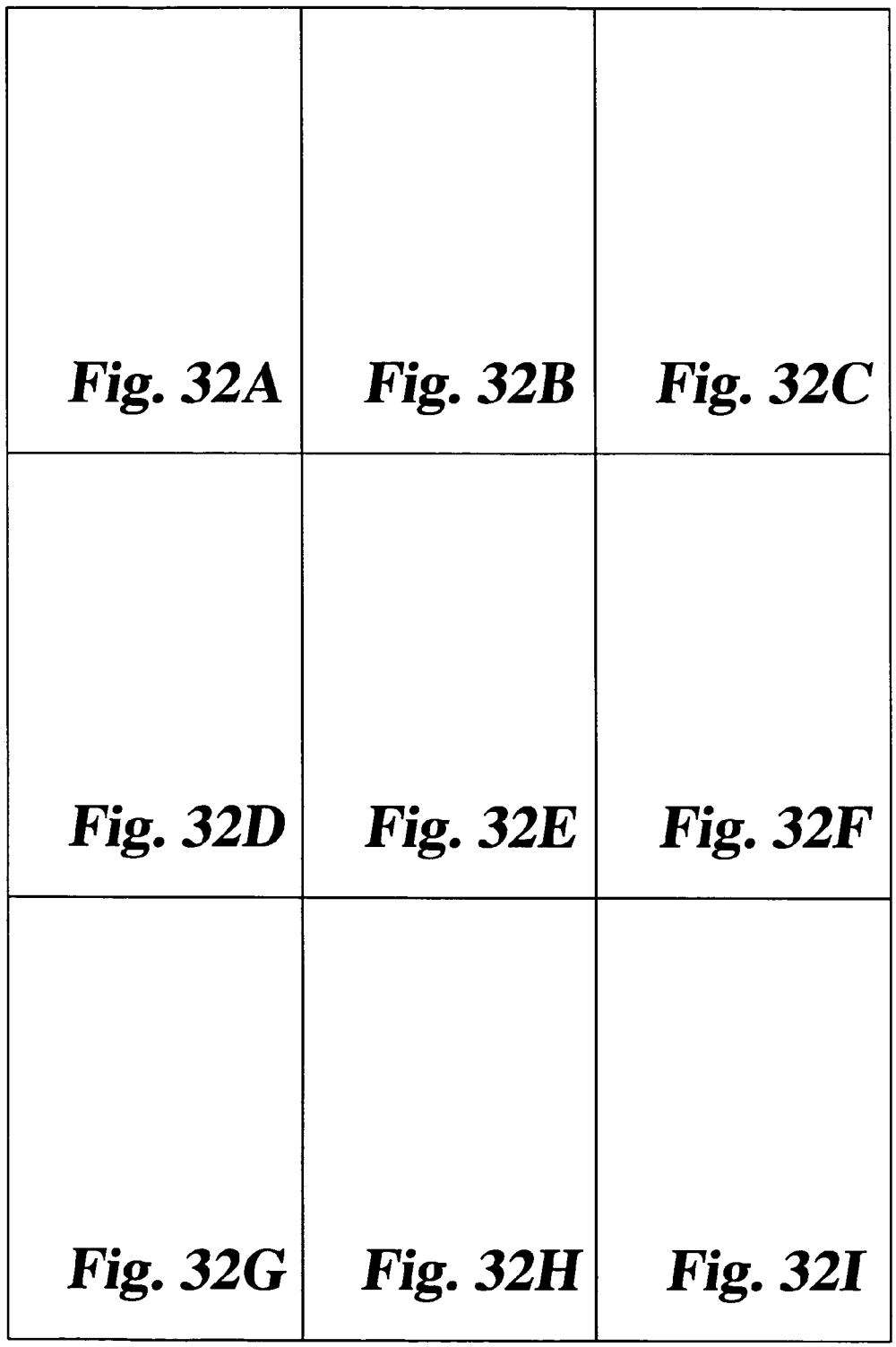
FIGS. 32A-32I are partial views which show, in combination, the eighth page of the diagram (code) of the computer program referenced in FIGS. 25A-25I.
Figure 32A:
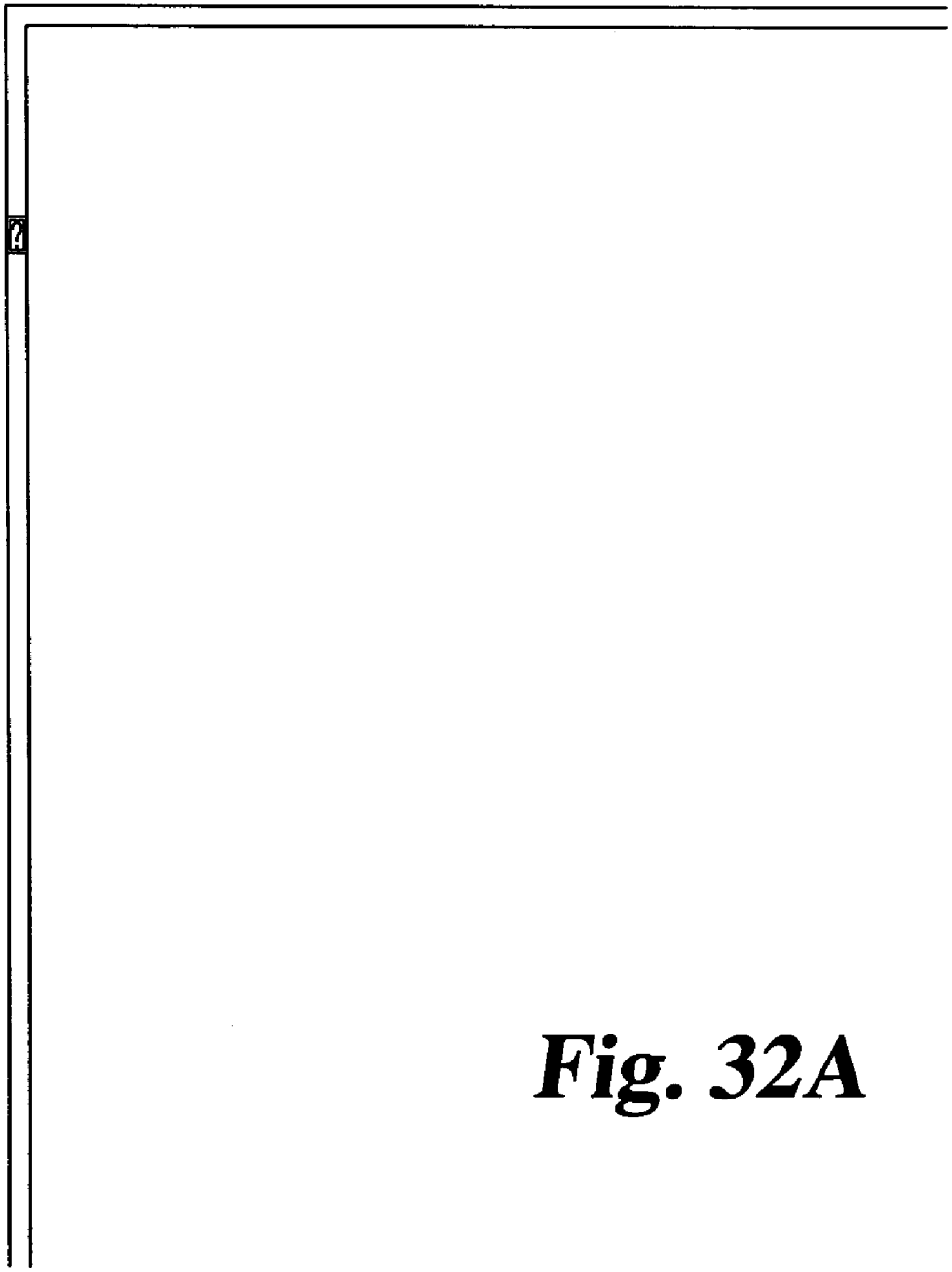
Figure 32C:
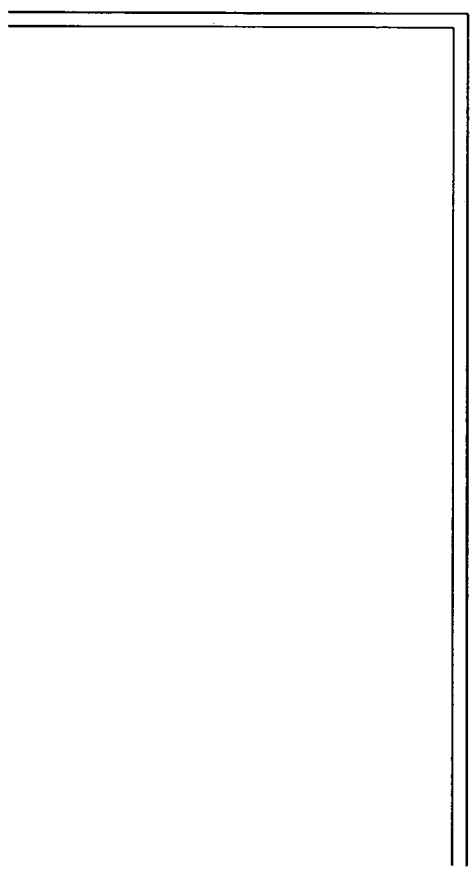
Figure 32D:
Figure 32G:
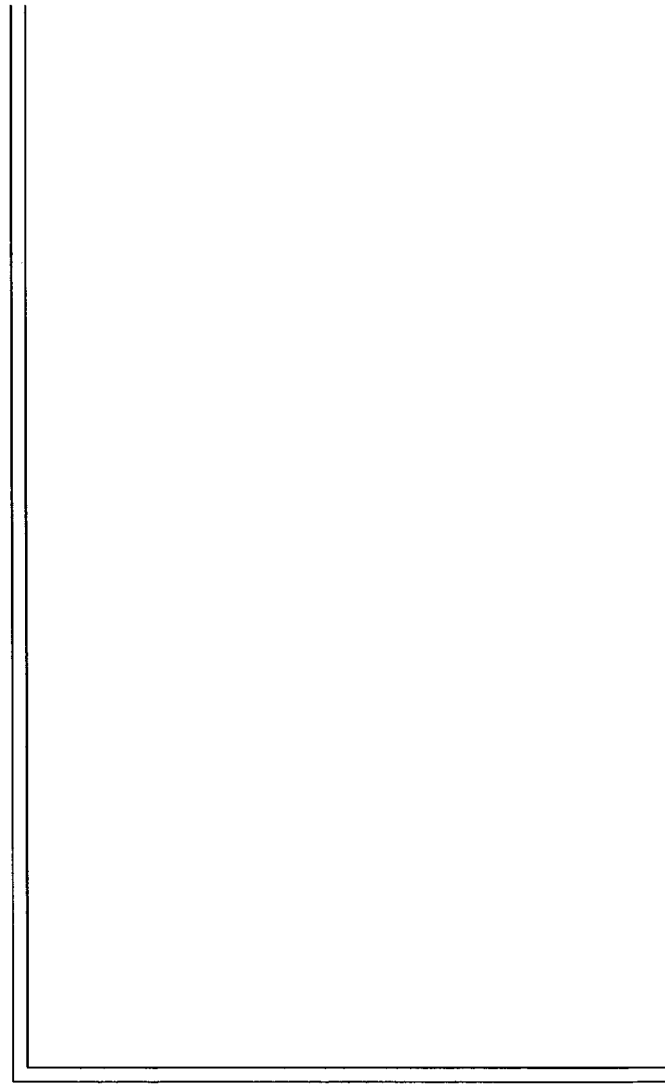
Figure 32I:
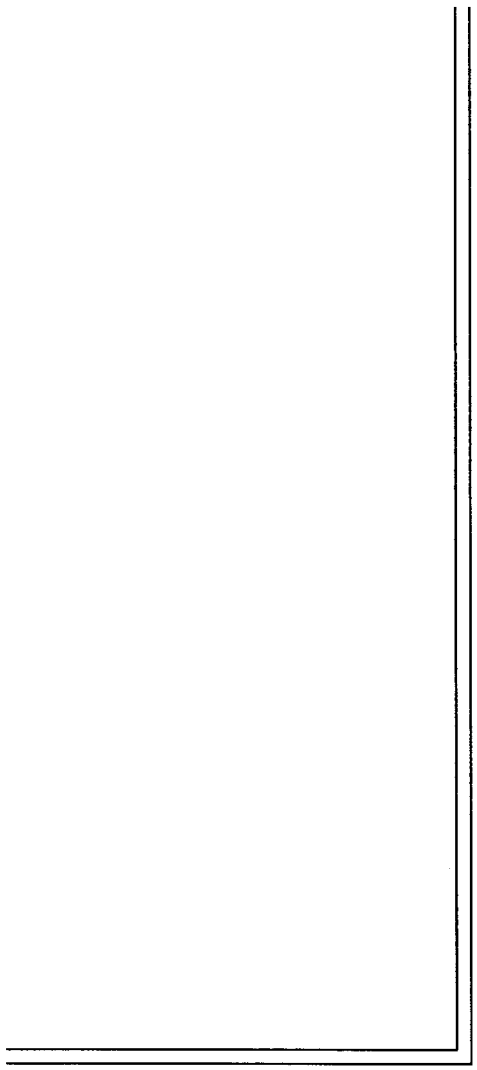
Figure 33:
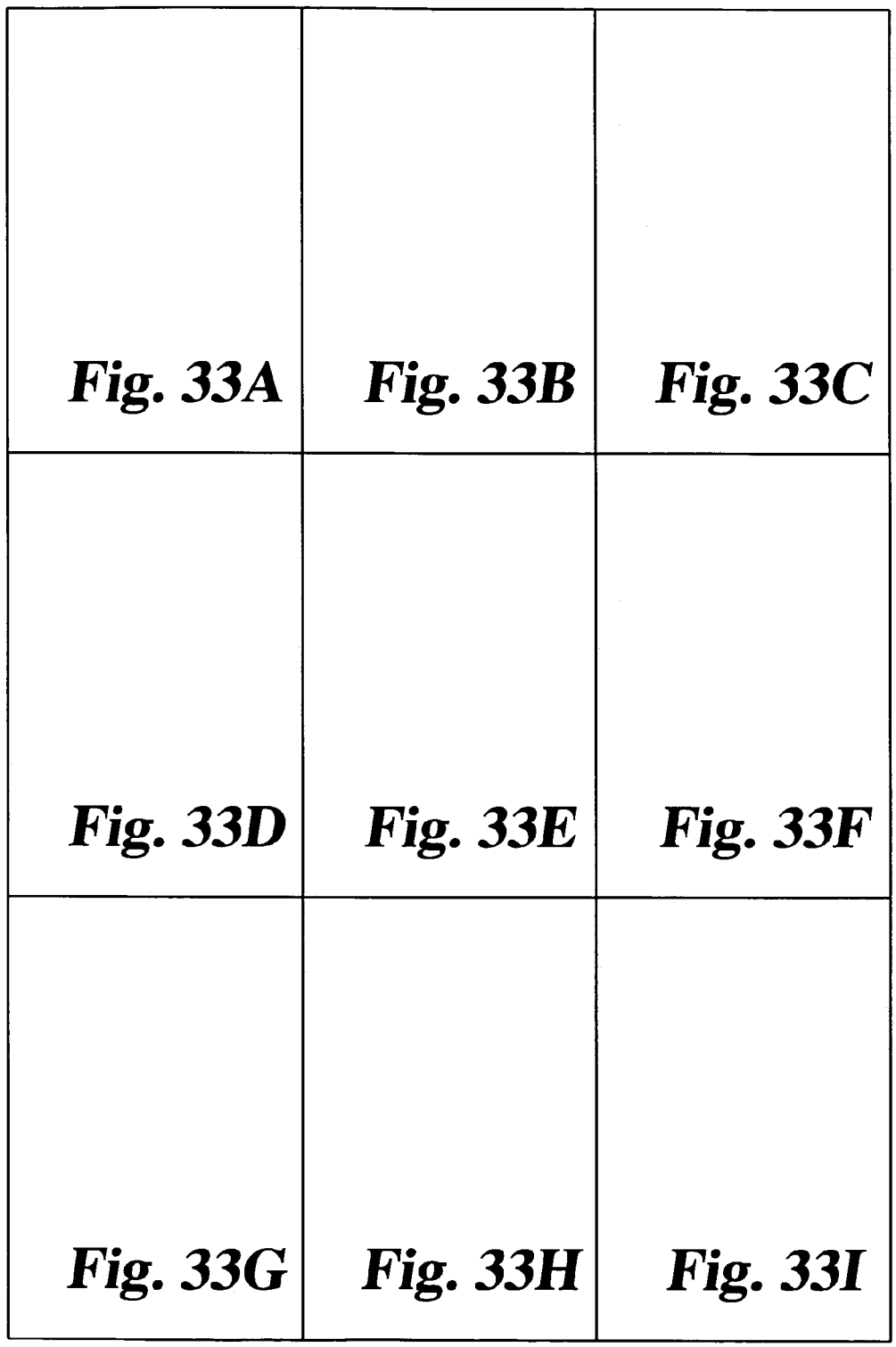
FIGS. 33A-33I are partial views which show, in combination, the ninth page of the diagram (code) of the computer program referenced in FIGS. 25A-25I.
Figure 33A:
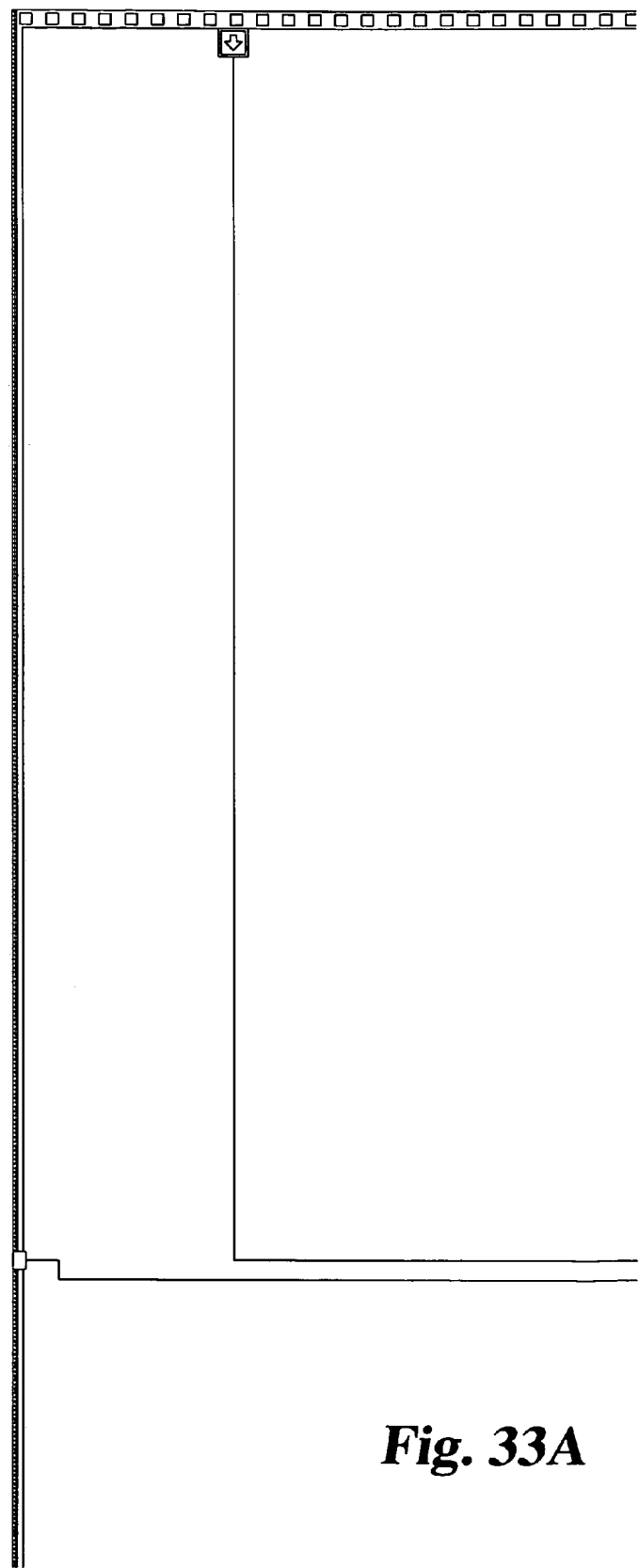
Figure 33B:
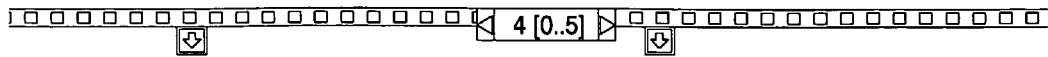
Figure 33B:
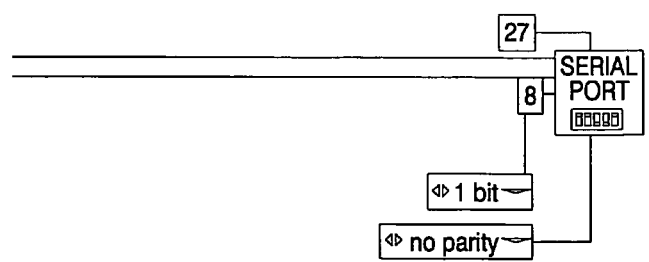
Figure 33C:
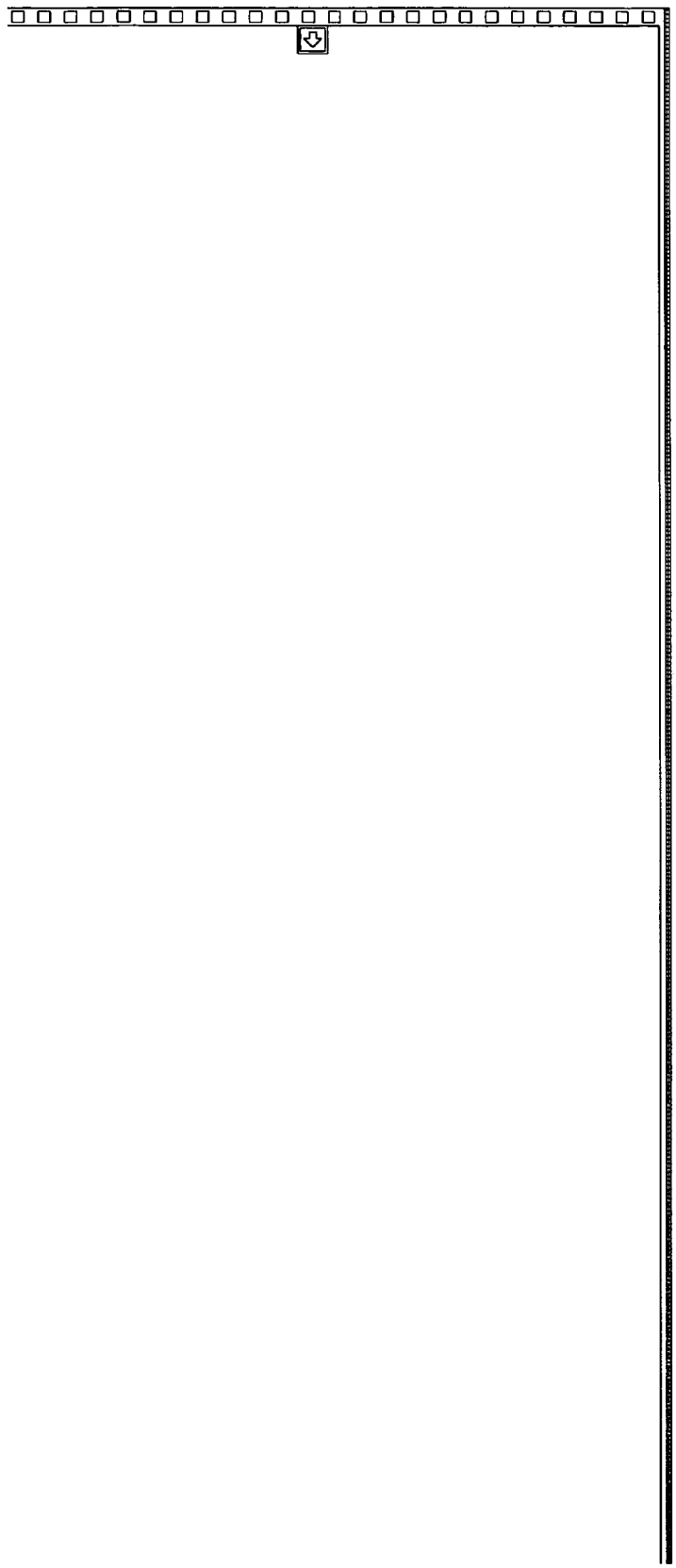
Figure 33D:
Figure 33F:
Figure 33H:
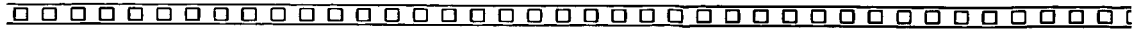
Figure 34:
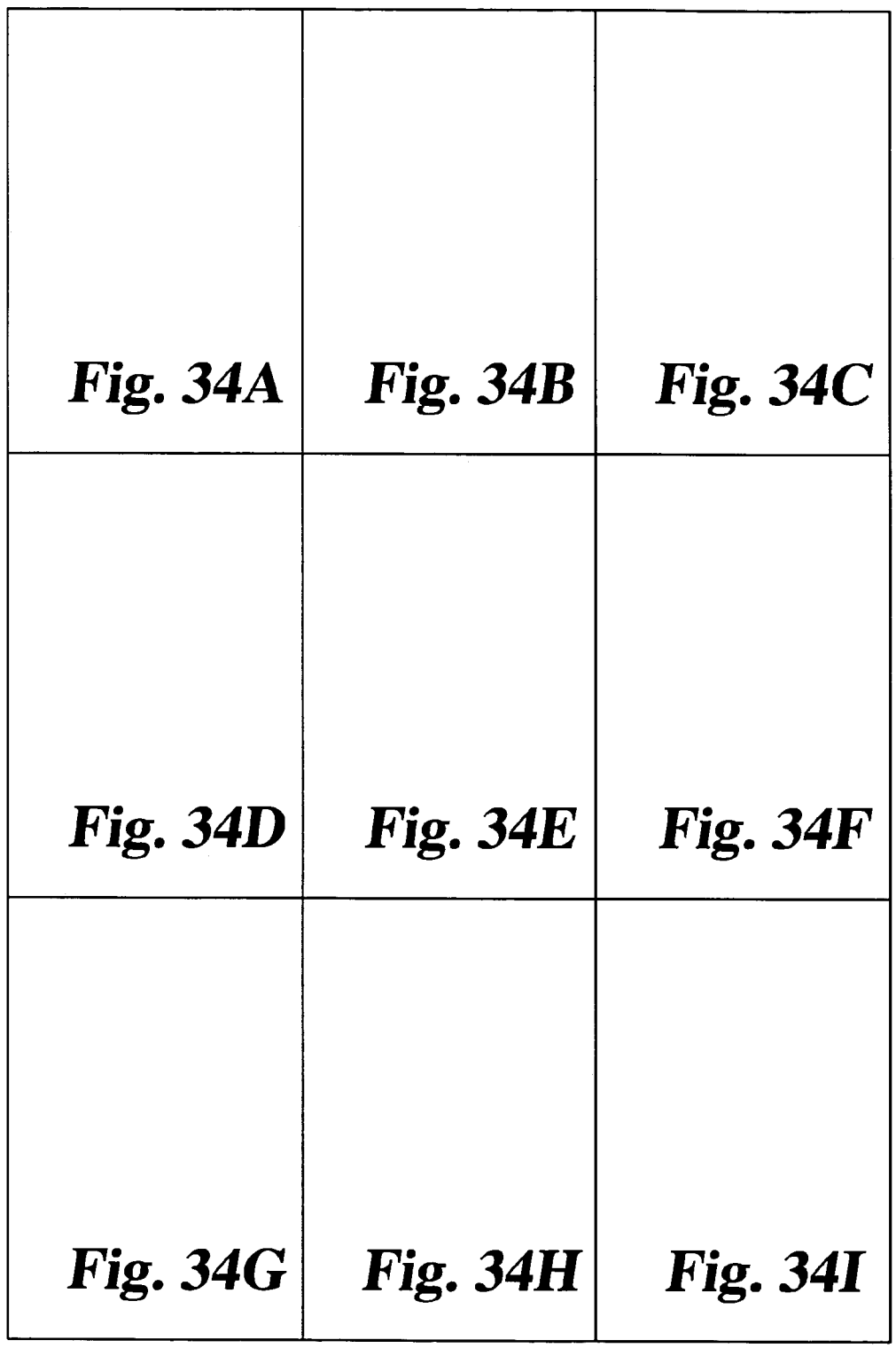
FIGS. 34A-34I are partial views which show, in combination, the tenth page of the diagram (code) of the computer program referenced in FIGS. 25A-25I.
Figure 34A:
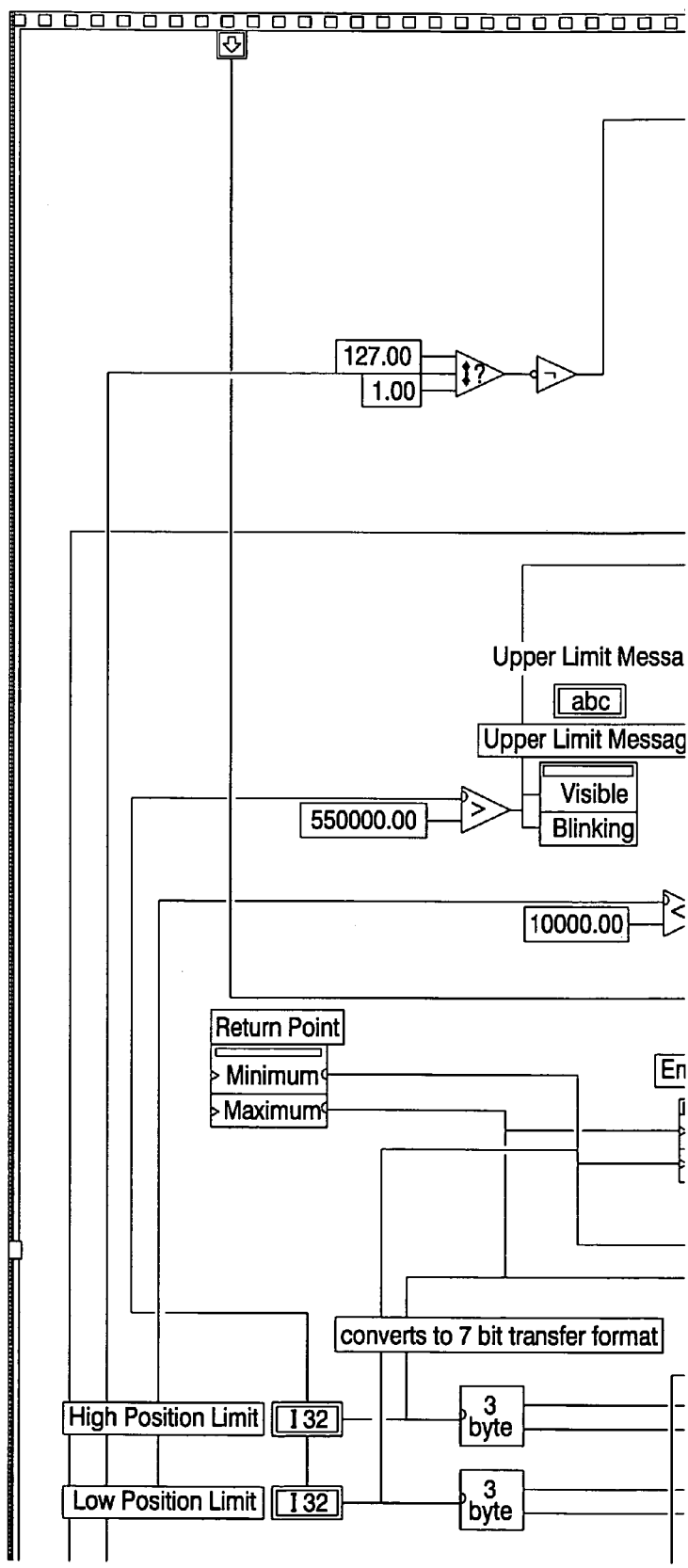
Figure 34B:
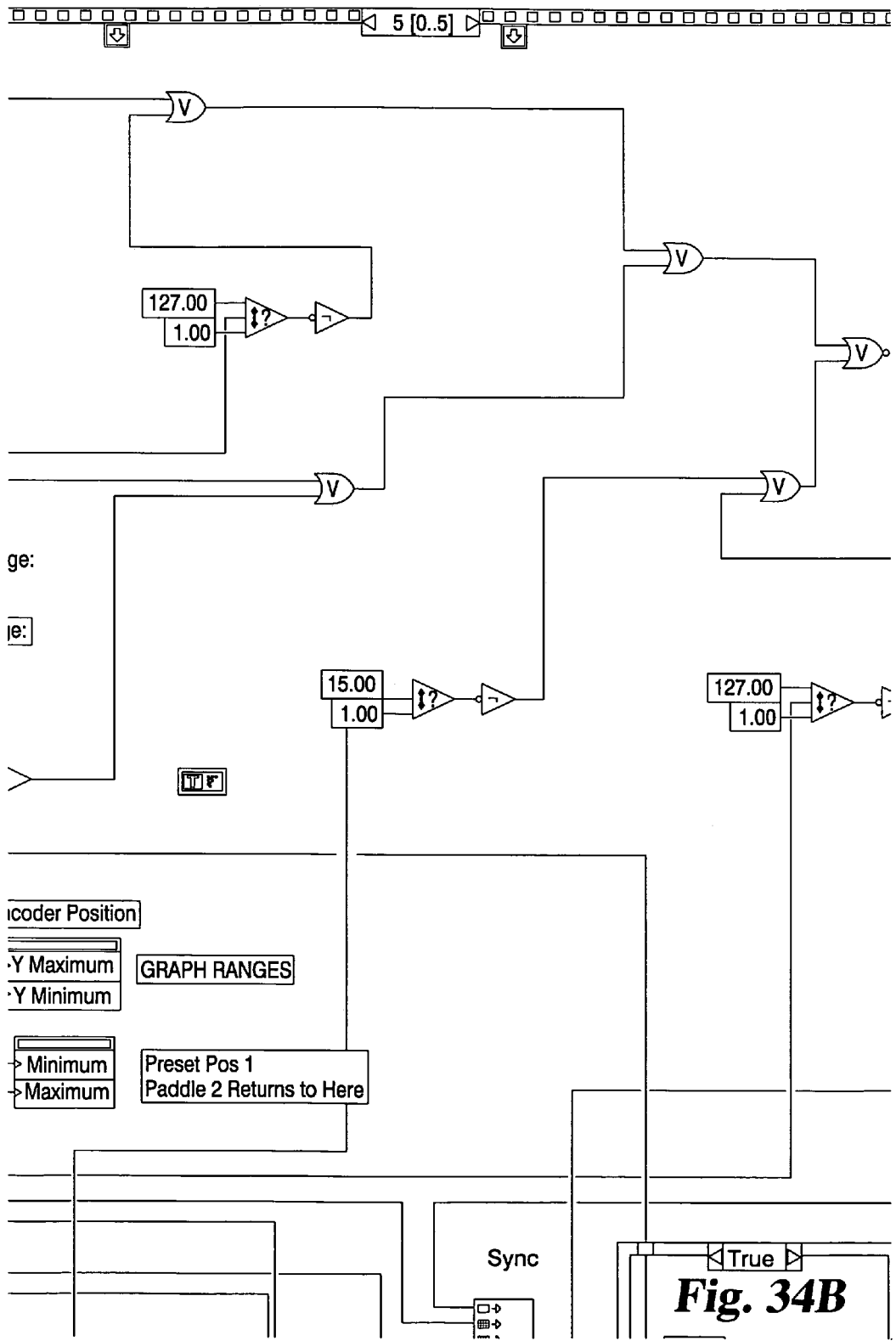
Figure 34C:
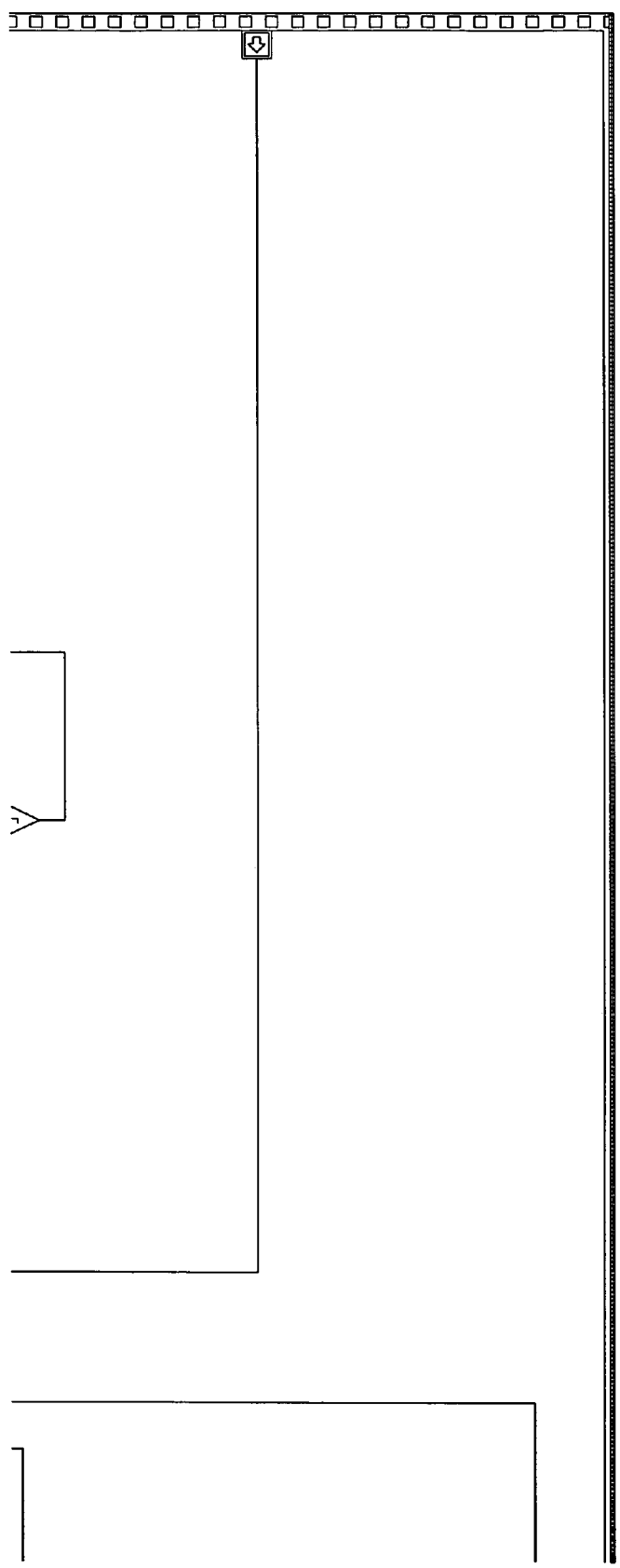
Figure 34D:
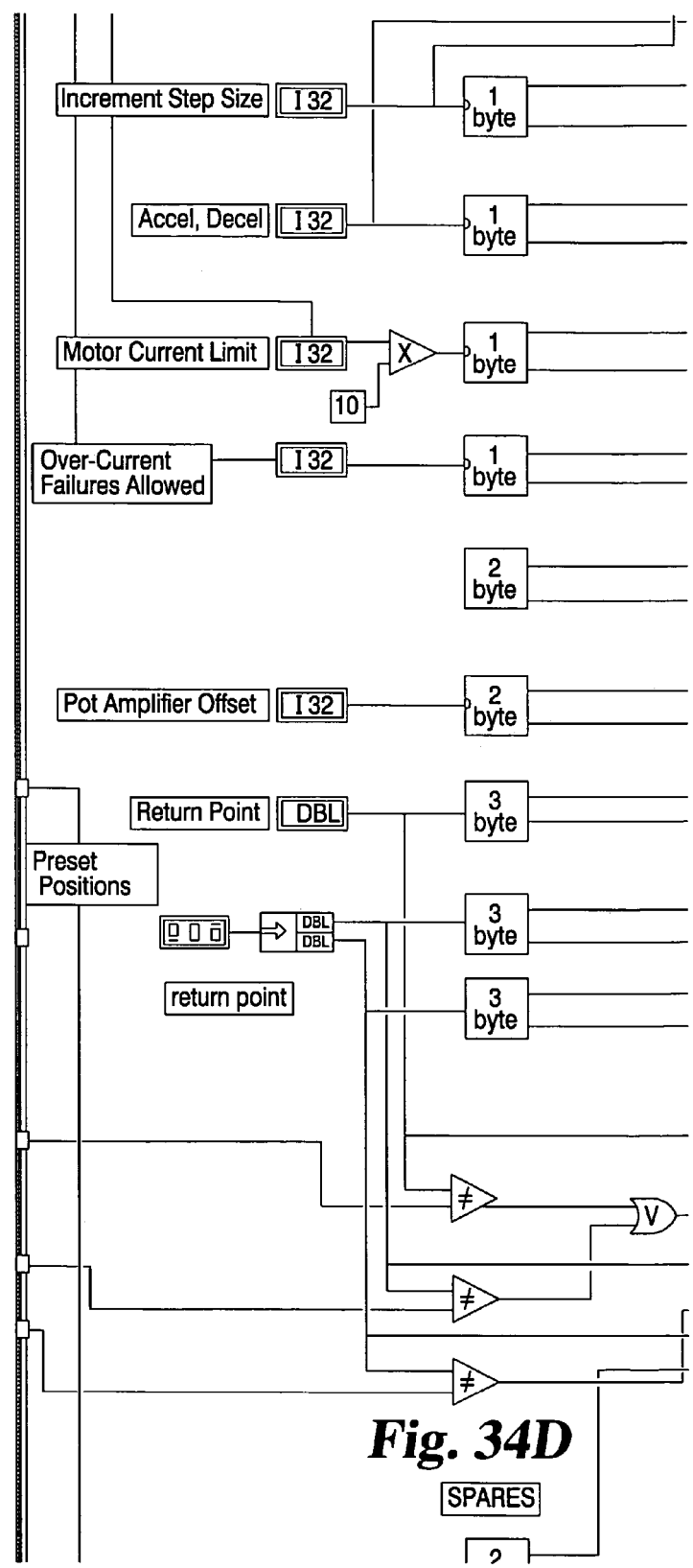
Figure 34E:
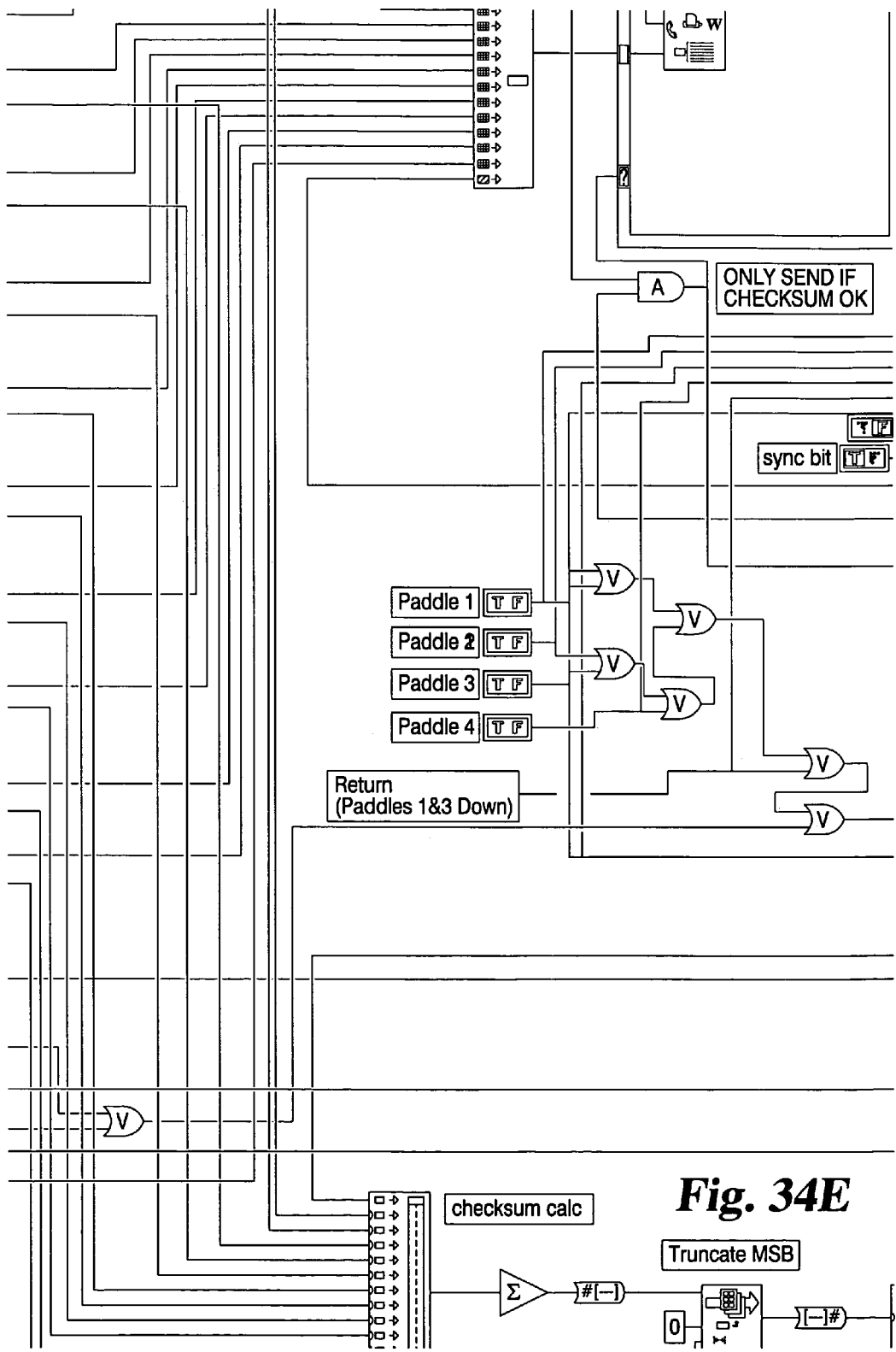
Figure 34F:
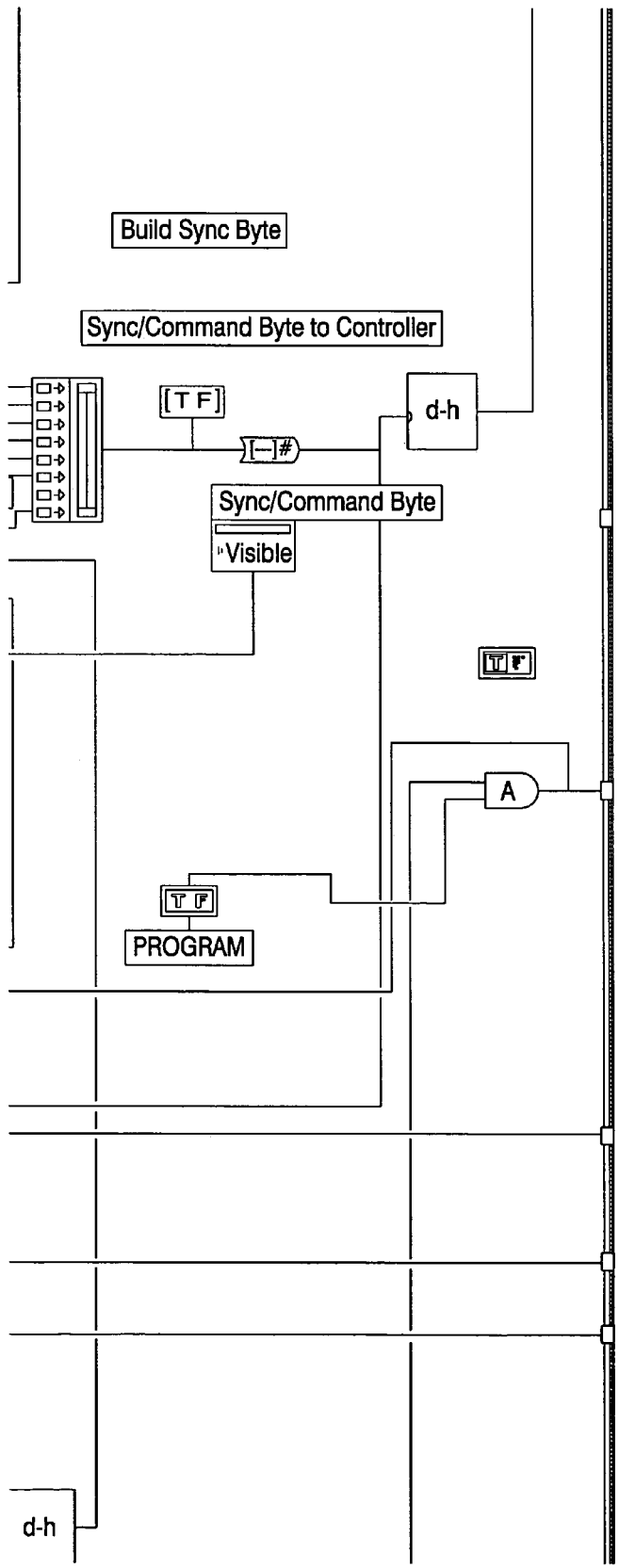
Figure 34G:
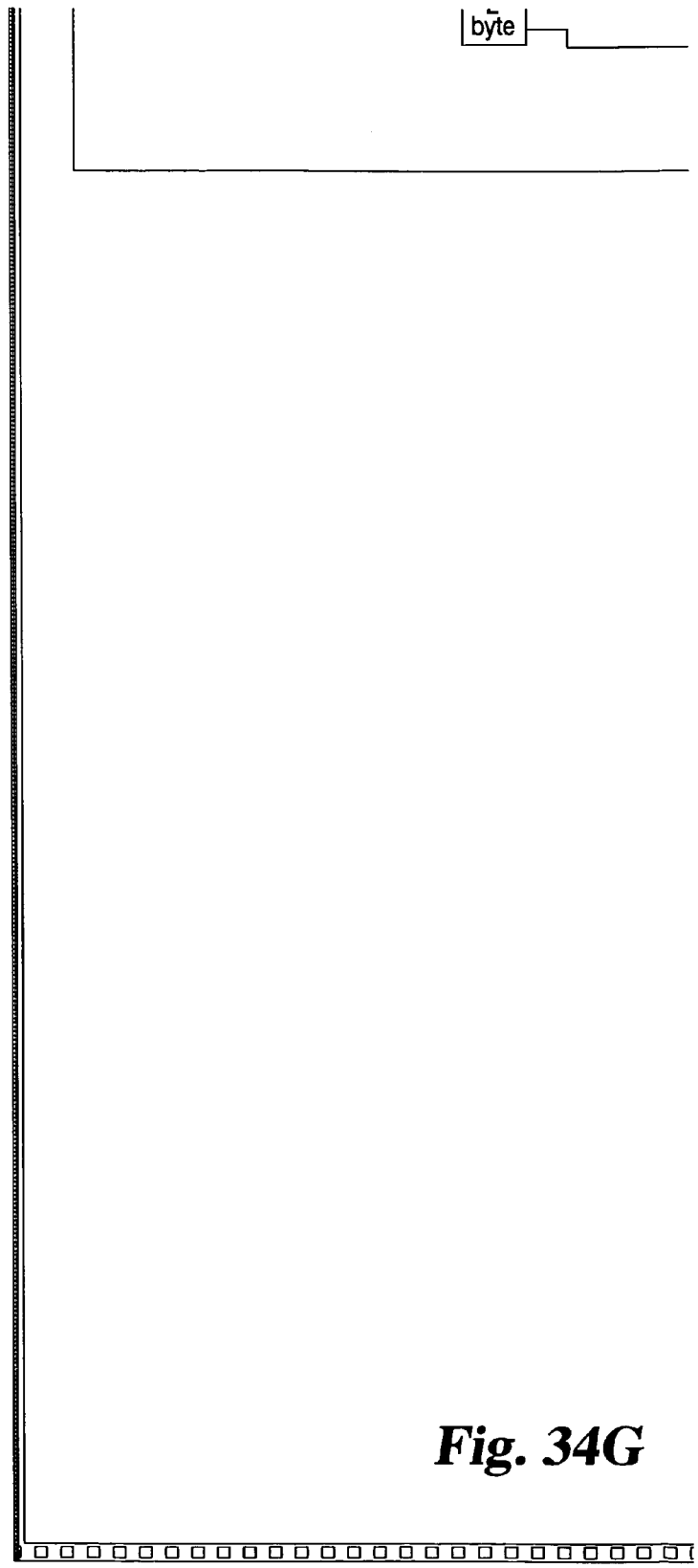
Figure 34H:
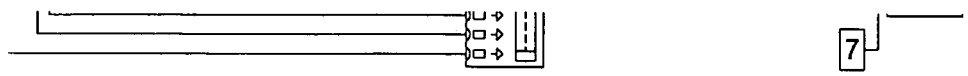
Figure 34I:
Figure 35:
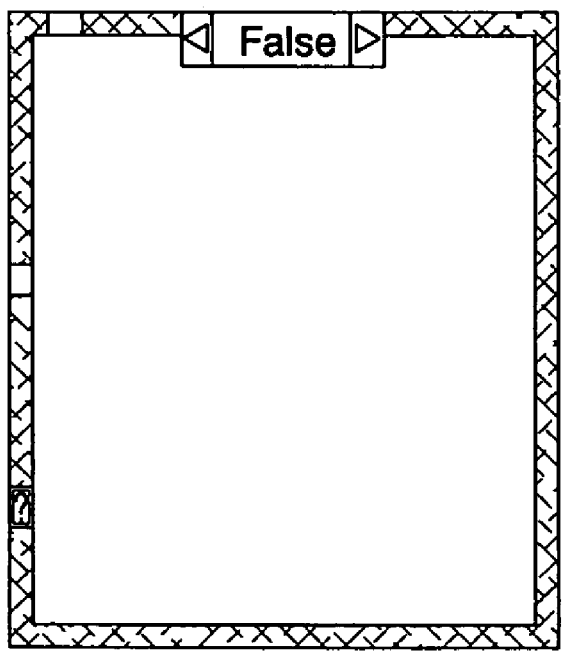
FIG. 35 shows the eleventh page of the diagram (code) of the computer program referenced in FIGS. 25A-25I.

With the Ladview programming (FIGS. 25-34) running on a laptop or other PC, FIG. 23 shows a computer screen shot of the user interface presented that the technician uses to set the defaults and additional system limits for governing the operation of control unit 13. FIG. 24 is the screen shot of FIG. 23, but showing settings entered into various fields. Upon assembly, knowing the jack screw pitch, the number of counts (of encoder 39) and the maximum physical limit of travel of master cylinder 37, the user would determine the maximum number of counts (i.e. 550,000) produced by encoder 39 as master cylinder 37 is run between its full in and full out positions. White this defines the outer physical limits of travel of master cylinder 37, the technician will likely set the operational limits of the system somewhat inside the physical limits. Thus, for physical limits producing a count of from 0 (Low) to 550,000 (High), the technician might set the operational limits through the Ladview software at 20,000 (Low) and 530,000 (High). Or, if it is desired to have only a narrow operating stroke, the technician might set these operational limits at 195,000 (Low) and 250,000 (High). In this example, if master cylinder 37 was capable of a 0.7 inch stroke, the system would thus have an operational stroke of 0.07 inches.

Referring to the block 81 of parameter entry fields, the technician will set the motor shaft operational limits and the sysyem's current (amperage) limits. Thus, in the previous example, the High Positon Limit field 82 would be set to 250,000, and the Low Position Limit field 83 would be set to 195,000. (FIG. 24) As with the high and low position limits, The Increment Stepsize field 84 corresponds to multiples of the encoder count and may be set from 0 to 127. Each increment of "1" produces a 256 count step in the encoder which, to the current embodiment, corresponds to a one half turn of the shaft of motor/gear box 38. Other results are contemplated depending on the encoder range, gearing, etc. An increment stepsize setting of "1" would essentially shut the system down since incrementing the shaft by 0×256 counts produces no turn in the motor shaft.

The Accel/Decel field 85 may be set from 0 to 15 to set a rate of acceleration of the motor shaft. Again, a setting of "0" would essentially shut down the motor.

Over-current protection is provided in fields 87-89. The Motor Current Limit field 87 provides the upper current threshold, above which a failure count is registered. The Over-Current Failures Allowed field 88 is where the technician will set the upper threshold number of failure counts above which the system will stop and a power-on restart will be necessary to continue using the system. The Over-Current Failures Seen field 89 displays the current count of failures. If the Over-Current Failures Seen field 89 value exceeds the value in the Over-Current Failures Allowed field 88, the system will shut down.

The Pot Amplifier Offset field 90 is where the technician can set the initial calibration setting to define the "home" position of the pot.

The blue block 93 overlaying a portion of the performance graph 94 indicates five programmed warnings that will appear should certain entered values be outside allowable settings. More or fewer warning messages could be provided. The individual message blocks do not appear unless (1) the program is not operationally connected to the control unit 13 or (2) unless a warning condition is satisfied. In the latter case, the only block(s) that would appear is that which addresses the particular warning condition that occurred.

The driver control display object 96 shown at the top of FIG. 23 (23*a* and 23*b*) is used to set the commands for control unit 13 to carry out upon actuation of the paddles 75-78 of driver control assembly 14. Block 96 is a setup tool that allows the technician, while operationally connected with control unit 13 (via serial port or wireless connection) en set up apparatus 10. The various objects within block 96 are as follows: buttons 97-100 represent the four paddles 75-78 connected with steering wheel 65. Slide bar 102 represents the operational limits of rotation of the central shaft of motor/gear box assembly 38 as set in fields 82 and 83. Red and green sliders 103 and 104 are used to set preprogrammed system return positions upon activating paddles 3 and 4, respectively. Blue knob 105 (set by the computer mouse) sets the default (home) position, to which the system will go upon pulling both paddles 1 and 3. Simultaneous pulling of both paddles 1 and 3 can be simulated here by depressing blue button 106.

To change settings in the current embodiment, the racecar is pulled into the Pius, for example, and the serial cable 62 from the laptop with the Ladview program is connected with the racecar's control unit 13. The current settings of control unit 13 will then be shown in the screen shot (FIG. 23) on the PC, and any other data stored in the car's DAQ will be uploaded, as well. Any changes desired to be made to the system (apparatus 10) are then made in the PC at the screen shot. Once the desired settings are made, the blue "PROGRAM to EEPROM" button 107 is pressed with the mouse, and the PC settings are uploaded to control unit 13. The performance graph 94 will show in real time during operation of the car the encoder position, the state of the system, the target (the value at which the encoder 39 is intended to be), and the pot position. The lower graph 108 indicates, also in real time, the motor current amperage.

FIG. 24 shows the seine computer screen shot as in FIG. 23, except showing a sample set of operational parameters entered Into certain fields, as shown. For example, the operational limits of rotation of the shaft in motor/gear box 38 are set at 195,000 (Low) and 250,000 (High). Memory positions have been set for paddle 3 at 210,000 and for paddle 4 at 240,800. Thus, depressing button 97 (emulating paddle 1) will cause rotation of the motor shaft of motor/gear box 38 until the encoder count bits 195,000, at which point the programming will cease causing the motor shaft to rotate in that direction despite button 97 (or paddle 1) being further actuated. Depressing button 98 (emulating paddle 2) will rotate the shaft in the other direction until the count reaches 250,000, at which point the programming will cease causing the motor to rotate in that direction. Depressing button 99 one time (emulating paddle 3) will automatically cause the motor shaft to rotate until the encoder count reaches 210.000. Likewise, depressing button 100 (emulating paddle 4) will cause the motor shaft to rotate from wherever it is until the encoder count reaches 240,800.

The default home position has been set just over 220,000. Depressing button 106 (emulating activating both paddles 1 and 3) will cause the program to rotate the motor shaft from wherever it is until it reaches the encoder count of approximately 220,000 (the "home" position).

Upon downloading the settings to control unit 13, paddles 75-78 will operate just as described above for the simulation in the Ladview program. The "quick home" feature enables the driver to quickly return to an otherwise safe operating position.

Other combinations of paddle movements to achieve actuation of one or more slave cylinders are contemplated. Greater or few paddles, located behind the outer grip, and evenly or unevenly distributed, are also contemplated. Paddles 75-78 are made of any appropriate material such as metal or plastic, and the preferred size and shape is shown (generally rectangular with an outer flair to enlarge the finger gripping area), but other appropriate shapes are also contemplated. Paddles 75-78 are contemplated to be fixedly mounted at their inboard ends (not shown) and are sufficiently flexible to permit bending upon being pulled. A push switch (not shown) mounted to the back side of central housing 68 is thus engaged upon pulling such paddle far enough against the switch. Releasing the paddle releases the switch.

It is contemplated that any combination of such switches and/or display devices can be mounted on the steering wheel, dash, gear lever or any location convenient for the driver. Control unit 13 can also be controlled via the CAN or Serial Data Link. In this way, some fashion of automatic control could be utilized.

While the embodiment of the invention is directed primarily for racecars with detachable steering wheels, user controllable switches and various useful telemetry, alternative embodiments are contemplated for any motor vehicle where it may be desired to vary the characteristics of the suspension system. For example and without limitation, the switches and data output could be mounted on the vehicle's dashboard, center console, door, etc.

Alternative embodiments are contemplated wherein the master and/or slave cylinder data, as well as the vehicle's location may be collected and stored by the DAQ or control unit and, in accordance with programming provided to the control unit 13, apparatus 10 may automatically vary the characteristics of the one or more of the vehicle's shock and spring assembly 18. For example and without limitation, after several laps on the track, the control unit may "learn" that the vehicle pushes through turn two and that a 0.14 inch advancement of master cylinder piston 42 properly compensates for the push. Thereafter, apparatus 10 automatically extends master cylinder piston 42 just before entering turn 2, and retracts it just upon exiting turn 2. Such learning may also be applied to passenger cars, for example, where the control unit may learn that the vehicle pushes upon entering a curving, poorly banking high-speed highway ramp and may automatically advance the master cylinder piston 42 the appropriate amount. Such learning may incorporate standard GPS access.

In one embodiment the following system components are used:

Electrical Input Specifications:

| Input Power | |
|---|---|
| Voltage | 8-18 VDC |
| Supply Current | 50-90 mA |
| Supply regulation | PWM switch mode |
| PWM Frequency | 100 KHz |

Reverse polarity protected to control circuits. Motor drives are NOT reverse diode protected.

| Input Signals | |
|---|---|
| Switches | Four (4). Dry contacts to ground. Must sink 5 mA minimum. |
| Limit Switches | Two (2) Open collector, 5 mA sink minimum |

| -continued | |
|---|---|
| Serial Link | RS 232 |
| Serial Speeds | 115.2K |
| CAN Link | V 2.0b |
| CAN Speed | 1.0 mbps |
| Potentiometer: | |
| Exciter Output | 5 V (via a 47 ohm decoupling resistor) |
| Input | 10K input impedance (resistive), 120 pf bypass |
| Encoder: | |
| Supply | +5 v |
| Inputs | 2 phase, A and B, 5 ma sink minimum |
| Resolution | 500 lines/rev |
| Speed | 7000 RPM max |
| Output Specifications | |
| Motor | |
| Motor Drives | 12 Amps Continuous |
| Speed Control | PWM |
| Frequency | 15 KHz |
| Current limits | Set via the PC kit, 0.1 to 10 Amps |
| Method | Bi-Directional H-Bridge drive |
| Heat Sinking | Drive outputs heat-sinked to billet case, electrically isolated |
| Signal Output Specifications | |
| Position | 0-5 VDC, proportional to the position of master or slave cylinder. |
| Motor Current | 0-5 VDC, proportional to motor current 1V per Amp |
| State | 0-5 VDC, indicates controller operation state |
| CAN Link | Encoded position, pot wiper position, motor current, battery voltage, control unit temperature, state indicator |
| Serial Link | Encoded position, pot wiper position, motor current, battery voltage, control unit temperature, state indicator |

The following Exhibit A shows computer code in one embodiment for programming control unit 13 to operate in accordance with the schematics of FIGS. 6-10 and in accordance with the above described operation.

EXHIBIT A

```
                            WJ2 458E.ASM
;*********************************************************************
;
;
;           Weight Jacker Controller
;
;
;           WJ2 458B.ASM
;           PROCESSOR CHANGED TO 18F458
;           16 Dec 2003, jcs
;           Copyright 2004, MC Technologies, Eau Claire Wisconsin
;
;
                ;Version B
;
;           Released for stand-alone testing 2 Jan 2004   jcs
;           This version handles potentiometer feedback only.
;           Pinned out for PCB # MCT006B only.
;
;           Version C starts using the encoder for position feedback as well
;
;           Version D uses both encoder and pot
;           Pot times <factor> = encoder counts
;       <factor> is an integer number around 782
;
;           Version E uses Pot to set home position for encoder
;               Main release for testing
;               Lab evaluation complete 13 Jan, 2004 at MEG, Indianapolis, IN
;               Use with WJP6 PC kit
;
;           Rev List to follow now:

;*********************************************************************
;
            PROCESSOR 18F458

LIST P=18F458

INCLUDE P18F458.inc
;*********************************************************************

;MACROS
RUNIN       MACRO
                    MOVFF       CCPR1L,S_TEMP
                    CLRF        CCPR1L
                    NOP
                    NOP
                    NOP
                    NOP
                    BCF         PORTC,00
                    BCF         PORTC,01
                    BSF         TRISC,00            ;RUN MOTOR (FLOAT CONTROL
PINS)
                    BCF         TRISC,01
                    NOP
                    NOP
                    NOP
                    NOP
                    MOVFF       S_TEMP,CCPR1L
```

WJ2 458E.ASM

```
            ENDM

RUNOUT  MACRO
            MOVFF   CCPR1L,S_TEMP
            CLRF    CCPR1L
            NOP
            NOP
            NOP
            NOP
            BCF     PORTC,00
            BCF     PORTC,01
            BCF     TRISC,00            ;RUN MOTOR (FLOAT CONTROL
PINS)
            BSF     TRISC,01
            NOP
            NOP
            NOP
            NOP
            MOVFF   S_TEMP,CCPR1L
            ENDM

MOTOFF  MACRO
            CLRF    CCPR1L
            CALL    WAIT
            BCF     PORTC,00
            BCF     PORTC,01
            BCF     TRISC,00            ;STOP MOTOR
            BCF     TRISC,01
            BSF     MFLAGS,BLANK
            ENDM

BSR0    MACRO
            CLRF    BSR
            ENDM

BSR1    MACRO
            MOVLW   01
            MOVWF   BSR
            ENDM

;****************************************************************

;CONSTANTS

BYTSENT EQU         .25                 ;NUMBER OF DATA BYTES SENT
PC TO CONTROLLER
E2CSL   EQU         01F                 ;EEPROM CHECKSUM LOCATION

EPR     EQU         .4                  ;NUMBER IF EEPROM
PROGRAM REQUESTS NEEDED

;WINDOW SIZES
            ;WHILE RUNNING
MWH     EQU         00
MWM     EQU         01
MWL     EQU         0FF

;WHILE AT REST
MRH     EQU         00
MRM     EQU         01
MRL     EQU         0FF

SETIM   EQU         .5                  ;TIMES IT HAS BEEN SETTLED
SERNUM  EQU         .05                 ;BOX SERIAL NUMBER
```

WJ2 458E.ASM

;**********************************************************************

;GENERAL RAM EQUATES

```
W_T                 EQU     00
STATUS_T    EQU     01
BSR_T       EQU     02
PCLATH_T    EQU     03

TEMP        EQU     04
TEMP1       EQU     05
TEMP2       EQU     06
TEMP3       EQU     07
TEMP4       EQU     08
MAXSPD      EQU     09

COUNT       EQU     0A

POTADD      EQU     0B              ;WHICH DIGI POT TO ADDRESS, 0 OR 1?
POTVAL      EQU     0C

FLAGS       EQU     0D              ;FLAG REGISTER
SETTLD      EQU     00
SWDOWN      EQU     01
NTR                 EQU     02              ;SET IF WE NEED TO RESET
CONTROLLER
CSIOK       EQU     03
TOUT        EQU     04              ;SET IF RX TIMED OUT
ABOVE       EQU     05              ;SET IF ABOVE TARGET
BELOW       EQU     06              ;SET IF BELOW TARGET
INWIN       EQU     07              ;SET IF EQUAL OR IN THE "WINDOW"

STOUT       EQU     0E              ;SERIAL IN TIMER COUNTER

FLAGS2      EQU     0F
REST        EQU     01
UPF                 EQU     02

EEADRH      EQU     10
ADDR        EQU     11
EDAT        EQU     12

CSUM        EQU     13              ;CHECKSUM
RXTEMP      EQU     14
BYTCNT      EQU     15
TCNT        EQU     16

SYNCMD      EQU     17              ;SYNC/COMMAND BYTE OUT TO PC
PGMOK       EQU     00              ;SET OF PCK LINK WAS OK
CMERR       EQU     01              ;SET IF WE HAD A COMM ERROR
E2ERR       EQU     02              ;SET IF E2 WAS BAD
OISD        EQU     03              ;SET IF OVERCURRENT SHUT DOWN
NOMOV       EQU     04              ;SET IF IT WON'T MOVE
WIND        EQU     05

POSH        EQU     18
POSM        EQU     19
POSL        EQU     1A

BOXTH       EQU     1B
BOXTL       EQU     1C

MOTIH       EQU     1D              ;MEASURED MOTOR CURRENT
MOTIL       EQU     1E

MFLAGS      EQU     1F              ;FLAGS FOR MOTION
```

```
                                    WJ2 458E.ASM
MOVING  EQU             00              ;SET IF MOVING
MIN             EQU             01
MOUT    EQU             02
OVERI   EQU             03              ;SET IF OVER CURRENT
BLANK   EQU             04              ;BLANK WHILE ACCELERATING
SLWNG   EQU             05              ;SET IF SLOWING DOWN

ATEMP   EQU             20
DBNCE   EQU             21
STALCT  EQU             22              ;COUNTS OVERCURRENTS IN LOOPS
MOTCNT  EQU             23              ;MOTION COUNTER
MOTVEL  EQU             24              ;BI-DIRECTIONAL VELOCITY
WINH    EQU             25              ;HAS +/- WIDTH OF POSITION WINDOW
WINM    EQU             26              ;LOW BYTE OF WINDOW
WINL    EQU             27

IFAILS  EQU             28
STATE   EQU             29

TARGH   EQU             2A              ;USE FOR DESIRED PUMP POSITION
TARGM   EQU             2B
TARGL   EQU             2C

DSH             EQU     2D              ;
DSM             EQU     2E              ;USE FOR TEMP DATA BYTES OUT
DSL             EQU     2F
        ;START SERIAL BUFFER AT 030h RUN TO 050h
        ;THESE ARE LIMITS USED TO CHECK MOTION AGAINST

PCCMND  EQU             30              ;THIS IS SYNC/COMMAND BYTE FROM THE
PC

MXPH    EQU             31
MXPM    EQU             32              ;MAX POSITION
MXPL    EQU             33

MNPH    EQU             34              ;MIN POS
MNPM    EQU             35
MNPL    EQU             36

ISIZE   EQU             37              ;INCREMENT SIZE

ACCEL   EQU             38              ;ACCEL/DECEL

MOTIAL  EQU             39              ;ALLOWED MOTOR CURRENT

OCFA    EQU             3A              ;# FAILS ALLOWED

POTAGH  EQU             3B              ;POT AMP GAIN
POTAGL  EQU             3C
POTOFH  EQU             3D              ;POT AMP OFFSET
POTOFL  EQU             3E

RTPH    EQU             3F
RTPM    EQU             40
RTPL    EQU             41

PP1H    EQU             42
PP1M    EQU             43
PP1L    EQU             44

PP2H    EQU             45
PP2M    EQU             46
PP2L    EQU             47

SPARE1  EQU             48
```

WJ2 458E.ASM

```
SPARE2    EQU       49

;*********************************************************

VELOC     EQU       04A                ;VELOCITY

LPOSH     EQU       04B                ;USE TO HOLD LAST MEASURED POSITION
LPOSM     EQU       04C
LPOSL     EQU       04D

ACC0      EQU       04E                ;MATH REGISTERS
ACC1      EQU       04F
ACC2      EQU       050
ACC3      EQU       051
ACC4      EQU       052
ACC5      EQU       053

I_TEMP    EQU       054

E2CS      EQU       055                ;CHECKSUM FOR EEPROM (EEPROM LOC IS
1D h)
PCT          EQU          056          ;PROGRAM COUNTER
S_TEMP    EQU       057
ECNTHI    EQU       058
ECNTLO    EQU       059
SERBITS   EQU       05A
ENPOSH    EQU       05B                ;ENCODER POSITION REGISTERS
ENPOSM    EQU       05C
ENPOSL    EQU       05D

SETCNT    EQU       05E

;END OF BANK 0000 OF RAM

;*********************************************************

;BSR = 0001

PERRH     EQU       60                 ;POSITION ERROR
PERRM     EQU       61
PERRL     EQU       62
IERRH     EQU       63
IERRM     EQU       64
IERRL     EQU       65

;*********************************************************

;COMMAND BITS IN SYNC BYTE FROM PC
          ;PCCMND BYTE

PAD1      EQU       00
PAD2      EQU       01
PAD3      EQU       02
PAD4      EQU       03
RTC          EQU          04           ;RETURN TO ASSIGNED CENTER
PROE2     EQU       05                 ;SET TO PROGRAM EEPROM W/LATEST
VALUES
RSC          EQU       06              ;SET IF WE NEED TO RESET
CONTROLLER
;         MSB ALWAYS A 1

;*********************************************************

;CPU PIN EQUATES

;PORTB EQUATES
```

WJ2 458E.ASM

```
LIMA    EQU             00
LIMB    EQU             01
TRIG    EQU             04
PDATA   EQU             05

;PORTC EQUATES

MSTOP1  EQU             00                              ;USED TO STOP MOTOR
MSTOP2  EQU             01
SCL             EQU     03
SDA             EQU     04
RS1             EQU     05

;PORTD EQUATES

;               EQU     00
;               EQU     01
CS2             EQU     02
CS1             EQU     03
S4              EQU     04
S3              EQU     05
S1              EQU     06
S2              EQU     07
```

;****************************************************************

```
        ORG     0                       ;RESET VECTOR
        NOP
        GOTO    INIT

ORG     8                       ;HI PRIORITY INTERRUPT VECTOR
        GOTO    INTSVC

ORG     18                      ;LO PRIORITY INTERRUPT VECTOR
        GOTO    INTSVC
```

;****************************************************************

```
        ;MEASURE A/D CHANNEL 1
MI      MOVLW   081                     ;FOSC/32, A/D IS ON, CHANNEL 0 IS SELECTED
        GOTO    MAD
        ;MEASURE A/D CHANNEL 2
POS     MOVLW   089                     ;FOSC/32, A/D IS ON, CHANNEL 1 IS SELECTED
        GOTO    MAD
        ;MEASURE A/D CHANNEL 3
BOXT    MOVLW   091                     ;FOSC/32, A/D IS ON, CHANNEL 2 IS SELECTED
        GOTO    MAD
        ;MEASURE A/D CHANNEL 4
SPLIT   MOVLW   0A1                     ;FOSC/32, A/D IS ON, CHANNEL 4 IS SELECTED
        GOTO    MAD

MAD     MOVWF   ADCON0                  ;01 100 001
        MOVLW   .19                     ;WAIT
        MOVWF   COUNT
        MOVLW   80
        MOVWF   ADCON1                  ;F/32, ALL A AND E ARE ANALOG
INPUTS, RT JUSTIFIED
LOOP    CLRWDT
        DECFSZ  COUNT,F
        GOTO    LOOP
        BSF     ADCON0,GO               ;START A/D CONVERSION
POLL    CLRWDT
        BTFSC   ADCON0,DONE
        GOTO    POLL
```

WJ2 458E.ASM
RETURN

;********************************************************************

;SETS LOW HALF OF POT U13
;SETS GAIN OF POT AMP

STPOTGN    BCF    PORTD,CS2         ;SELECT U13
           BSF    PORTD,CS1         ;

BCF    PORTC,SDA         ;SET BOTH ADDRESS BITS TO A ZERO

BCF    PORTC,SCL         ;HI ADDRESS
           BSF    PORTC,SCL
           BCF    PORTC,SCL         ;LOW ADDRESS
           BSF    PORTC,SCL
           GOTO   CLKDAT

;SETS UPPER HALF OF POT U13
;SETS POT AMP OFFSET

STPOTOF    BCF    PORTD,CS2         ;SELECT U13
           BSF    PORTD,CS1         ;

BCF    PORTC,SDA         ;SET FIRST ADDRESS BIT TO A ZERO

BCF    PORTC,SCL         ;HI ADDRESS
           BSF    PORTC,SCL

BSF    PORTC,SDA         ;SET SECOND ADDRESS BIT TO A 1

BCF    PORTC,SCL         ;LOW ADDRESS
           BSF    PORTC,SCL
           GOTO   CLKDAT

;********************************************************************

;SETS LOW HALF OF POT U12

U12LO      BCF    PORTD,CS1         ;SELECT U12
           BSF    PORTD,CS2         ;

BCF    PORTC,SDA         ;SET BOTH ADDRESS BITS TO A ZERO

BCF    PORTC,SCL         ;HI ADDRESS
           BSF    PORTC,SCL
           BCF    PORTC,SCL         ;LOW ADDRESS
           BSF    PORTC,SCL
           GOTO   CLKDAT

;SETS UPPER HALF OF POT U12

U12HI      BCF    PORTD,CS1         ;SELECT U12
           BSF    PORTD,CS2         ;

BCF    PORTC,SDA         ;SET FIRST ADDRESS BIT TO A ZERO

BCF    PORTC,SCL         ;HI ADDRESS
           BSF    PORTC,SCL

BSF    PORTC,SDA         ;SET SECOND ADDRESS BIT TO A

WJ2 458E.ASM

1

```
               BCF      PORTC,SCL              ;LOW ADDRESS
               BSF      PORTC,SCL
               GOTO     CLKDAT

;ADDRESS IS IN, NOW DO DATA, MSB FIRST

CLKDAT    MOVLW    .8                          ;8 DATA BITS
          MOVWF    COUNT

CLKDAT1   BTFSC    POTVAL,07             ;
          GOTO     SDB1
          BCF               PORTC,SDA           ;DATA IS A 0
          GOTO     CLKDAT2                     ;
SDB1      BSF               PORTC,SDA           ;
CLKDAT2   BCF               PORTC,SCL           ;ONE CLOCK
          BSF               PORTC,SCL

BCF               PORTC,00            ;STUDY THIS !!!!!! WHY
NEEDED
          BCF               PORTC,01

DECFSZ   COUNT,F
          GOTO     NEXPBIT                    ;NOT DONE YET
          BSF               PORTC,SCL          ;RESET ALL PINS
          BSF               PORTC,SDA          ;
          BSF               PORTD,CS1          ;
          BSF               PORTD,CS2          ;
          BSF               PORTC,RS1
          RETURN

NEXPBIT   RLNCF    POTVAL,F         ;SHIFT LEFT ONCE
          GOTO     CLKDAT1
```

;*********************************************************************

```
          ;COMPARE ENPOSH:ENPOSM:ENPOSL: TO TARGH:TARGM:TARGL
          ;SET FLAGS TO TELL WHERE IT IS
          ;THEN CHECK TO SEE IF IT IS WITHIN THE WINDOW
          ;INWIN FLAG IS SET IF IT IS WITHIN THE WINDOW

PCOMP     BCF               FLAGS,ABOVE
          BCF               FLAGS,BELOW
          BCF               FLAGS,INWIN
          BCF               FLAGS2,UPF         ;USE TO SIGNIFY UPPER BYTE
SIZE DIFFERENCE

;CHECK HI BYTES FIRST

MOVF     ENPOSH,W                    ;TARGH - POSH
          SUBWF    TARGH,W
          BTFSS    STATUS,Z                    ;SEE IF THEY ARE THE SAME
          GOTO     CBM1                        ;BYTES NOT THE SAME, CHECK MAGNITUDE

;CHECK THE MIDDLE BYTES NEXT

MOVF     ENPOSM,W                    ;TARGH - POSH
          SUBWF    TARGM,W
          BTFSS    STATUS,Z                    ;SEE IF THEY ARE THE SAME
          GOTO     CBM1                        ;BYTES NOT THE SAME, CHECK MAGNITUDE

;CHECK THE LOW BYTES LAST

MOVF     ENPOSL,W                    ;TARGH - POSH
          SUBWF    TARGL,W
          BTFSS    STATUS,Z                    ;SEE IF THEY ARE THE SAME
```

WJ2 458E.ASM

```
                GOTO    CBM                     ;BYTES NOT SAME
                GOTO    WINCHK                  ;CHECK FOR WINDOW

;CHECK BYTE MAGNITUDE

CBM1    BSF             FLAGS2,UPF              ;UPPER TWO NOT THE SAME
CBM             BTFSS   STATUS,C                ;SEE WHICH IS BIGGER
                GOTO    PIA
PIB     BSF                     FLAGS,BELOW
                GOTO    WINCHK                  ;CHECK FOR WINDOW
PIA     BSF                     FLAGS,ABOVE

;SEE IF WE ARE IN THE "WINDOW"
                ;IF ABOVE, DO ENPOS - TARG
                ;IF BELOW, DO TARG - ENPOS

WINCHK  BTFSC   FLAGS,ABOVE                     ;
                GOTO    CWA

;TARG - POS

MOVFF   TARGH,ACC5
                MOVFF   TARGM,ACC4
                MOVFF   TARGL,ACC3
                MOVFF   ENPOSH,ACC2
                MOVFF   ENPOSM,ACC1
                MOVFF   ENPOSL,ACC0
                CALL    SUB24
                GOTO    WMC

;POS - TARG

CWA             MOVFF   ENPOSH,ACC5
                MOVFF   ENPOSM,ACC4
                MOVFF   ENPOSL,ACC3
                MOVFF   TARGH,ACC2
                MOVFF   TARGM,ACC1
                MOVFF   TARGL,ACC0
                CALL    SUB24

;NOW CHECK MAGNITUDE OF DIFFERENCE
                ;SEE IF ACC5:ACC3 IS BIGGER THAN WINH:WINL
                ;SET FLAG IF INSIDE THIS "WINDOW"
                ;WINDOW IS 24 BITS

;DIFFERENCE - WINDOW
                ;SAVE DIFFERENCE AS POSITION ERROR

WMC             MOVFF   ACC5,PERRH
                MOVFF   ACC4,PERRM
                MOVFF   ACC3,PERRL

;POSITION ERRORS ARE SAVED

MOVFF   WINH,ACC2
                MOVFF   WINM,ACC1
                MOVFF   WINL,ACC0

CALL    SUB24

BTFSS   ACC5,07                 ;UPPER BIT IS SET IF WIN >
DIFFERENCE
                GOTO    NIW

IIW     BSF                     FLAGS,INWIN
        BSF                     SYNCMD,05
```

```
                            WJ2 458E.ASM
            RETURN
NIW         BCF             FLAGS,INWIN
            BCF             SYNCMD,05
            RETURN
```

;****************************************************************************

```
            ;SEE IF THE MOTOR CURRENT IS OK
            ;CHECK AGAINST MOTIH:MOTIL

MSTALL  BCF             FLAGS,BELOW
        BCF             FLAGS,ABOVE
        CLRF    ACC1
        MOVFF   MOTIAL,ACC0
        RLCF    ACC0,F                      ;MULT MOTIAL BY 8, SPLIT TO TWO BYTES
        RLCF    ACC1,1
        RLCF    ACC0,F
        RLCF    ACC1,1
        RLCF    ACC0,F
        RLCF    ACC1,1                      ;LIMITS ARE ACC1:ACC0

;SEE IF THE UPPER BYTES ARE THE SAME

MOVF    ACC1,W
        SUBWF   MOTIH,W
        BTFSS   STATUS,Z
        GOTO    HBNS                        ;NOT SAME
        GOTO    HBIS                        ;IS SAME

;UPPER BYTES THE SAME, WHICH LOW BYTE IS BIGGER

HBIS    MOVF    ACC0,W
        SUBWF   MOTIL,W
        BTFSS   STATUS,C
        GOTO    NIS                         ;SMALLER

NIB     BSF             FLAGS,ABOVE         ;BIGGER
        RETURN
NIS     BSF             FLAGS,BELOW         ;
        RETURN

;UPPER BYTES NOT SAME, WHICH IS BIGGER

HBNS    MOVF    ACC1,W
        SUBWF   MOTIH,W
        BTFSC   STATUS,C
        GOTO    NIB                         ;NUMBER IS BIGGER
        GOTO    NIS                         ;NUMBER IS SMALLER
```

;****************************************************************************

```
            ;SOFT MOTOR START

SOFTST  MOVLW   0F                          ;ACCEL LIMITED TO 0-15
        ANDWF   ACCEL,F
        MOVF    ACCEL,W
        ADDWF   CCPR1L,W
        MOVWF   TEMP
        MOVF    MAXSPD,W                    ;GET MAX SPEED
        SUBWF   TEMP,W
        BTFSC   STATUS,C                    ;
        GOTO    AMS                         ;ABOVE MAX SPD
        GOTO    BMS
```

```
                        WJ2 458E.ASM
BMS         BSF         MFLAGS,BLANK
            MOVFF       TEMP,CCPR1L
            RETURN

AMS         MOVLW       MWH                             ;INSTALL WINDOWS FOR
RUNNING
            MOVWF       WINH
            MOVLW       MWM
            MOVWF       WINM
            MOVLW       MWL

BCF         MFLAGS,BLANK

MOVLW       .110                            ;MAKE SURE PWM IS NOT TOO
BIG
            SUBWF       MAXSPD,W
            BTFSC       STATUS,C
            GOTO        SETMAX
            MOVF        MAXSPD,W
            MOVWF       CCPR1L
            RETURN

SETMAX MOVLW .110
            MOVWF       CCPR1L
            RETURN

;************************************************************************

;SEND DATA STREAM OUT HERE
            ;NOTE----- YOU MUST CLEAR ALL MSBs EXCEPT FOR THE SYNC BYTE (1ST
BYTE)

DPACKET CLRF CSUM
            MOVF        SYNCMD,W
            BSF         SYNCMD,07                       ;MAKE SURE THIS IS SET
            MOVWF       TXREG

;SEND PUMP POSITION
            ;FROM ENCODER

CALL        BWAIT
            MOVFF       ENPOSH,DSH
            MOVFF       ENPOSM,DSM
            MOVFF       ENPOSL,DSL
            CALL        DCON3                           ;CONVERT TO TX FORM
            MOVF        DSH,W
            ADDWF       CSUM,F
            MOVWF       TXREG                           ;BYTE 0
            CALL        BWAIT                           ;

MOVF        DSM,W
            ADDWF       CSUM,F
            MOVWF       TXREG                           ;BYTE 1
            CALL        BWAIT
            MOVF        DSL,W
            ADDWF       CSUM,F
            MOVWF       TXREG                           ;BYTE 2

;#########

CALL        BWAIT                           ;SEND MAX POSITION HERE (ALREADY IN
TX FORM)
            BCF         MXPH,07
            MOVF        MXPH,W
            ADDWF       CSUM,F
            MOVWF       TXREG                           ;BYTE 3
            CALL        BWAIT                           ;
```

```
                                      WJ2 458E.ASM
                  BCF      MXPM,07
                  MOVF     MXPM,W
                  ADDWF    CSUM,F
                  MOVWF    TXREG              ;BYTE 4
                  CALL     BWAIT              ;
                  BCF      MXPL,07
                  MOVF     MXPL,W
                  ADDWF    CSUM,F
                  MOVWF    TXREG              ;BYTE 5

;#########

CALL     BWAIT              ;SEND MIN POSITION HERE (ALREADY IN
TX FORM)
                  BCF      MNPH,07
                  MOVF     MNPH,W
                  ADDWF    CSUM,F
                  MOVWF    TXREG              ;BYTE 6
                  CALL     BWAIT              ;
                  BCF      MNPH,07
                  MOVF     MNPM,W
                  ADDWF    CSUM,F
                  MOVWF    TXREG              ;BYTE 7
                  CALL     BWAIT              ;
                  BCF      MNPH,07
                  MOVF     MNPL,W
                  ADDWF    CSUM,F
                  MOVWF    TXREG              ;BYTE 8

;#########

CALL     BWAIT              ;SEND RETURN POSITION HERE (ALREADY
IN TX FORM)
                  BCF      RTPH,07
                  MOVF     RTPH,W
                  ADDWF    CSUM,F
                  MOVWF    TXREG              ;BYTE 9
                  CALL     BWAIT              ;
                  BCF      RTPM,07
                  MOVF     RTPM,W
                  ADDWF    CSUM,F
                  MOVWF    TXREG              ;BYTE 10
                  CALL     BWAIT              ;
                  BCF      RTPL,07
                  MOVF     RTPL,W
                  ADDWF    CSUM,F
                  MOVWF    TXREG              ;BYTE 11

;#########

CALL     BWAIT              ;SEND PRESET 1 POSITION HERE
(ALREADY IN TX FORM)
                  BCF      PP1H,07
                  MOVF     PP1H,W
                  ADDWF    CSUM,F
                  MOVWF    TXREG              ;BYTE 12
                  CALL     BWAIT              ;
                  BCF      PP1M,07
                  MOVF     PP1M,W
                  ADDWF    CSUM,F
                  MOVWF    TXREG              ;BYTE 13
                  CALL     BWAIT              ;
                  BCF      PP1L,07
                  MOVF     PP1L,W
                  ADDWF    CSUM,F
                  MOVWF    TXREG              ;BYTE 14
```

WJ2 458E.ASM

;###########

```
                CALL    BWAIT                   ;SEND PRESET 2 POSITION HERE
(ALREADY IN TX FORM)
                MOVF    PP2H,W
                BCF             PP2H,07
                ADDWF   CSUM,F
                MOVWF   TXREG                   ;BYTE 15
                CALL    BWAIT                   ;
                MOVF    PP2M,W
                BCF             PP2M,07
                ADDWF   CSUM,F
                MOVWF   TXREG                   ;BYTE 16
                CALL    BWAIT                   ;
                MOVF    PP1L,W
                BCF             PP1L,07
                ADDWF   CSUM,F
                MOVWF   TXREG                   ;BYTE 17
```

;###########

```
                MOVFF   MOTIH,DSM               ;MOTOR CURRENT
                MOVFF   MOTIL,DSL
                CALL    DCON2                   ;
                MOVF    DSM,W                   ;18
                ADDWF   CSUM,F
                MOVWF   TXREG
                CALL    BWAIT                   ;
                MOVF    DSL,W                   ;19
                ADDWF   CSUM,F
                MOVWF   TXREG
```

;###########

```
                CALL    BWAIT                   ;SEND MOTOR CURRENT MAXIMUM
                BCF             MOTIAL,07
                MOVF    MOTIAL,W
                ADDWF   CSUM,F
                MOVWF   TXREG                   ;BYTE 20
```

;###########

```
                CALL    BWAIT                   ;SEND MOTOR CURRENT FAILURES ALLOWED
                BCF             OCFA,07
                MOVF    OCFA,W
                ADDWF   CSUM,F
                MOVWF   TXREG                   ;BYTE 21
```

;###########

```
                CALL    BWAIT                   ;SEND MOTOR CURRENT FAILURES SEEN
                BCF             IFAILS,07
                MOVF    IFAILS,W
                ADDWF   CSUM,F                  ;
                MOVWF   TXREG                   ;BYTE 22
```

;###########

```
                CALL    BWAIT                   ;SEND STATE
                BCF             STATE,07
                MOVF    STATE,W
                ADDWF   CSUM,F
                MOVWF   TXREG                   ;BYTE 23
```

;###########

WJ2 458E.ASM

```
MOVFF   BOXTH,DSM               ;BOX TEMPERATURE
MOVFF   BOXTL,DSL
CALL    DCON2                   ;
MOVF    DSM,W                   ;BOX TEMP 24
ADDWF   CSUM,F
MOVWF   TXREG
CALL    BWAIT                   ;
MOVF    DSL,W                   ;25
ADDWF   CSUM,F
MOVWF   TXREG

;###########

CALL    BWAIT                   ;SEND INCREMENT SIZE
BCF     ISIZE,07
MOVF    ISIZE,W
ADDWF   CSUM,F
MOVWF   TXREG                   ;BYTE 26

;###########

CALL    BWAIT                   ;SEND ACCELERATION
BCF     ACCEL,07
MOVF    ACCEL,W
ADDWF   CSUM,F
MOVWF   TXREG                   ;BYTE 27

;###########

CALL    BWAIT                   ;SEND POT OFFSET
BCF     POTOFH,07
MOVF    POTOFH,W                ;
ADDWF   CSUM,F                  ;
MOVWF   TXREG                   ;BYTE 28
CALL    BWAIT                   ;
BCF     POTOFL,07
MOVF    POTOFL,W                ;
MOVWF   TXREG                   ;BYTE 29
ADDWF   CSUM,F

;###########

CALL    BWAIT                   ;SEND CURRENT VELOCITY
BCF     VELOC,07
MOVF    VELOC,W
ADDWF   CSUM,F                  ;
MOVWF   TXREG                   ;BYTE 30

;###########

CALL    BWAIT
MOVFF   TARGH,DSH
MOVFF   TARGM,DSM
MOVFF   TARGL,DSL
CALL    DCON3                   ;CONVERT TO TX FORM
MOVF    DSH,W
ADDWF   CSUM,F
MOVWF   TXREG                   ;BYTE 31
CALL    BWAIT                   ;

MOVF    DSM,W
ADDWF   CSUM,F
MOVWF   TXREG                   ;BYTE 32
CALL    BWAIT
MOVF    DSL,W
ADDWF   CSUM,F
```

```
                            WJ2 458E.ASM
            MOVWF   TXREG                   ;BYTE 33

;###########

;SEND PUMP POSITION
            ;FROM POT

CALL    BWAIT
            MOVFF   POSH,DSH
            MOVFF   POSM,DSM
            MOVFF   POSL,DSL
            CALL    DCON3                   ;CONVERT TO TX FORM
            MOVF    DSH,W
            ADDWF   CSUM,F
            MOVWF   TXREG                   ;BYTE 34
            CALL    BWAIT                   ;

MOVF    DSM,W
            ADDWF   CSUM,F
            MOVWF   TXREG                   ;BYTE 35
            CALL    BWAIT
            MOVF    DSL,W
            ADDWF   CSUM,F
            MOVWF   TXREG                   ;BYTE 36

;###########

CALL    BWAIT                   ;SEND BOX SERIAL NUMBER
            MOVLW   SERNUM                  ;(MAKE SURE UPPER BYTE IS CLEARED)

ADDWF   CSUM,F                  ;
            MOVWF   TXREG                   ;BYTE 37

;###########

CALL    BWAIT                   ;BYTE 38  (CHECKSUM)
            BCF             CSUM,07         ;        TRUNCATE UPPER BIT
            MOVFF   CSUM,TXREG              ;

RETURN                          ;ALL DONE W/PACKET
;****************************************************************************

;GET 16 BITS OF DATA FROM ENCODER PROCESSOR

SERIN   MOVLW   .10                         ;20 TESTS IN A ROW TO BE LOW
        MOVWF   TEMP4
SERIN1  BTFSC   PORTB,PDATA
        GOTO    DNG                         ;WENT HI AGAIN,BAIL OUT
        DECFSZ  TEMP4,F
        GOTO    SERIN1

;TIME TO THE MIDDLE OF THE FIRST BIT (LSB FIRST)

MOVLW   .8
            MOVWF   SERBITS
            CLRF    ECNTLO
            CLRF    ECNTHI

MOVLW   .37     ;
            MOVWF   TEMP4
SL1         DECFSZ  TEMP4,F
            GOTO    SL1

;AT BIT 1 NOW
```

WJ2 458E.ASM

```
TLB             BSF             PORTB,03                ;TRACER
                BTFSS           PORTB,PDATA
                GOTO            LB0                     ;IS A 0
LB1             BSF             ECNTLO,07               ;SET THAT BIT
                GOTO            NEXLB

LB0             BCF             ECNTLO,07
NEXLB   DCFSNZ  SERBITS,F
                GOTO            NXBYTE                  ;GET THE NEXT BYTE IF ZERO
                BCF             PORTB,03                ;TRACER
                RRNCF           ECNTLO,F                ;SHIFT RIGHT

MOVLW           .36
                MOVWF           TEMP4
SL2             DECFSZ          TEMP4,F
                GOTO            SL2
                GOTO            TLB

;DONE WITH FIRST BYTE
                ;FIRST TIME TO MIDDLE OF INTERDIGIT HI SIGNAL

NXBYTE  BCF             PORTB,03        ;NOP

MOVLW           .8
                MOVWF           SERBITS

MOVLW           .118
                MOVWF           TEMP4
SL3             DECFSZ          TEMP4,F
                GOTO            SL3

;AT BIT 1 NOW

HTLB            BSF             PORTB,03                ;TRACER
                BTFSS           PORTB,PDATA
                GOTO            HLB0                    ;IS A 0
HLB1            BSF             ECNTHI,07               ;SET THAT BIT
                GOTO            HNEXLB

HLB0            BCF             ECNTHI,07
HNEXLB  DCFSNZ  SERBITS,F
                GOTO            SDONE                   ;DONE / SERIAL IN
                BCF             PORTB,03                ;TRACER
                RRNCF           ECNTHI,F                ;SHIFT RIGHT

MOVLW           .36
                MOVWF           TEMP4
SL5             DECFSZ          TEMP4,F
                GOTO            SL5
                GOTO            HTLB

DNG             CLRF            ECNTLO
                CLRF            ECNTHI
SDONE   BCF             PORTB,03
                RETURN
```

;************************************************************************

```
;       MLTACC -> ACC5:4:3:2 = ACC3:2 * ACC1:0
;       ACC1:0 IS NOT CHANGED, NO STATUS RETURNED
;       MIN/AVG/MAX  167/207/247   21 CELLS
;       THIS ROUTINE IS FOR UNSIGNED #'S 0-65535
```

```
                                        WJ2 458E.ASM
MLTACC  MOVLW   .16                 ;LOOP COUNT
        MOVWF   TEMP
        CLRF    ACC5                ;CLEAR TOP OF RESULT
        CLRF    ACC4
        RRCF    ACC3,F
        RRCF    ACC2,F              ;SHIFT OUT NEXT MULTIPLICAND BIT
MLTLP   BNC     ROTACC              ;TEST FOR BIT SET
        MOVF    ACC0,W              ;ADD IN MULTIPLIER
        ADDWF   ACC4,F
        MOVF    ACC1,W
        BTFSC   STATUS,C            ;CHECK FOR CARRY FROM LOW ORDER
        INCFSZ  ACC1,W              ;ADD CARRY IN, IF 0 SKIP WITH CARRY SET
        ADDWF   ACC5,F              ;ADD UP HIGH ORDER
ROTACC  RRCF    ACC5,F              ;SHIFT IN RESULT (CARRY)
        RRCF    ACC4,F              ;RESULT TRICKLES
        RRCF    ACC3,F              ;DOWN TO ACC3:2
        RRCF    ACC2,F              ;SHIFT OUT NEXT MULTIPLICAND BIT
        DECFSZ  TEMP,F              ;LOOP FOR 16 BITS
        GOTO    MLTLP
        RETLW   0

;************************************************************************
;
;DIV/0 IS UNPREDICTABLE.
;MIN/AVG/MAX 263/302/341 & 27 CELLS.
;       DVDACC ->       ACC3:2 = ACC3:2 / ACC1:0
;                       ACC5:4 = REMAINDER
;                       ACC1:0 IS NOT CHANGED
;       DVD32  ->       ACC3:2 = ACC5:2 / ACC1:0
;                       ACC5:4 = REMAINDER
;                       ACC1:0 IS NOT CHANGED

DVDACC  CLRF    ACC5
        CLRF    ACC4
DVD32   MOVLW   .16                 ;SET UP LOOP COUNT
        MOVWF   TEMP
        RLCF    ACC2,F              ;SHIFT IN CARRY
        RLCF    ACC3,F
DVDLP   RLCF    ACC4,F
        RLCF    ACC5,F              ;ERROR IF CARRY SET HERE
        BC      DVDSUB
        MOVF    ACC0,W              ;COMPARE DIVISOR TO DIVIDEND
        SUBWF   ACC4,W              ;DIVIDEND-DIVISOR
        MOVF    ACC1,W
        BTFSS   STATUS,C
        INCFSZ  ACC1,W
        SUBWF   ACC5,W
        BNC     DVDRDD              ;DIVIDEND WAS SMALLER, ROTATE
DVDSUB  MOVF    ACC0,W              ;ACTUALLY SUBTRACT DIVISOR (ADD -)
        SUBWF   ACC4,F
        MOVF    ACC1,W
        BTFSS   STATUS,C
        INCFSZ  ACC1,W
        SUBWF   ACC5,F              ;CARRY WILL BE SET HERE
        BSF     STATUS,C
DVDRDD  RLCF    ACC2,F              ;SHIFT IN CARRY
        RLCF    ACC3,F
        DECFSZ  TEMP,F              ;LOOP FOR 16 BIT RESULT
        GOTO    DVDLP               ;OTHERWISE, RESTORE ACC1:0 AND RETURN
        RETLW   0                   ;ERROR IF CARRY SET

;************************************************************************
;
        ;SUBROUTINE
        ;ACC3:2 = ACC3:ACC2 + ACC1:0
```

```
                                        WJ2 458E.ASM
ADDACC   MOVF    ACC0,W          ;LOAD LOW ORDER BYTE
         ADDWF   ACC2,F              ;ADD UP LOW ORDER
         MOVF    ACC1,W              ;REPEAT FOR HIGH ORDER
         BTFSC   STATUS,C
         INCFSZ  ACC1,W              ;IF 0, DON'T NEED TO ADD, MUST RETAIN CARRY
         ADDWF   ACC3,F
         RETURN

;*************************************************************

;NEGACC -> ACC1:ACC0 = ACC1:ACC0

NEGACC   COMF    ACC0,F          ;COMPLEMENT ACC1:0
         COMF    ACC1,F
INCACC   INCFSZ  ACC0,F          ;INCREMENT ACC1:0
         DECF    ACC3,F
         INCF    ACC3,F
         RETLW   0

;*****************************************************************

;INTER-BYTE DELAY

BWAIT    MOVLW   .5
         MOVWF   TEMP
BWAIT1A  MOVLW   .200
         MOVWF   TEMP1
BWAIT1B  DECFSZ  TEMP1,F
         GOTO    BWAIT1B
         DECFSZ  TEMP,F
         GOTO    BWAIT1A
         RETURN

;*****************************************************************

;1 MSEC WAIT @ 20 MHZ

WAIT1    MOVLW   .45
         MOVWF   TEMP
WAIT1A   MOVLW   .200
         MOVWF   TEMP1
WAIT1B   DECFSZ  TEMP1,F
         GOTO    WAIT1B
         DECFSZ  TEMP,F
         GOTO    WAIT1A
         RETURN

;*****************************************************************

SETPWM   MOVLW   .128
         MOVWF   PR2
         CLRF    CCPR1L
         MOVLW   0F
         MOVWF   CCP1CON              ;0000 1100   SETS PWM MODE
         MOVLW   05
         MOVWF   T2CON          ;T2 ON
         RETURN

;*****************************************************************

SETCOM   MOVLW   024
         MOVWF   TXSTA
         MOVLW   .10            ;115.2K
         MOVWF   SPBRG
         BSF     RCSTA,SPEN     ;UART ON
         RETURN
```

```
                                    WJ2 458E.ASM
;*********************************************************************
;
WAIT    CLRWDT
            MOVLW   .255
            MOVWF   TEMP
w1          MOVLW   .5
            MOVWF   TEMP1
w2          DECFSZ  TEMP1,F
            GOTO    w2
            DECFSZ  TEMP,F
            GOTO    w1
            RETURN

;*********************************************************************
;
        ;WAIT FOR EEPROM WRITE

WAIT10  MOVLW   .100
            MOVWF   TEMP
w10         MOVLW   .255
            MOVWF   TEMP1
w20         DECFSZ  TEMP1,F
            GOTO    w20
            DECFSZ  TEMP,F
            GOTO    w10
            RETURN

;*********************************************************************
;
DWAIT   MOVLW   .1
            MOVWF   TEMP
DW1         MOVLW   .255
            MOVWF   TEMP1
DW2         DECFSZ  TEMP1,F
            GOTO    DW2
            DECFSZ  TEMP,F
            GOTO    DW1
            RETURN

;*********************************************************************
;
        ;THREE BYTE ADDITION
        ;ADD ---> ACC5:ACC4:ACC3 = ACC5:ACC4:ACC3 + ACC2:ACC1:ACC0

ADD24   MOVF    ACC0,W          ;LOAD LOW ORDER BYTE
        ADDWF   ACC3,F          ;ADD UP LOW ORDERS
        MOVF    ACC1,W          ;REPEAT FOR HIGH ORDER
        BTFSC   STATUS,C        ;
        INCFSZ  ACC1,W          ;IF 0, DON'T NEED TO ADD, MUST RETAIN CARRY
        ADDWF   ACC4,F
        MOVF    ACC2,W
        BTFSC   STATUS,C        ;
        INCFSZ  ACC2,W          ;
        ADDWF   ACC5,F
        RETLW   0

;*********************************************************************
;
        ;THREE BYTE SUBTRACTION
        ;SUBTRACT ---> ACC5:ACC4:ACC3 = ACC5:ACC4:ACC3 - ACC2:ACC1:ACC0

SUB24   MOVF    ACC0,W
        SUBWF   ACC3,F
        MOVF    ACC1,W
        BTFSS   STATUS,C
        INCFSZ  ACC1,W
```

```
                WJ2 458E.ASM
        SUBWF   ACC4,F
        MOVF    ACC2,W
        BTFSS   STATUS,C
        INCFSZ  ACC2,W
        SUBWF   ACC5,F
        RETLW   0

;****************************************************************

;CONVERT BYTES IN DSH:DSM:DSL TO TX FORMAT

;FORMAT IS AS FOLLOWS -
        ;   H BYTE      M BYTE      L BYTE
        ;000HH       MMMM MMMM    LLLL LLLL

;CONVERT TO THIS
        ;   H BYTE      M BYTE      L BYTE
        ;0HHH HHMM    0MMM MMML    0LLL LLLL

;MAKE SURE UPPER BITS ARE CLEARED

DCON3   RLNCF   DSH,F                       ;SHIFT UPPER BYTE LEFT TWICE, NO CARRY
        RLNCF   DSH,F                   ;
        BCF             DSH,07
        BCF             DSH,00           ;CLEAR BOTH ENDS
        BCF             DSH,01           ;
        BTFSC   DSM,07                  ;
        BSF             DSH,01           ;SET LOW BITS IF NEC
        BTFSC   DSM,06                  ;
        BSF             DSH,00           ;SET LOW BITS IF NEC

;NOW DO MIDDLE BYTE

DCON2   RLNCF   DSM,F                       ;SHIFT LEFT ONCE
        BCF             DSM,07           ;CLEAR BOTH ENDS
        BCF             DSM,00
        BTFSC   DSL,07
        BSF             DSM,00           ;SET IF NEC

BCF             DSL,07           ;CLEAR UPPER BIT OF LOW BYTE
        RETURN                           ;

;****************************************************************

;RESTORE 3 BYTES OF TX DATA BACK TO NORMAL FORMAT

;TX FORMAT IS AS FOLLOWS -
        ;   H BYTE      M BYTE      L BYTE
        ;0HHH HHMM    0MMM MMML    0LLL LLLL

;CONVERT BACK TO THIS
        ;   H BYTE      M BYTE      L BYTE
        ;000H HHHH    MMMM MMMM    LLLL LLLL

RES3    BTFSC   DSM,00
        BSF             DSL,07           ;FIX UPPER BIT OF LOW BYTE
        RRNCF   DSM,F                       ;MIDDLE BYTE RIGHT ONCE
        BCF             DSM,07           ;CLEAR UPPER 2
        BCF             DSM,06
        BTFSC   DSH,01
        BSF             DSM,07
        BTFSC   DSH,00
        BSF             DSM,06           ;FIX UPPER BIT OF MIDDLE BYTE
        RRNCF   DSH,F                       ;UPPER BYTE RIGHT ONCE
        RRNCF   DSH,F                       ;TWICE
        MOVLW   01F
```

```
                            WJ2 458E.ASM
            ANDWF    DSH,F                    ;MASK UPPER 3 BITS
            RETURN

;*********************************************************************

;RESTORE 2 BYTE TX FORMAT NUMBERS
            ;COMES IN LIKE THIS
            ;
            ; 0MMM MMML 0LLL LLLL
            ;GO OUT LIKE THIS
            ;
            ; 00MM MMMM LLLL LLLL

RES2   BTFSC   DSM,00
            BSF              DSL,07           ;DO UPPER BIT OF LOW BYTE
            RRNCF   DSM,F
            BCF              DSM,07           ;CLEAR UPPER BIT
            RETURN

;*********************************************************************

;WRITE DATA IN EEPROM

WRIEE  MOVFF   ADDR,EEADR                     ;GET ADDRESS

BCF              EECON1,EEPGD
            BCF              EECON1,CFGS
            BSF              EECON1,WREN      ;ENABLE A WRITE
            BCF              INTCON,GIE       ;NO INTERRUPTS HERE
            MOVLW   055
            MOVWF   EECON2
            MOVLW   0AA
            MOVWF   EECON2
            BSF              EECON1,WR        ;
            BCF              EECON1,WREN      ;

EEWL   BTFSS   PIR2,EEIF
            GOTO    EEWL                      ;LOOP TILL E2 IS DONE
            BCF              PIR2,EEIF

RETURN

;*********************************************************************

READEE MOVF    ADDR,W
            MOVWF   EEADR
            BCF              EECON1,EEPGD
            BCF              EECON1,CFGS
            BSF              EECON1,RD
            RETURN

;*********************************************************************

;HOMES ENCODER TO POT POSITION
            ;RELATIONSHIP IS
            ;(624(POT-160))-10,000 = ENCODER POSITION = CORRECTED POT POSITION
            ;POT - 160d
            ;THIS RESULT X 624
```

```
                        WJ2 458E.ASM
        ;THIS RESULT - 10,000
        ;THIS IS THEN THE ENCODER POSITION

;THE SAME FORMULA IS NEEDED IN THE PC KIT TO LINK POT POSITION TO
ENCODER

HOMIT   CLRF    ACC0
        CLRF    ACC1
        CLRF    ACC2
        CLRF    ACC3
        CLRF    ACC4
        CLRF    ACC5

MOVLW   .10
        MOVWF   TEMP4                   ;

HOMLOOP CALL    POS                     ;USE POT AS POSITION NOW
        MOVFF   ADRESL,ACC0
        MOVFF   ADRESH,ACC1
        CLRF    ACC2
        CALL    ADD24                   ;ADD UP RESULTS
        DECFSZ  TEMP4,F
        GOTO    HOMLOOP                 ;

;SIGMA IS NOW IN ACC5:3
        ;NOW DIVIDE THIS SIGMA BY 10 (TO GET AVERAGE)

MOVFF   ACC3,ACC2
        MOVFF   ACC4,ACC3
        MOVFF   ACC5,ACC4
        CLRF    ACC5
        MOVLW   .10
        MOVWF   ACC0
        CLRF    ACC1
        CALL    DVD32                   ;DIVIDE TO GET AVERAGE

;AVERAGE IS NOW IN ACC3:ACC2
        ;SUBTRACT 160 FROM IT

CLRF    ACC5
        MOVFF   ACC3,ACC4
        MOVFF   ACC2,ACC3

CLRF    ACC2
        CLRF    ACC1
        MOVLW   .160
        MOVWF   ACC0
        CALL    SUB24                   ;POSITION OF POT - 160

;MULT THIS RESULT BY 624
        ;RESULTS ARE IN ACC5:ACC3    OK TO HERE

MOVFF   ACC3,ACC2
        MOVFF   ACC4,ACC3
        MOVLW   02
        MOVWF   ACC1
        MOVLW   070
        MOVWF   ACC0
        CALL    MLTACC                  ;MULTIPLY

;RESULT IS IN ACC5:2
        ;NOW SUBTRACT 10,000

MOVFF   ACC4,ACC5
        MOVFF   ACC3,ACC4
        MOVFF   ACC2,ACC3
```

```
                            WJ2 458E.ASM
            CLRF    ACC2
            MOVLW   027
            MOVWF   ACC1
            MOVLW   010
            MOVWF   ACC0

CALL    SUB24

;NOW PUT THIS INTO TARGET REGISTERS

MOVFF   ACC5,TARGH
            MOVFF   ACC4,TARGM
            MOVFF   ACC3,TARGL

;SET THIS AS CURRENT ENCODER POSITION

MOVFF   ACC5,ENPOSH
            MOVFF   ACC4,ENPOSM
            MOVFF   ACC3,ENPOSL

RETURN

;***********************************************************************

SETUP   BCF         PIR1,RCIF           ;CLEAR RX INTERRUPT
            CLRF    PIR2
            CLRF    PIE2
            CLRF    PIE3
            CLRF    IPR1
            CLRF    IPR2
            CLRF    IPR3
            CLRF    INTCON3
            MOVLW   08                  ;PULLUPS OFF
            MOVWF   INTCON2
            BCF     RCON,IPEN           ;NO INT PRIORITY
            MOVLW   03F         ;
            MOVWF   TRISA       ;
            MOVLW   021                 ;0010 0001
            MOVWF   TRISB       ;
            MOVLW   080                 ;1000 0000
            MOVWF   TRISC       ;
            MOVLW   0F0         ;1111 0000
            MOVWF   TRISD       ;
            MOVLW   07          ;
            MOVWF   TRISE       ;
            RETURN

;***********************************************************************

INIT    BCF         OSCCON,00           ;SET TO MAIN OSC

BCF         INTCON,GIE      ;DISABLE ALL INTERRUPTS

CLRF    SYNCMD

CLRF    BSR                 ;BANK SEL REG

CALL    SETUP

CLRF    PORTB

CALL    SETCOM              ;
            MOVLW   080
            MOVWF   ADCON1
            CALL    SETPWM
            MOTOFF
```

```
                        WJ2 458E.ASM
        BSF         PORTC,SCL           ;INITIALIZE DIGITAL POTS
        BSF         PORTC,SDA
        BSF         PORTC,RS1
        BSF         PORTD,CS1
        BSF         PORTD,CS2
        CALL  WAIT1
        BCF         PORTC,RS1           ;RESET BOTH POTS
        NOP
        BSF         PORTC,RS1

BCF   INTCON,GIE     ;GLOBALLY DISABLE ALL INTERRUPTS
        BCF         MFLAGS,MOVING  ;SET AS NOT MOVING

MOTOFF                          ;MOTOR SET TO OFF

CLRF  IFAILS             ;
        CLRF  STATE              ;
        CLRF  STALCT             ;

BCF         FLAGS,SETTLD
        BCF         FLAGS,NTR          ;
        BCF         SYNCMD,05
        BCF         SYNCMD,E2ERR   ;SET AS NO CSUM ERROR
        BCF         SYNCMD,OISD        ;
        BCF         SYNCMD,CMERR   ;
        BSF         SYNCMD,PGMOK   ;
        BCF         SYNCMD,NOMOV
        BCF         MFLAGS,MOUT
        BCF         MFLAGS,MIN
        BCF         MFLAGS,MOVING  ;
        MOVLW .40
        MOVWF MOTCNT                ;MOTION COUNTER

MOVLW EPR                   ;PROGRAM COUNTER REPEAT FOR
EE SAVE
        MOVWF PCT                       ;

;SET WINDOWS UP

MOVLW MWH                       ;INSTALL WINDOWS FOR
RUNNING
        MOVWF WINH
        MOVLW MWM
        MOVWF WINM
        MOVLW MWL

MOVLW SETIM
        MOVWF SETCNT

;####################################################################

        ;XFER EEPROM DATA TO RAM NOW

;FIRST, EXAMINE EE DATA FIELD AND CHECKSUM FOR ACCURACY
        ;TAKE 00h TO 1Ch AND INSTALL INTO 31h AND UP IN RAM

RAMBUF  CLRF  E2CS             ;
        MOVLW BYTSENT          ;NUMBER OF BYTES
        MOVWF BYTCNT           ;
        MOVLW 00                     ;EEPROM START
        MOVWF ADDR
```

```
                                    WJ2 458E.ASM
NELOC       CALL    READEE          ;
            MOVF    EEDATA,W
            ADDWF   E2CS,F
            DCFSNZ  BYTCNT,F                        ;NEXT BYTE
            GOTO    CHE2SUM                         ;ALL BYTES IN NOW
            INCF    ADDR,F                          ;NEXT LOCATION
            GOTO    NELOC

;SEE IF E2CS = LOCATION 1Dh

CHE2SUM MOVLW  E2CSL                ;CHECKSUM LOCATION
            MOVWF   ADDR
            CALL    READEE
            MOVF    EEDATA,W
            SUBWF   E2CS,W                          ;E2CS - LOCATION 1D
            BTFSS   STATUS,Z                        ;
            GOTO    E2PROB                          ;NOT OK
            BCF             SYNCMD,E2ERR            ;SET AS NO CSUM ERROR
            GOTO    ECSOK                           ;IS OK

E2PROB BSF          SYNCMD,E2ERR    ;E2 HAD A CSUM ERROR
            GOTO    MTEST                           ;GO ON BUT DON'T CHANGE RAM

;INSTALL DEFAULT RAM SETTINGS HERE ?

;8888888888888888888888888

;EE CHECKSUM IS OK

ECSOK   MOVLW  BYTSENT              ;NUMBER OF BYTES TO SAVE (NOT INCLUDING SYNC
AND CHECKSUM)
            MOVWF   BYTCNT          ;
            CLRF    ADDR            ;E2 STARTING ADDRESS
            MOVLW   31              ;
            MOVWF   FSR0L
            CLRF    FSR0H           ;
RAB         CALL    READEE
            MOVFF   EEDATA,INDF0    ;EE DATA TO RAM LOCATION

DCFSNZ  BYTCNT,F        ;COUNT 1, SKIP IF NOT ZERO YET
            GOTO    MTEST           ;IS ALL DONE
            INCF    ADDR,F          ;NEXT EE LOC
            INCF    FSR0L,F         ;NEXT RAM
            GOTO    RAB

MTEST       NOP

;ENABLE RX INTERRUPTS

MOVLW   090                                 ;ENABLES UART, CONT
Rx
            MOVWF   RCSTA
            MOVLW   020
            MOVWF   PIE1                                ;ENABLE RX INTERRUPT
            MOVLW   0C0                                 ;ENABLE PERIPH.
INTERRUPTS
            MOVWF   INTCON

CLRF    LPOSH
            CLRF    LPOSM
            MOVLW   .64                                 ;(1/2 OF 128 MAX
RANGE)
            MOVWF   LPOSL

;UPDATE DIGI POTS FOR POT AMP NOW

CLRF    POTAGH
```

```
                            WJ2 458E.ASM
            MOVLW   .75
            MOVWF   POTAGL                      ;FIX GAIN TO 25
            MOVFF   POTAGL,POTVAL               ;RE-UP POT VALUES FOR POSITION POT
HERE
            BCF             POTVAL,07
            BTFSC   POTAGH,00
            BSF             POTVAL,07
            CALL    STPOTGN

MOVFF   POTOFL,POTVAL
            BCF             POTVAL,07
            BTFSC   POTOFH,00
            BSF             POTVAL,07
            CALL    STPOTOF

CALL    WAIT10                      ;SETTLE

;HOME IT TO THE POT

CALL    HOMIT

;##########################################################################

;MAIN RUNNING LOOP HERE

;INTERRUPTS ARE READY, NORMAL RUNNING CODE TO FOLLOW

MAIN    BCF         PORTC,00                    ;FOR SAFETY
            BCF             PORTC,01
            CALL    BOXT                        ;GET BOX TEMP
            MOVFF   ADRESH,BOXTH
            MOVFF   ADRESL,BOXTL

;MEASURE POSITION FROM POT

CALL    POS                         ;GET POSITION
            MOVFF   ADRESH,POSM
            MOVFF   ADRESL,POSL
            CLRF    POSH

;MEASURE MOTOR CURRENT

CALL    MI                          ;GET MOTOR CURRENT
            MOVFF   ADRESH,MOTIH
            MOVFF   ADRESL,MOTIL

;CHECK IT AGAINST LIMITS

CALL    MSTALL                      ;
            BTFSS   FLAGS,ABOVE                 ;TOO HIGH?
            GOTO    MIOK                        ;IS OK

BTFSC   MFLAGS,OVERI                ;ALREADY COUNTED ONE?
            GOTO    MIOK                        ;YES, DON'T DO AGAIN
            INCF    STALCT,F                    ;COUNT ONE OVERCURRENT
            MOVLW   .10                                 ;10 PASSES ALLOWED
OVER CURRENT
            SUBWF   STALCT,W
            BTFSS   STATUS,C                    ;
            GOTO    MVN                         ;NOT OVER CURRENT
LONG ENOUGH
            BSF             MFLAGS,OVERI
            INCF    IFAILS,F                    ;SAVE AS AN OVERCURRENT
EVENT
```

```
                              WJ2 458E.ASM

MIOK        CLRF     STALCT                          ;RESET COUNTER

;HAVE MEASURED POSITION

MVN                  NOP

;MAKE SURE IT IS MOVING (IF IT SUPPOSED TO BE)

BTFSC    MFLAGS,MIN
                     GOTO     CFPB1                  ;IS MOVING
                     BTFSS    MFLAGS,MOUT
                     GOTO     SDP                                    ;NOT SUPPOSED TO BE MOVING
CFPB1       BTFSC    MFLAGS,BLANK
                     GOTO     SDP                                    ;NOT IF STILL ACCELERATING
                     BTFSC    SYNCMD,NOMOV
                     GOTO     SDP                                    ;NOT IF WE WERE STOPPED BEFORE

CFPB        MOVFF    MOTCNT,STATE        ;!!!!!!!!TEMP
                     MOVLW    .4                                     ;MUST BE MOVING MORE THAN THIS PER PASS
                     SUBWF    MOTVEL,W
                     BTFSC    STATUS,C
                     GOTO     ISMOV                                  ;IS MOVING IF NOT A 0

;VELOC IS A 0

;MOVLW    .120
                     ;MOVWF    STATE
                     ;DECFSZ   MOTCNT,F
                     GOTO     ISMOV1

BSF               SYNCMD,NOMOV                  ;SET AS NOT MOVING
                     MOTOFF                                          ;STOP MOTOR
                     MOVLW    .120
                     ;MOVWF   STATE                  ;
                     GOTO     SDP                                    ;RUN ON AROUND TO SEND DATA

ISMOV       ;CLRF    STATE
                     MOVLW    .40
                     MOVWF    MOTCNT                                 ;RESTORE MOTION COUNTER
ISMOV1      NOP

SDP                  CALL     DPACKET                                ;SEND DATA PACKET

;UPDATE DIGI POTS FOR POT AMP NOW

CLRF     POTAGH
                     MOVLW    .75
                     MOVWF    POTAGL                 ;FIX GAIN TO 25
                     MOVFF    POTAGL,POTVAL          ;RE-UP POT VALUES FOR POSITION POT HERE
                     BCF               POTVAL,07
                     BTFSC    POTAGH,00
                     BSF               POTVAL,07
                     CALL     STPOTGN

MOVFF    POTOFL,POTVAL
                     BCF               POTVAL,07
                     BTFSC    POTOFH,00
                     BSF               POTVAL,07
                     CALL     STPOTOF
```

```
                            WJ2 458E.ASM
                  ;TRIGGER ENCODER UNIT HERE
                  BSF           PORTB,TRIG
                  ;WAIT FOR PIN TO FALL (START BIT)
                  MOVLW    .255
                  MOVWF    STOUT
TFED     BTFSC    PORTB,PDATA
         GOTO     CST                         ;ADD SERIAL TIMEOUT
HERE
         CALL     SERIN                       ;GO GET BOTH BYTES
                  ;DATA WAS OK, CALCULATE POSITION NOW
                  MOVFF    ENPOSH,ACC5
                  MOVFF    ENPOSM,ACC4
                  MOVFF    ENPOSL,ACC3

CLRF     ACC2
                  MOVFF    ECNTHI,ACC1
                  BCF            ACC1,07      ;CLEAR UPPER BIT
                  MOVFF    ECNTLO,ACC0

BTFSS    ECNTHI,07
                  GOTO     WENTIN
WENTOUT CALL      ADD24
         GOTO     EPD

WENTIN  CALL      SUB24

;TEST FOR A ROLLOVER UNDER A 0 OR THE LIM SWITCH TO BE MADE
EPD      BTFSS    PORTB,LIMA        ;
         GOTO     CEP                         ;IS AT LOW LIMIT,
SWITCH IS MADE
         BTFSS    ENPOSH,04                   ;THIS IS OVER 1,048,575 CTS
         GOTO     EPD1                        ;IS OK
                  ;ROLLED OVER BACKWARDS, CLEAR COUNTERS
CEP      CLRF     ENPOSH                      ;IS TOO HIGH
         CLRF     ENPOSM
         CLRF     ENPOSL
         GOTO     FRTIM

;IS OK, USE MATH RESULTS
EPD1    MOVFF     ACC5,ENPOSH
                  MOVFF    ACC4,ENPOSM
                  MOVFF    ACC3,ENPOSL

;USE UPPER ENCODER BYTE AS VELOCITY
                  MOVF     ECNTHI,W
                  MOVWF    VELOC
                  BCF            VELOC,07

GOTO     FRTIM

;WAITING HERE !!!!!!!!!!
CST               DECFSZ   STOUT,F
                  GOTO     TFED
```

WJ2 458E.ASM

```
ENCERR   NOP
                    ;SET AN ERROR FOR ENCODER TIMEOUT HERE
FRTIM    BCF            PORTB,TRIG
         ;!!!!!!!!!!!
         CALL           WAIT10
         CALL           WAIT10
         CALL           WAIT10
         ;CHECK TO SEE IF WE HAVE EXCEEDED MAX OVERCURRENT FAILS YET
         MOVF           IFAILS,W
         SUBWF          OCFA,W                    ;MAX ALLOWED - TOTAL SEEN
         BTFSS          STATUS,C
         GOTO           TMOI                      ;FAILED
         GOTO           RSCHK                     ;IS OK
TMOI     MOTOFF                                   ;STOP MOTOR
         BSF            SYNCMD,OISD               ;
         MOVLW          .125
         MOVWF          STATE                     ;
         GOTO           MAIN
```

;*********************************************************************

```
         ;MAIN OPERATING CODE FOR MOTION HERE
         ;POSITION IS MEASURED ABOVE

;CHECK PC COMMANDS HERE

RSCHK    BTFSC   SYNCMD,NOMOV
         GOTO    MAIN                     ;DON'T GO ON IF WE HAVE A
FEEDBACK ISSUE
         BTFSC   SYNCMD,OISD
         GOTO    MAIN                     ;DON'T RUN IF OVERCURRENT
SHUT US OFF
         CLRF    STATE                    ;
         BTFSC   PCCMND,00                ;PADDLE 1?
         GOTO    RINPC                    ;JOG IN
         BTFSC   PCCMND,01                ;2?
         GOTO    ROUTPC                   ;JOG OUT

BTFSC   PCCMND,02                ;PADDLE 3?
         GOTO    RTPS1                    ;TO PRESET 1 POSITION
         BTFSC   PCCMND,03                ;PADDLE 4?
         GOTO    RTPS2                    ;TO PRESET 2 POSITION
         BTFSC   PCCMND,04                ;TO CENTER RETURN
         GOTO    RTPK                     ;

;CHECK SWITCHES HERE

MOVFF   PORTD,TEMP               ;SWITCHES ARE ON PORTD
         MOVLW   0F0                      ;
         ANDWF   TEMP,F                   ;MASK UPPER 4 BITS WHERE
SWITCHES ARE
         SUBWF   TEMP,W                   ;ALL ARE A 1 OF NONE ARE
DOWN
         BTFSS   STATUS,Z                 ;IS A 0 IF NO SWITCHES ARE
DOWN
         GOTO    SID                                ;A SWITCH IS DOWN
(WHICH ONE)
         BCF     FLAGS,SWDOWN
```

WJ2 458E.ASM

;IS MOVING, TO PRESET POSITION

;##################

```
NSDH    CALL    PCOMP                           ;CHECK TO SEE IF WE ARE IN THE
CORRECT WINDOW
        BTFSS   FLAGS,INWIN                     ;
        GOTO    NSIW                            ;NOT IN WINDOW
        BTFSC   FLAGS,SETTLD
        GOTO    NSD1                            ;IS SETTLED OK
        DECFSZ  SETCNT,F
        GOTO    MTPP                            ;GO ON
        BSF             FLAGS,SETTLD
        BCF             MFLAGS,MOVING
        GOTO    NSD

NSIW    BCF             FLAGS,SETTLD
        MOVLW   .10
        MOVWF   MAXSPD
        MOVLW   SETIM
        MOVWF   SETCNT                          ;RESET SETTLE COUNTER
        GOTO    MTPP

NSD1    BCF             MFLAGS,MOVING           ;
        BCF             MFLAGS,MOUT
        BCF             MFLAGS,MIN

;CLEAR INTEGRAL ACCUMS HERE

CLRF    MAXSPD

NSD     MOTOFF                                  ;NO SWITCHES DOWN,
NOT MOVING, TURN OFF MOTOR
        BCF             MFLAGS,OVERI
        MOVLW   .2                              ;RESET DEBOUNCE
COUNTER
        MOVWF   DBNCE                           ;
        CLRF    CCPR1L
        GOTO    MAIN

;A SWITCH IS DOWN, WHICK ONE(S)
        ;TEST FOR 1/3 COMBINATION FIRST (RETURN TO A POINT)
        ;SWITCH READ IS IN <TEMP>
        ;SEE IF DEBOUNCE COUNTER IS A 0, IF IT IS, DON'T GO BACK TO MAIN
LOOP

SID     MOVF    DBNCE,W                         ;EXAMINE DEBOUNCE COUNTER
        BTFSC   STATUS,Z
        GOTO    SIDB                            ;GO ON IF DEBOUNCE HAS TIMED
OUT
        DECFSZ  DBNCE,F                         ;ONE PASS WITH A KEY DOWN
        GOTO    MAIN                            ;NOT YET
SIDB    MOVLW   030                             ;0011 0000   SW 1&2
        SUBWF   TEMP,W
        BTFSS   STATUS,Z                        ;IS A 0 IF BOTH ARE DOWN
        GOTO    NRP                                     ;NOT BOTH DOWN

;BOTH 1&2 ARE DOWN, SET TO RETURN TO RETURN POINT
        ;CURRENT POSITION IS IN POSH:POSM:POSL

GOTO    RTPK                            ;PRESET VIA KNOB

;CHECK INDIVIDUAL SWITCHES HERE

;S1     S2
        ;S3             S4
```

WJ2 458E.ASM

```
NRP             BTFSS   PORTD,S1                ;SW 1 DOWN?
                GOTO    RIN                             ;RUN IN
                BTFSS   PORTD,S2                ;SW 3 DOWN?
                GOTO    ROUT                    ;RUN OUT
                BTFSS   PORTD,S3
                GOTO    RTPS1                   ;RUN TO PRESET 1
                BTFSS   PORTD,S4
                GOTO    RTPS2                   ;RUN TO PRESET 2
                GOTO    NSD                             ;NO SWITCHES DOWN

;RUN TARGET IN

RINPC   BCF             PCCMND,00               ;CLEAR PC REQUEST

RIN             BTFSC   FLAGS,SWDOWN            ;
                GOTO    MODTARG                 ;DON'T MODIFY UNLESS SWITCH
IS RELEASED
                MOVFF   TARGH,ACC5
                MOVFF   TARGM,ACC4
                MOVFF   TARGL,ACC3

CLRF    ACC2
                MOVFF   ISIZE,ACC1
                CLRF    ACC0
                CALL    SUB24                   ;SUBTRACT FROM TARGET
                MOVFF   ACC5,TARGH              ;RESTORE TARGETS
                MOVFF   ACC4,TARGM
                MOVFF   ACC3,TARGL

;HAS BEEN ADJUSTED IN, SEE IF WE ARE BELOW MINIMUM
                ;TARG - MINIMUM MUST BE + (TARG CAN'T BE BELOW MIN)

MOVFF   MNPH,DSH
                MOVFF   MNPM,DSM
                MOVFF   MNPL,DSL
                CALL    RES3
                MOVFF   DSH,ACC2
                MOVFF   DSM,ACC1
                MOVFF   DSL,ACC0

CALL    SUB24
                BTFSS   ACC5,07
                GOTO    MODTARG                 ;IS OK

;TARG IS TOO SMALL               ;PUT SMALL LIMITS IN AS
TARGETS
                MOVFF   MNPH,DSH
                MOVFF   MNPM,DSM
                MOVFF   MNPL,DSL
                CALL    RES3
                MOVFF   DSH,TARGH
                MOVFF   DSM,TARGM
                MOVFF   DSL,TARGL

MODTARG BTFSC   FLAGS,SWDOWN            ;IS SWITCH STILL DOWN?
                GOTO    MTPP                    ;YES
                BSF             FLAGS,SWDOWN    ;SET AS JUST MODIFIED

GOTO    MTPP                    ;RUN TO THIS POINT

ROUTPC  BCF             PCCMND,01

ROUT    BTFSC   FLAGS,SWDOWN
                GOTO    MODTARG                 ;DON'T MODIFY UNTIL SW IS
```

```
                                    WJ2 458E.ASM
RELEASED
                    MOVFF   TARGH,ACC5
                    MOVFF   TARGM,ACC4
                    MOVFF   TARGL,ACC3

CLRF    ACC2
                    MOVFF   ISIZE,ACC1
                    CLRF    ACC0
                    CALL    ADD24                       ;SUBTRACT FROM TARGET
                    MOVFF   ACC5,TARGH                  ;RESTORE TARGETS
                    MOVFF   ACC4,TARGM
                    MOVFF   ACC3,TARGL
                    MOVFF   ACC5,ACC2                   ;SET MATH UP W/TARGETS
                    MOVFF   ACC4,ACC1
                    MOVFF   ACC3,ACC0

;MAX - TARGET MUST BE + (TARG CAN'T BE BELOW MIN)

MOVFF   MXPH,DSH
                    MOVFF   MXPM,DSM
                    MOVFF   MXPL,DSL
                    CALL    RES3
                    MOVFF   DSH,ACC5
                    MOVFF   DSM,ACC4
                    MOVFF   DSL,ACC3
                    CALL    SUB24
                    BTFSS   ACC5,07
                    GOTO    MODTARG                     ;IS OK

;TARG IS TOO BIG, PUT BIG LIMITS IN AS TARGETS

MOVFF   MXPH,DSH
                    MOVFF   MXPM,DSM
                    MOVFF   MXPL,DSL
                    CALL    RES3
                    MOVFF   DSH,TARGH
                    MOVFF   DSM,TARGM
                    MOVFF   DSL,TARGL

GOTO    MODTARG

;NEED TO RUN TO PRESET POSITION
            ;SEE IF WE NEED TO RUN IN OR OUT TO GET TO POSITION

RTPK    BCF         PCCMND,04                           ;KNOB TARGET
                    MOVFF   RTPH,DSH
                    MOVFF   RTPM,DSM
                    MOVFF   RTPL,DSL
                    GOTO    MTPP1

RTPS1   BCF         PCCMND,02                           ;PADDLE 3 TARGET
                    MOVFF   PP1H,DSH
                    MOVFF   PP1M,DSM
                    MOVFF   PP1L,DSL
                    GOTO    MTPP1

RTPS2   BCF         PCCMND,03                           ;PADDLE 4 TARGET
                    MOVFF   PP2H,DSH
                    MOVFF   PP2M,DSM
                    MOVFF   PP2L,DSL

;COULD BE JUMPING IN HERE IF ALREADY MOVING

MTPP1   CALL    RES3                                    ;CONVERT FROM TX FORMAT
                MOVFF   DSH,TARGH
                MOVFF   DSM,TARGM
```

```
                              WJ2 458E.ASM
                MOVFF   DSL,TARGL
MTPP    CALL    PCOMP                       ;SEE WHERE WE ARE, SET FLAGS

;CALCULATE PROPORTIONAL SPEED
                ;DIVIDE PERRH:PERRL/DIVISOR

CLRF    ACC5
                MOVFF   PERRH,ACC4
                MOVFF   PERRM,ACC3
                MOVFF   PERRL,ACC2

MOVLW   04                          ;DIVISOR (P GAIN)
                MOVWF   ACC1                ;1250
                MOVLW   0E2
                MOVWF   ACC0

CALL    DVD32               ;DO DIVIDE, SET MIN/MAX
SPEED.
                ;SPEED ALLOWED IS IN ACC3:ACC2

MOVFF   ACC3,ACC1           ;ALLOWED SPEED IS NOW ACC1:0
                MOVFF   ACC2,ACC0
                MOVFF   ACC2,MAXSPD         ;SAVE IN CASE IT'S OK
                CLRF    ACC2

NTS1    CLRF    ACC5
                CLRF    ACC4
                MOVLW   .110                ;MAX SPEED
                MOVWF   ACC3                ;

CALL    SUB24               ;ALLOWED - MAX

BTFSC   ACC5,07             ;IS SET IF TOO BIG
                GOTO    SPDNOK              ;IS TOO BIG, INSTALL MAX
SPEED
                GOTO    TPRC1               ;NOT TOO BIG, USE CALC
NUMBER FROM ABOVE

SPDNOK  MOVLW   .110
                MOVWF   MAXSPD              ;SET MAX SPEED
                GOTO    TPRC                ;GO ON

;MAKE SURE IT IS NOT TOO SMALL

TPRC1   MOVLW   .5
                SUBWF   MAXSPD,W
                BTFSC   STATUS,C
                GOTO    TPRC                ;IS OK
                MOVLW   .5
                MOVWF   MAXSPD              ;WAS TOO SMALL

TPRC    BTFSC   FLAGS,ABOVE
                GOTO    RITPOS              ;RUN IN
                BTFSC   FLAGS,BELOW
                GOTO    ROTPOS              ;RUN OUT
                GOTO    MAIN

;RUN IN TO POSITION

RITPOS  CALL    SOFTST                      ;SOFTSTART, CHECK BLANK FLAG TO SEE
IF WE ARE AT
                RUNIN                               ;MAX SPEED
                GOTO    PWCHK
ROTPOS  CALL    SOFTST
                RUNOUT
```

```
                            WJ2 458E.ASM
PWCHK   BTFSC   FLAGS,INWIN
        GOTO    NSD1                            ;STOP IF IN WINDOW
        BSF             MFLAGS,MOVING           ;
        GOTO    MAIN

;*********************************************************************
;***********

;SERVICE SERIAL PORT INTERRUPT HERE
        ;RECEIVE ALL INCOMING BYTES HERE FROM PC AND STORE TO RAM
INTSVC  CLRWDT

;SEE WHAT DID THE INTERRUPT

BTFSC   PIR1,RCIF               ;WAS FROM RX?
                GOTO    NORINT                  ;YES
                BTFSC   PIR2,TMR3IF             ;TIMER 3 (RX TIMEOUT?)
                GOTO    RXTOUT                  ;TIMED OUT, SET ERRORS AND GO ON
                GOTO    NORINT                  ;NOT TIMER 3 EITHER

;NORMAL INTERRUPT ENTRY HERE

NORINT  CLRF    CCPR1L
        BCF             PIE1,RCIE               ;DISABLE Rx INTERRUPTS

MOVWF   W_T                             ;SAVE CONTEXTS
        MOVFF   STATUS,STATUS_T
        MOVFF   BSR,BSR_T

;COLLECT AND BUFFER ALL BYTES HERE

CLRF    TCNT                    ;TEMP COUNTER
                BCF             FLAGS,CSIOK
                BCF             SYNCMD,PGMOK    ;SET AS NOT PROGRAMMED
                CLRF    CSUM
                MOVLW   BYTSENT                 ;NUMBER OF DATA BYTES TO GET (C SUM
AND SYNC NOT INCLUDED)
                MOVWF   BYTCNT                  ;
                MOVLW   030                             ;POINT AT FIRST BUFFER LOC
                MOVWF   FSR0L
                CLRF    FSR0H

;CHECK FOR SYNC BYTE

MOVF    RCREG,W                 ;GET FIRST BYTE
                MOVWF   RXTEMP

INCF    TCNT,F

BTFSS   RXTEMP,07               ;IS MSB SET?
                GOTO    RXDONE                  ;NOPE, BAIL OUT
                MOVF    RXTEMP,W                ;
                MOVWF   INDF0                   ;SAVE IN BUFFER
                ADDWF   CSUM,F                  ;ADD TO CHECKSUM
NXRX    INCF    FSR0L,F                 ;NEXT INDEX
                CLRF    FSR0H

;IS SET, COLLECT ALL
                ;SETUP TIMER 3 AS COMM-TIMEOUT

CLRF    TMR3H                   ;INITIALIZE T3 REGISTERS
                CLRF    TMR3L
                BCF             FLAGS,TOUT              ;PREPARE TIMEOUT FLAG
```

```
                              WJ2 458E.ASM
                BCF         PIR2,TMR3IF
                MOVLW       031
                MOVWF       T3CON              ;TIMER ON, 1:8 PRESCALE (105 MSEC
TIMEOUT)
                BSF         INTCON,GIE         ;RE-ENABLE INTERRUPTS
                BSF         PIE2,TMR3IE        ;TURN ON TX TIMER INTERRUPT

RXLP1   BTFSS   PIR1,RCIF              ;WAIT FOR INT FLAG TO BE SET
        GOTO    RXLP1                  ;NOT YET

;BYTE IS IN, HANDLE IT

INCF        TCNT,F             ;

MOVF        RCREG,W
                MOVWF       INDF0
                ADDWF       CSUM,F             ;
                DECFSZ      BYTCNT,F
                GOTO        NXRX               ;NOT DONE YET

;ALL DONE WITH DATA, GET CHECKSUM NOW

CSLP    BTFSS   PIR1,RCIF              ;WAIT FOR INT FLAG TO BE SET
        GOTO    CSLP                   ;NOT YET

;THIS BYTE SHOULD BE CHECKSUM

INCF        FSR0L,F            ;NEXT INDEX
                CLRF        FSR0H

BCF                 CSUM,07            ;TRUNCATE MSB OF CHECKSUM
ALSO
                MOVF        RCREG,W
                MOVWF       RXTEMP
                MOVWF       INDF0
                BCF                 RXTEMP,07          ;CLEAR MSB
                MOVF        RXTEMP,W
                SUBWF       CSUM,W             ;CHECKSUM-RXTEMP SHOULD BE ZERO

;SEE IF WE MATCH

BTFSS       STATUS,Z           ;
                GOTO        RXNOK
                BCF                 FLAGS,TOUT         ;DIDN'T TIME OUT
                BSF                 FLAGS,CSIOK
                BSF                 SYNCMD,PGMOK       ;SET AS PROGRAMMED OK
                BCF                 SYNCMD,CMERR       ;NO COM ERRORS
                GOTO        RXDONE

;RX TIMED OUT

RXTOUT  BSF                 FLAGS,TOUT         ;SET AS TIMED OUT
                POP                            ;GET RID OF RETURN
TO RXLP FROM TOP OF STACK

;RX WAS NOT OK (FROM CHECKSUM)

RXNOK   BCF             FLAGS,CSIOK            ;CHECKSUM IS NOT OK
                BCF             SYNCMD,PGMOK   ;SET AS NOT PROGRAMMED
                BSF             SYNCMD,CMERR   ;SET COMM ERROR
                GOTO    RXDONE

;RX DONE, SEE IF WE NEED TO PROGRAM THE EEPROM

RXDONE  BTFSS   PCCMND,PROE2       ;
        GOTO    DNRP                   ;DON'T NEED RE-PROGRAMMING
```

```
                                WJ2 458E.ASM
                BCF     PCCMND,PROE2        ;CLEAR THIS BIT TO BE SAFE
                BCF     SYNCMD,NOMOV        ;CLEARS NO MOTION FLAG TO RESET
                CLRF    MFLAGS
                MOVLW   0E0                 ;1110 0000
                ANDWF   PCCMND              ;KILL SWITCH REQUESTS
                MOTOFF                      ;KILL MOTOR
                MOVLW   .30
                MOVWF   MOTCNT              ;RESTORE MOTION COUNTER
                GOTO    SAVEE               ;STORE RAM BUFFERS TO EEPROM

;DONE WITH INTERRUPT

DNRP    MOVLW   EPR                         ;RESTORE THIS COUNTER
                MOVWF   PCT

INTDONE BCF             PIE2,TMR3IE         ;SHUT OFF TX TIMER INTERRUPT
                BCF             PIR2,TMR3IF         ;RESET FLAG
                BCF             T3CON,TMR3ON        ;TIMER OFF
                MOVWF   W_T,W
                MOVFF   STATUS_T,STATUS
                MOVFF   BSR_T,BSR
                BCF             PIR1,RCIF           ;RESET INT FLAG FROM RX
                BSF             PIE1,RCIE           ;RE-ENABLE RX INTERRUPTS
                BSF             INTCON,GIE          ;RE-ENABLE INTERRUPTS
                RETFIE                              ;INT DONE

;***********************************************************************

;SAVE BUFFERED DATA IN EEPROM IF WE HAVE ENOUGH REQUESTS

SAVEE   DECFSZ  PCT,F
                GOTO    INTDONE             ;NOT YET

;WAS ASKED FOR ENGOUGH, GO AHEAD AND RE-PROGRAM

MOVLW   EPR                 ;RESTORE COUNTER
                MOVWF   PCT

BCF             T3CON,TMR3ON        ;COMM TIMER OFF

CLRF    E2CS                ;CHECKSUM
                MOVLW   031                 ;START RAM POINTER HERE
                MOVWF   FSR0L
                CLRF    FSR0H
                CLRF    ADDR                ;START ADDRESS
        MOVLW   BYTSENT
                MOVWF   BYTCNT              ;NUMBER OF BYTES TO XFER

XFER    MOVFF   INDF0,EEDATA    ;TRANSFER
                MOVF    INDF0,W
                MOVWF   I_TEMP              ;SAVE FOR TEST
                ADDWF   E2CS,F              ;E2 CHECKSUM
                CALL    WRIEE               ;WRITE IT

;READ EE LOCATION BACK
                ;JUMP OUT AT FIRST ERROR

CALL    READEE              ;READ IT BACK
                MOVF    EEDATA,W            ;
                SUBWF   I_TEMP,W            ;I_TEMP - EEDATA

BTFSS   STATUS,Z            ;IS THEY =?
                GOTO    E2SPROB             ;NOPE, MUST BE A PROBLEM, STOP NOW

BTFSC   EECON1,WRERR    ;ANY WRITE ERRORS?
                GOTO    E2SPROB             ;YES
```

```
                DCFSNZ   BYTCNT,F                ;
                GOTO     STCHS                   ;DONE, DO CHECKSUM NOW
NEXFER  INCF    FSR0L,F                  ;NEXT RAM ADDRESS
        INCF    ADDR,F                           ;NEXT E2 ADDRESS
        GOTO    XFER

STCHS   MOVFF   E2CS,EEDATA              ;
                MOVLW    E2CSL                   ;HARD ADDRESS OF CHECKSUM
                MOVWF    ADDR                    ;
                CALL     WRIEE                   ;

;SEE IF WE SAVED OK BY CHECKING THE CHECKSUM

MOVLW    E2CSL           ;LOCATION
                MOVWF    ADDR
                CALL     READEE
                MOVF     EEDATA,W
                SUBWF    E2CS,W          ;E2CS - LOCATION 1D
                BTFSS    STATUS,Z        ;
                GOTO     E2SPROB         ;NOT OK

BCF              SYNCMD,E2ERR    ;SET AS NO CSUM ERROR
                GOTO     RSP                     ;IS OK
E2SPROB BSF              SYNCMD,E2ERR    ;E2 HAD A CSUM ERROR

;EE DATA SAVED HERE NOW
                ;SYNC POT AND ENCODER TOGETHER

RSP             MOVLW    .25
                MOVWF    I_TEMP
MSW1    CALL    WAIT10
                DECFSZ   I_TEMP,F
                GOTO     MSW1

CALL     HOMIT           ;HOME IT TO THE POT NOW

GOTO     INTDONE

;*********************************************************************
        END
```

While the invention has been illustrated and described in detail in the drawings and foregoing description, the same is to be considered as illustrated and not restrictive in character, it being understood that only the preferred embodiment has been shown and described and that all changes and modifications that come within the spirit of the invention are desired to be protected.

What is claimed is:

1. An apparatus for shifting the center of gravity of a vehicle, comprising:
   a master cylinder assembly with motor, gearbox and position sensing encoder;
   at least one vehicle shock and spring assembly with upper shock casing and lower piston end;
   a slave cylinder hydraulically connected with the master cylinder and connected with the at least one vehicle shock and spring assembly to, upon actuation of the motor, vary the distance between the upper shock casing and the lower piston end;
   a driver control assembly including one or more actuator paddles connected behind the outer grip of the steering wheel;
   and, a control unit having computer programming to receive and issue data and instructions and being operationally connected between the driver control assembly and the master cylinder to actuate the motor upon movement of one or more of the paddles.

2. The apparatus of claim 1, wherein the master cylinder assembly includes a potentiometer assembly with position sensor potentiometer assembly with position sensor potentiometer and sensor arm.

3. The apparatus of claim 1, wherein the slave cylinder is coaxially attached to the vehicle shock and spring assembly, positioned between the upper shock casing and lower piston end.

4. The apparatus of claim 1, wherein the driver control assembly further includes a display panel being connected to the control unit and displaying information transmitted from the control unit to the display panel.

5. A method for shifting the center of gravity of a vehicle, comprising the steps of:
   providing an apparatus for shifting the center of gravity of a vehicle, including a master cylinder assembly with motor, gearbox and position sensing encoder; at least one vehicle shock and spring assembly with upper shock casing and lower piston end; a slave cylinder hydraulically connected with the master cylinder and connected with the at least one vehicle shock and spring assembly to, upon actuation of the motor, vary the distance between the upper shock casing and the lower piston end; a driver control assembly including one or more actuator members to the steering wheel; and, a control unit having computer programming and being operationally connected between the driver control assembly and the master cylinder to actuate the motor upon movement of one or more of the actuator members;
   programming the control unit to receive and issue data and instructions to actuate the motor upon movement of one or more of the actuator members.

6. The method for shifting the center of gravity of a vehicle of claim 5 wherein the programming step includes programming the control unit with a maximum operating range.

7. The method for shifting the center of gravity of a vehicle of claim 5 wherein the programming step includes programming the control unit with a home position selected by a actuating a certain combination of the actuator members.

8. The method for shifting the center of gravity of a vehicle of claim 5 wherein the providing step includes the computer programming enabling a desired distance between the upper shock casing and the lower piston end to be set into memory and recalled by actuation of one of the actuator members.

9. The method for shifting the center of gravity of a vehicle of claim 8 wherein the programming step includes programming the control unit to enable setting the desired distance into memory by actuating one of the actuator members.

* * * * *